United States Patent [19]

Hooks, Jr.

[11] Patent Number: 4,463,380

[45] Date of Patent: Jul. 31, 1984

[54] IMAGE PROCESSING SYSTEM

[75] Inventor: John T. Hooks, Jr., Dallas, Tex.

[73] Assignee: Vought Corporation, Dallas, Tex.

[21] Appl. No.: 305,741

[22] Filed: Sep. 25, 1981

[51] Int. Cl.³ .............................................. H04N 7/18
[52] U.S. Cl. .................................. 358/160; 354/110; 358/104; 358/209; 358/903; 364/522; 382/44
[58] Field of Search ................. 358/104, 93, 160, 209, 358/903; 364/522; 382/44; 354/110

[56] References Cited

U.S. PATENT DOCUMENTS 3,441,789  4/1969  Harrison ............................ 364/522
3,995,253  11/1976  Morrin ................................ 382/44
4,127,849  11/1978  Okor .................................. 364/522

Primary Examiner—Howard Britton

Attorney, Agent, or Firm—James M. Cate; Stephen S. Sadacca

[57] ABSTRACT

An image processing system is disclosed wherein information corresponding to a selected geographical region or geometric system is stored and selectively retrieved and processed to reproduce images corresponding to selected portions of the geographical or geometric system. In a preferred embodiment, the information is initially recorded photographically and subsequently stored in a digital recording system. Processing, memory, and control systems are employed for producing video signals to be provided to video display units, for producing simulated real time images corresponding to the selected portion of the geographical or geometric system.

46 Claims, 59 Drawing Figures

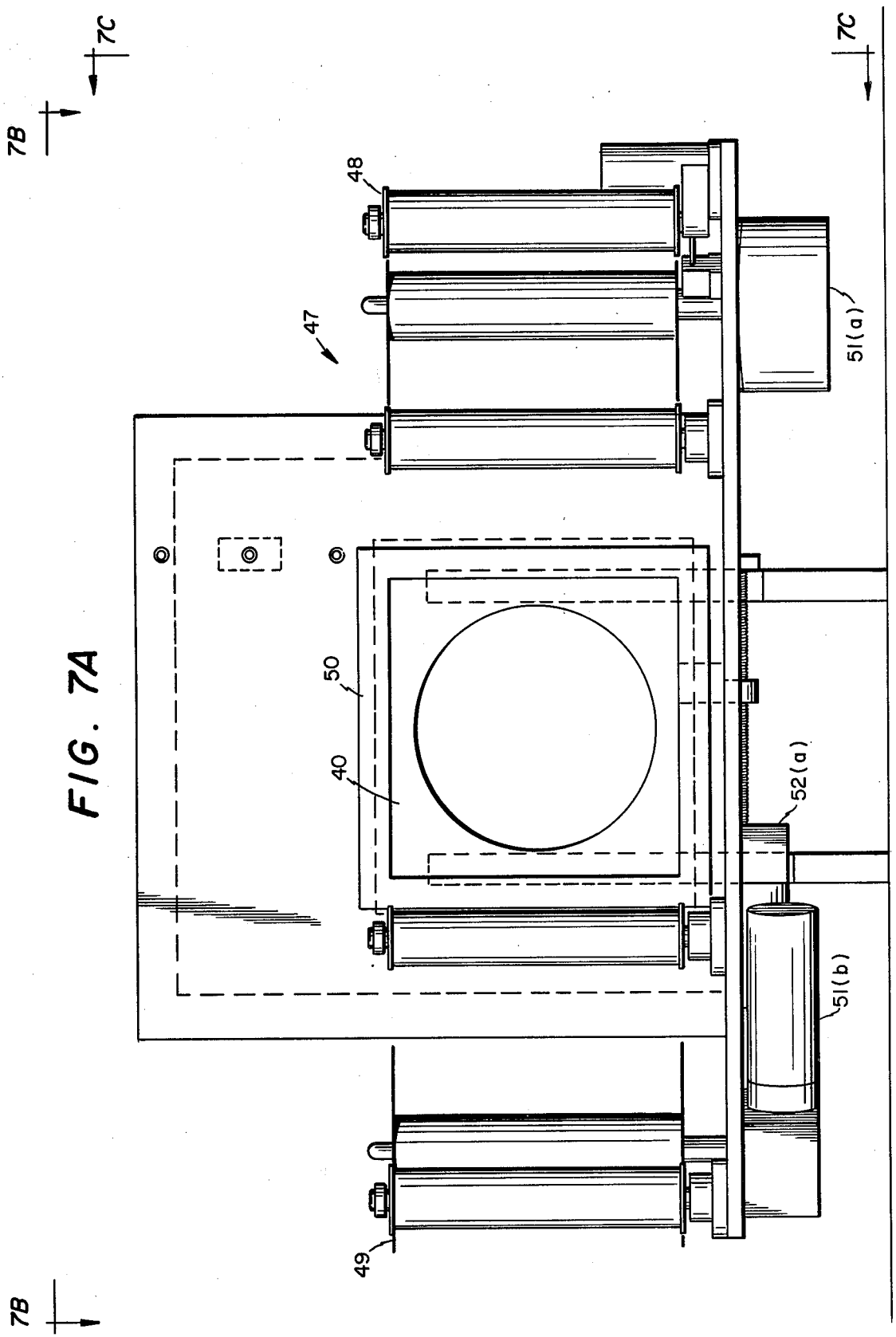

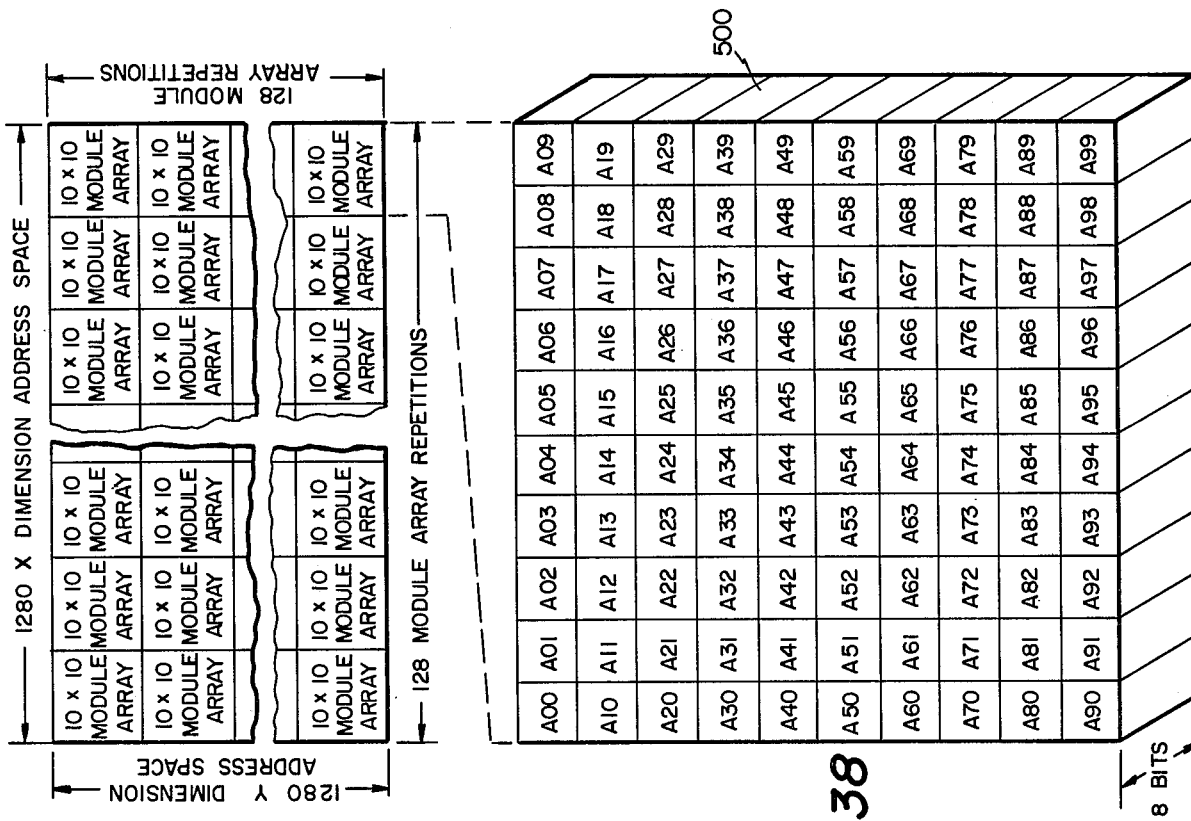
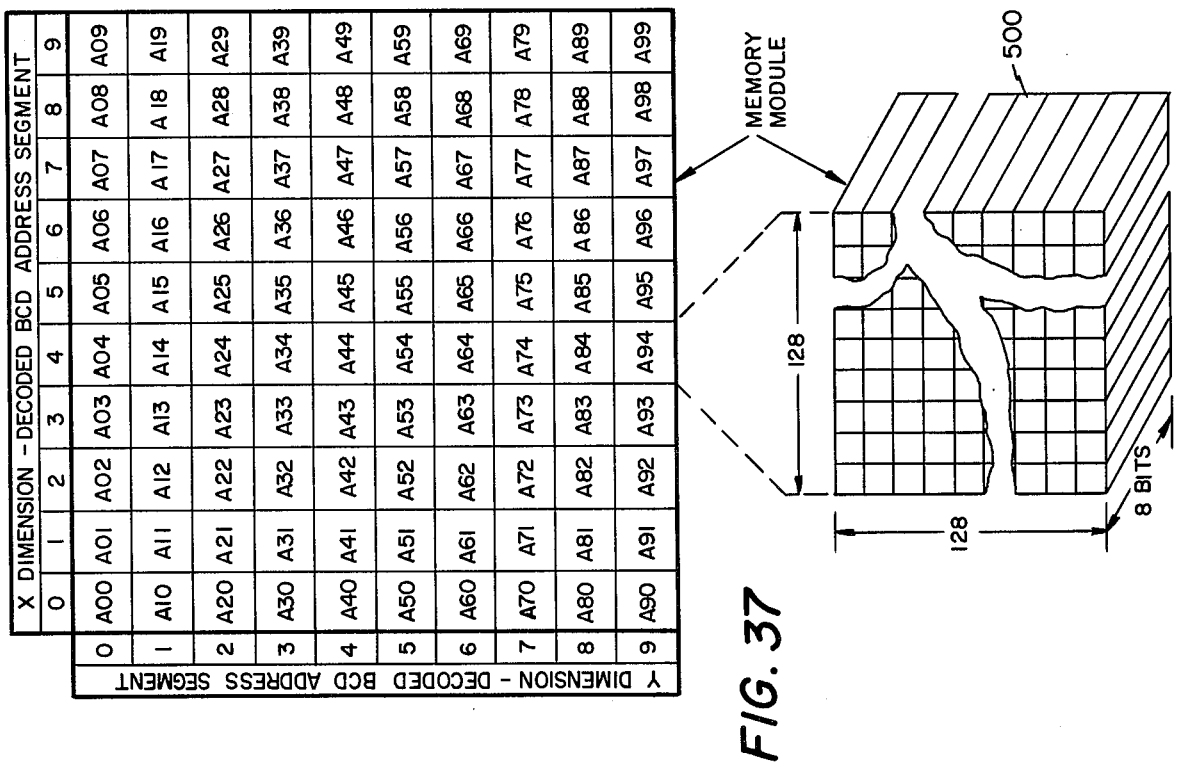
FIG. 37
FIG. 38

IMAGE PROCESSING SYSTEM

The U.S. Government has rights in this invention under Navy Contract No. N00019-78-G-0392.

This invention relates to image processing, and, more particularly, to image processing systems and methods wherein information corresponding to a given region or geometric system is systematically recorded and stored in a data bank and then partially retrieved and processed for reproducing images corresponding to selected portions of the geometric system.

Image processing systems have been proposed for permitting controllable display of images corresponding to portions of a quantity of pre-recorded visual or geometric information. In such processing systems it has been proposed to provide reproduction of visual images corresponding to portions of a geographical area, building interior, or the like, but no system has been devised in which images are reproduced in simulated real time with acceptable levels of realism. A primary application of the present invention is as a visual display for flight simulators employed in pilot training, and the exemplary embodiment disclosed relates to such an application. It will be understood, however, that the system is also useful for various other applications such as the visual simulation of building interiors, city streets, factory interiors, and for various industrial applications such as computer aided design of geometric structures.

Flight simulator systems employed for pilot training have in the past employed visual displays of only limited capacity. Such systems have been incapable of reproducing wide angle views corresponding to a multiplicity of simulated flight positions within a geographical area. A flight simulator capable of reproducing realistic visual images corresponding to all possible scenes which could be viewed from an aircraft flying through a given geographical area must be capable of displaying scenes which would be viewed from the craft along a substantial variety of flight paths and conditions, e.g., along any azimuth and at any potential selected attitude (yaw, pitch, roll), at any altitude, and within a realistic range of velocities. If the images are to be displayed in simulated "real time" corresponding to an inputed flight path selected by the pilot trainee, it will be apparent to those versed in the art that rapid processing of large amounts of data will be required. Largely because of these factors, the image processing systems which have been proposed in the past have not been capable of processing the large amounts of data entailed, with sufficient speed.

Whereas multiple photographs of high resolution taken at various positions within a geographical area, as from an aircraft traveling along a known pattern of flight paths, may include large amounts of visual information about the area, mere sequential retrieval of such unprocessed photographs does not accurately simulate a flight path selected by the simulator operator unless the selected flight path happens, by an improbable coincidence, to correspond exactly with the flight path of the aircraft from which the pictures were taken. Because it would be impractical to store the multiplicity of photographs required to show all portions of an area from all possible altitudes, attitudes and X-Y positions, it has been proposed to skew, rotate, and otherwise process the photographs retrieved to provide a realistic simulation of attitude and/or position changes between photographs in the data bank, thereby minimizing the requirement for an impractical number of stored photographic images. Such processing of photographic images for real-time simulation, however, requires that the photographic images be converted to a data processing format suitable for computer aided processing techinques, and in the past, the large amounts of data required for realistic, high resolution image reproduction, the extremely complex processing techinques entailed, and the processing speeds required for providing 30-second/frame reproduction have simply not been compatible.

It is, accordingly, a major object of the present invention to provide an image processing system in which a data bank of high resolution images corresponding to known orientations within a given geometric system is processed to permit retrieval of portions of the images appropriate for simulating a portion of the goemetric system.

A further object is to provide such a system in which retrieval of the images is effected sequentially in response to inputs for simulating movement through the geometric system.

A still further object is to provide such a system in which the high resolution images are derived from optically recorded images of a geometrical area and in which the retrieval and display of the images corresponds to simulated movement through the area, in response to commands from an operator, and in which a real-time visual display is provided for simulating movement along the path input by the operator.

A still further objective is to provide a visual flight simulation system having such a controlled data base and operable for reproducing high definition, real-time images of multiple, adjacent views of a given scene along different vectors from a simulated cockpit.

Yet another object is to provide such a system operable to process optically reproduced images derived from multiple views taken along multiple axes of a geometric system, and to integrate the multiple images into a single overall scene representative of a wide angle, hemispherical view of the overall scene.

A still further object is to provide a display processing unit capable of selecting, processing, and displaying appropriate portions of a hemispherical image as required to simulate a view of a portion of the overall scene at and along a particular axis.

Figure 7B:
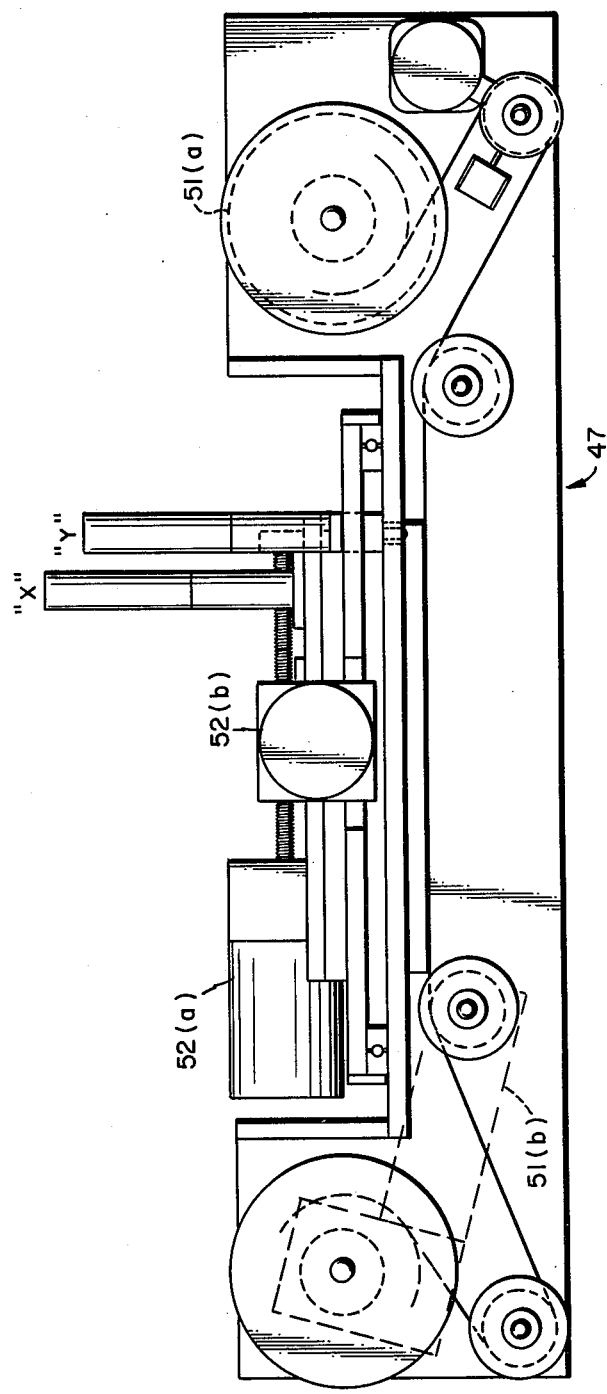
Figure 7C:
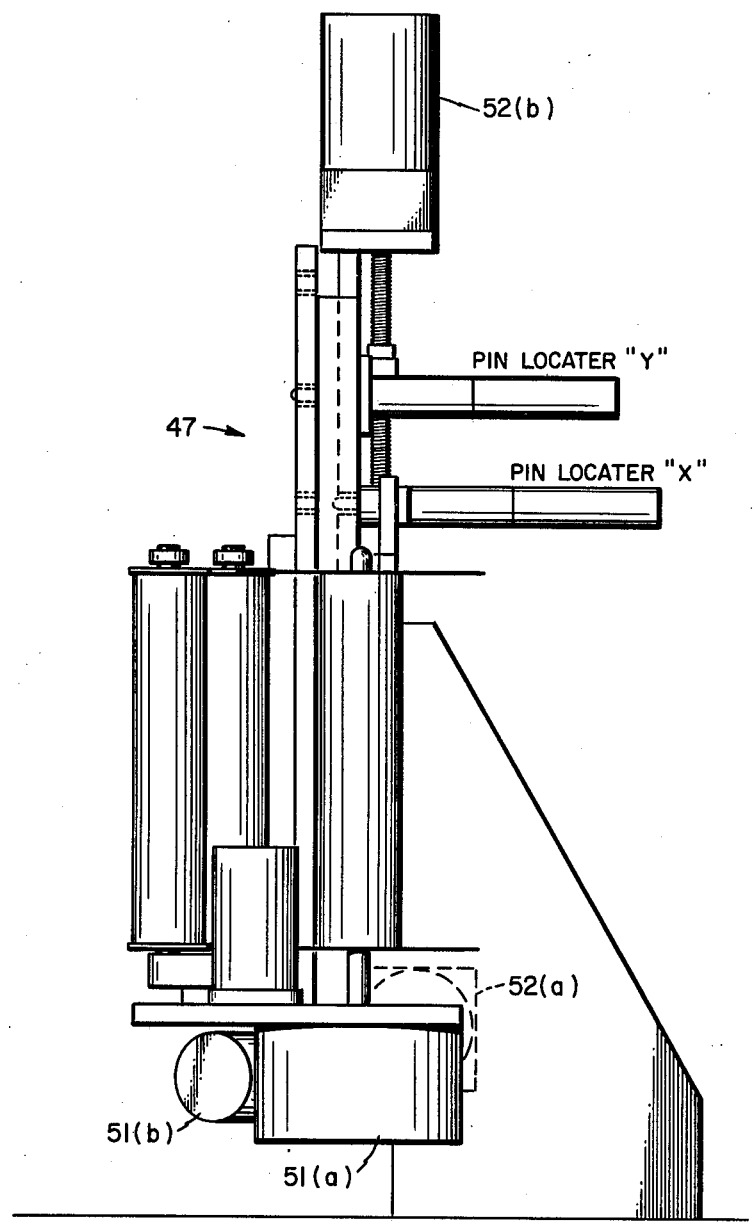
Figure 8:
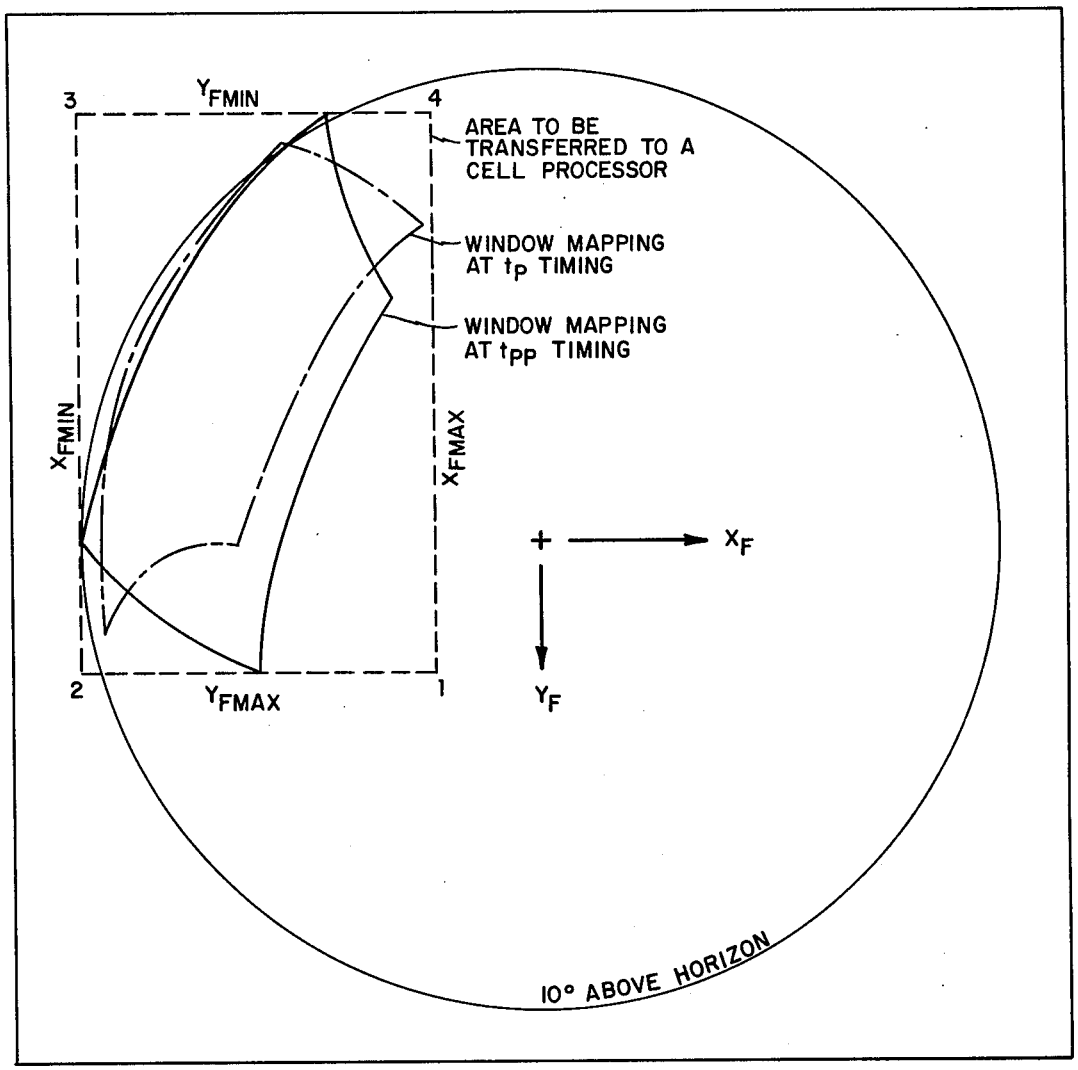
Figure 9A:
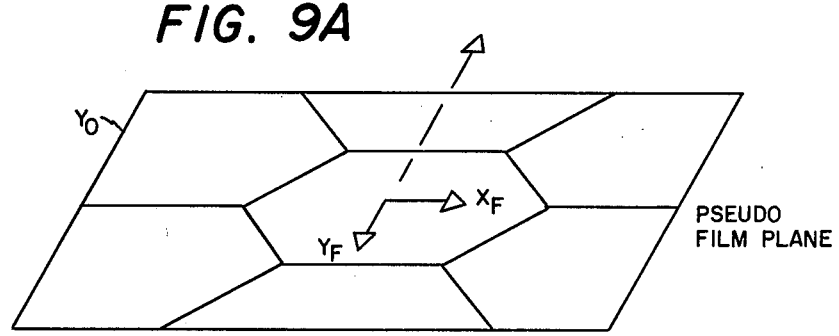
Figure 9B:
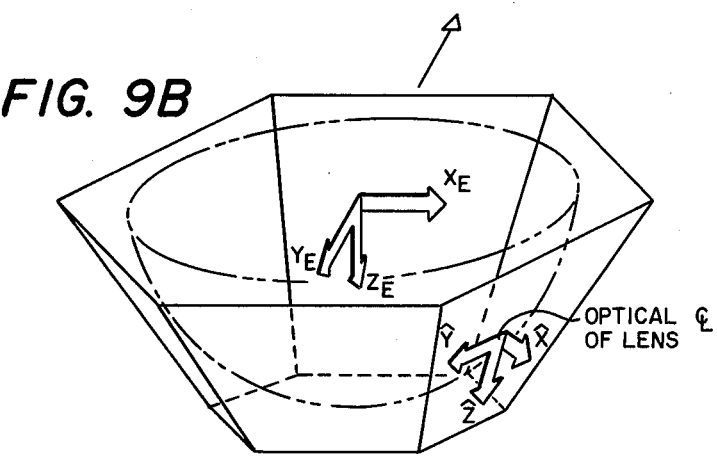
Figure 9C:
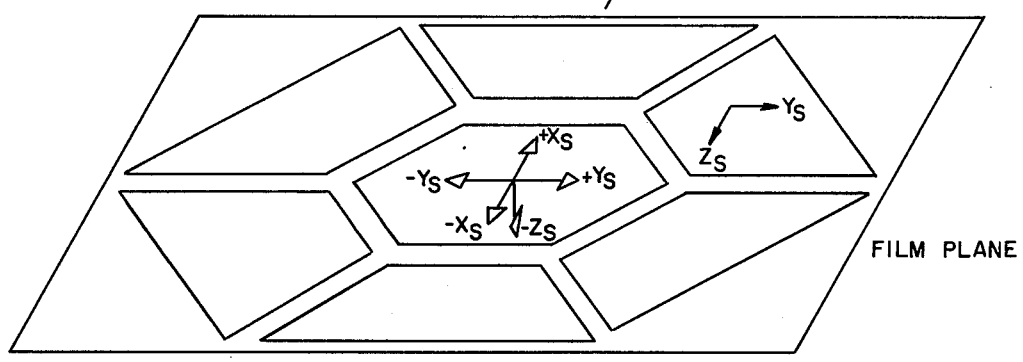

FIGS. 7(a), 7(b), and 7(c) are plan, side, and endwise representations of the film transport unit;

FIG. 8 is a graphical representation of the timing cycle of the processing system;

FIGS. 9(a), 9(b), and 9(c) are, respectively, diagrammatic representations of the filter plane, the partially spherical scene field of view, and the pseudo image plane representing the integrated images employed for processing.

Figure 10:
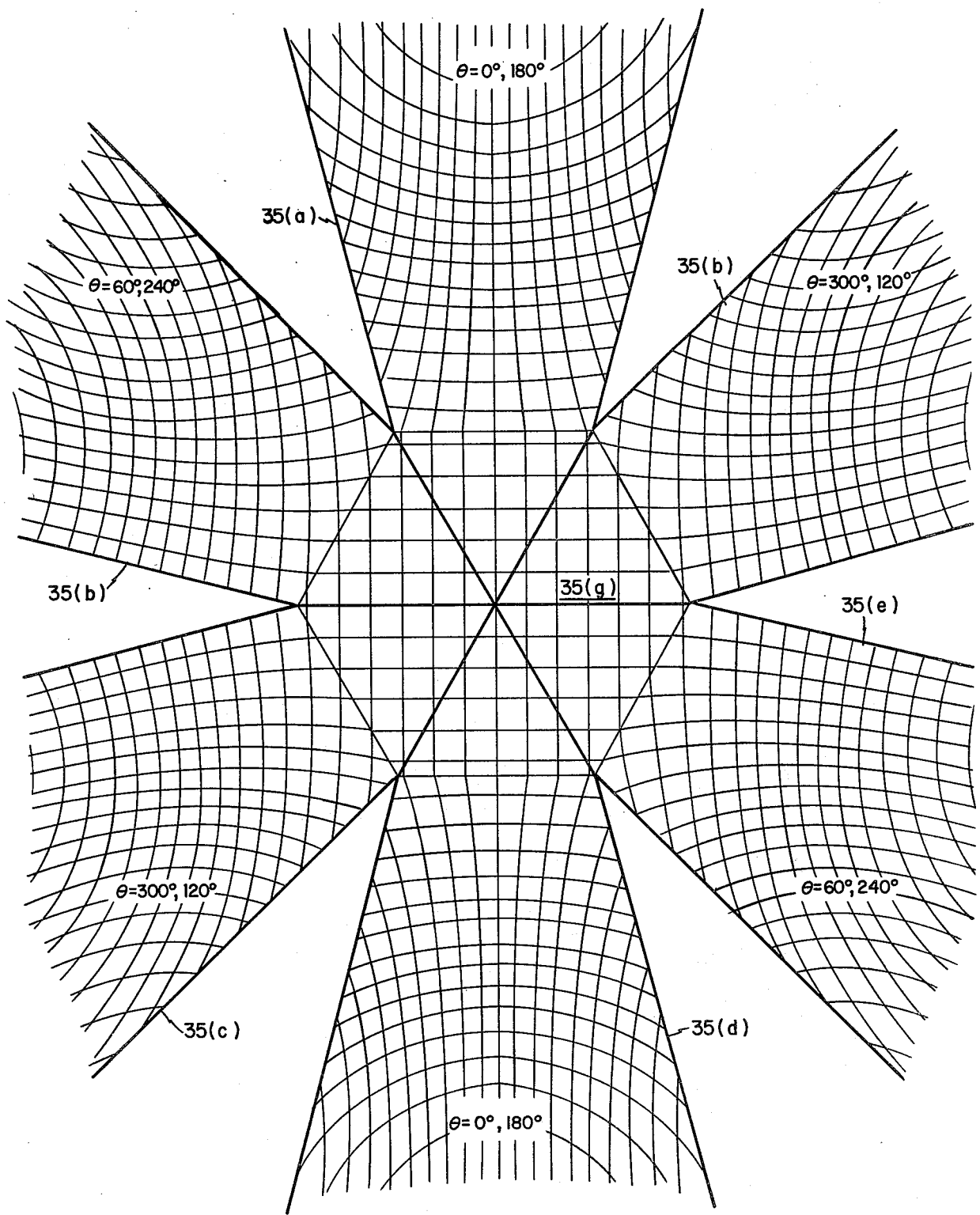
Figure 11:
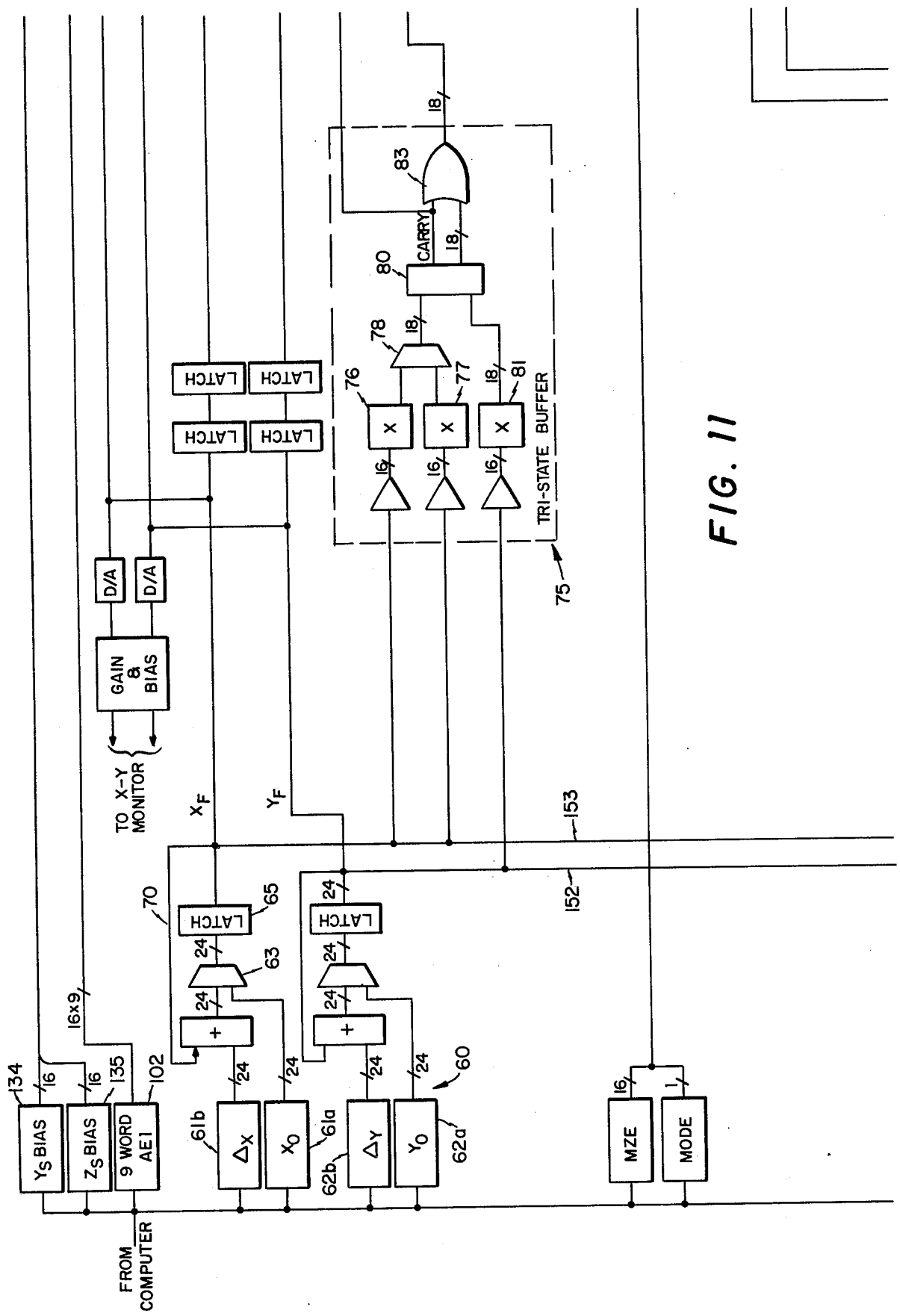
Figure 12:
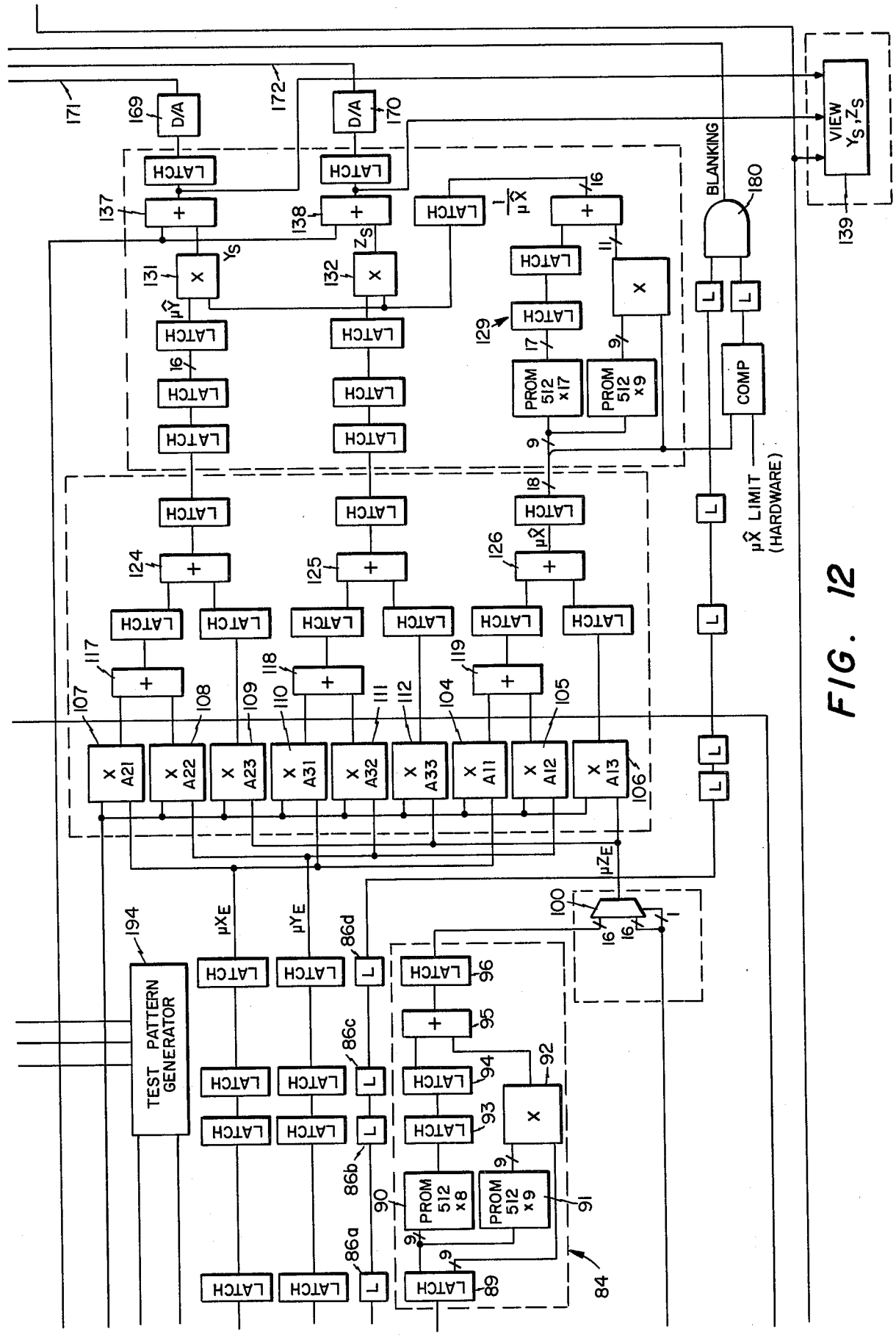
Figure 13:
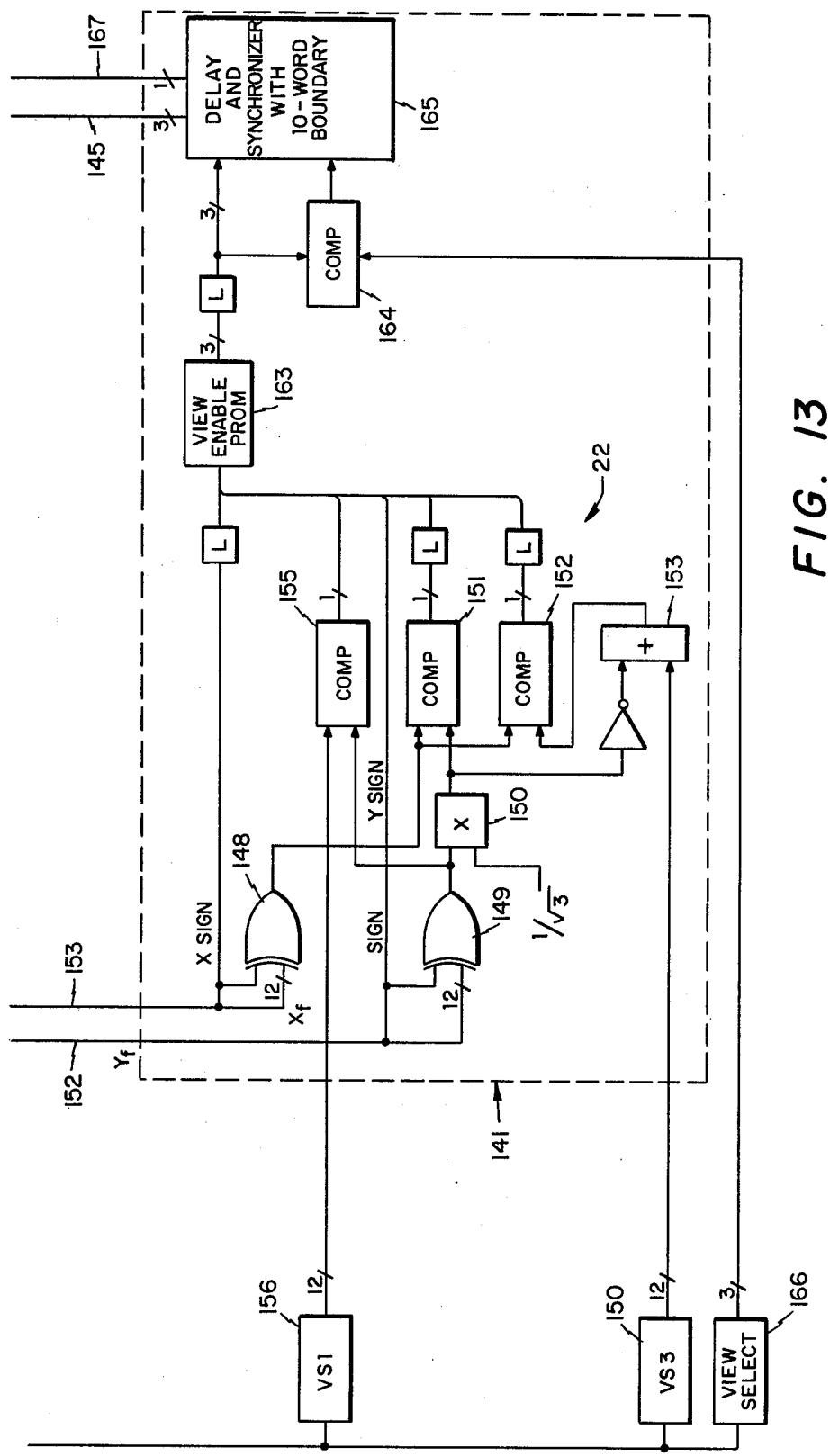
Figure 14:
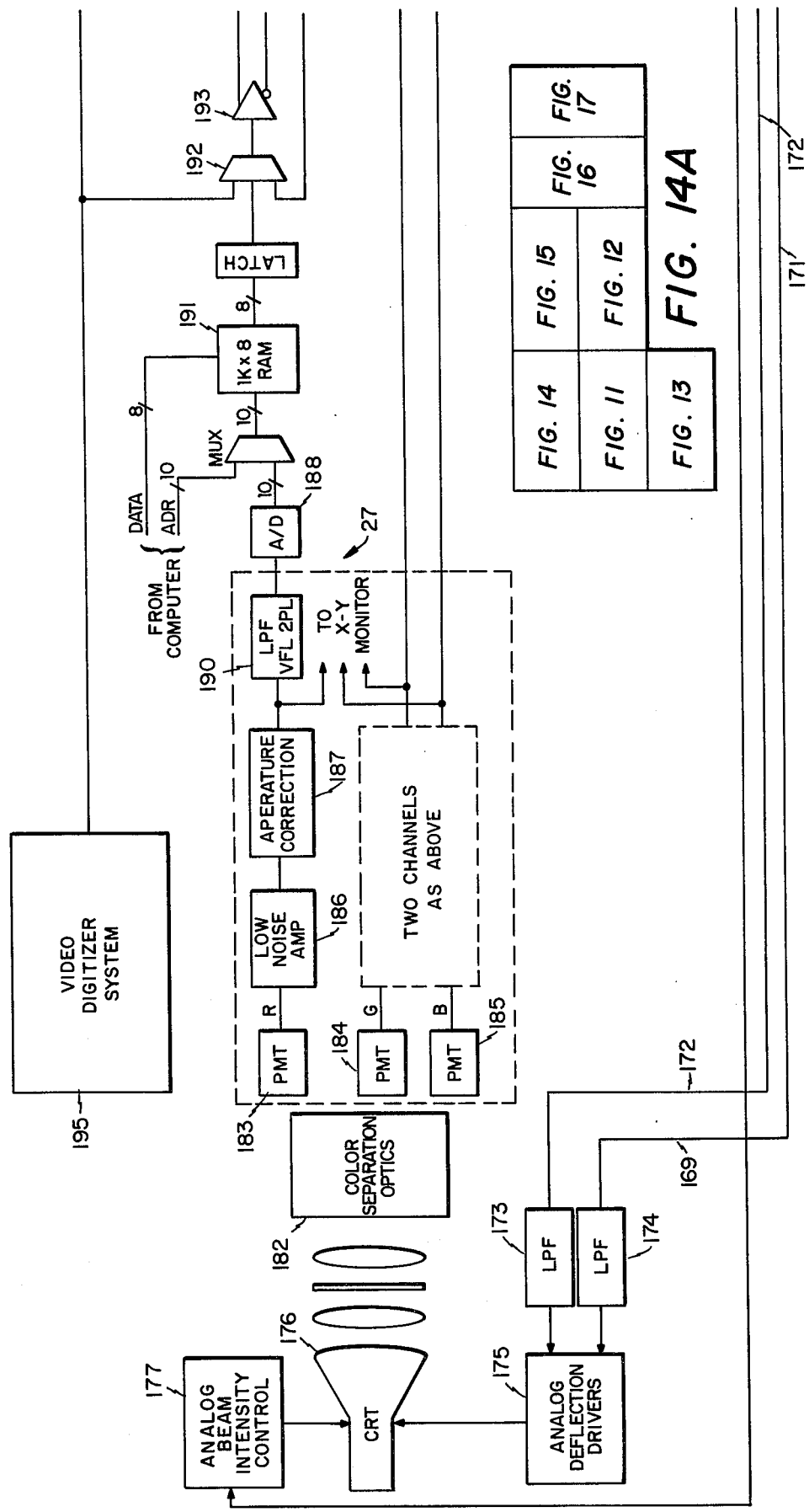
Figure 15:
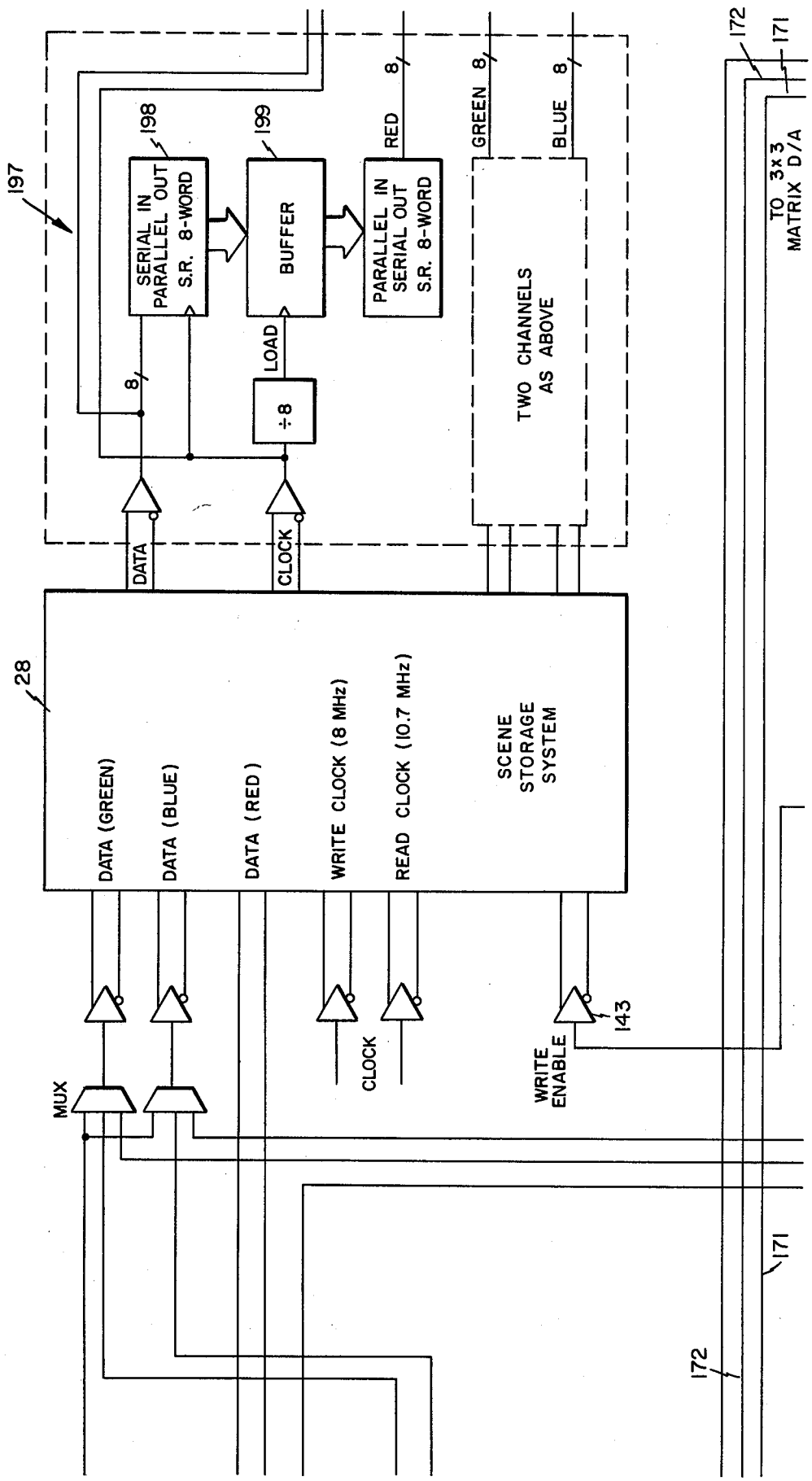
Figure 16:
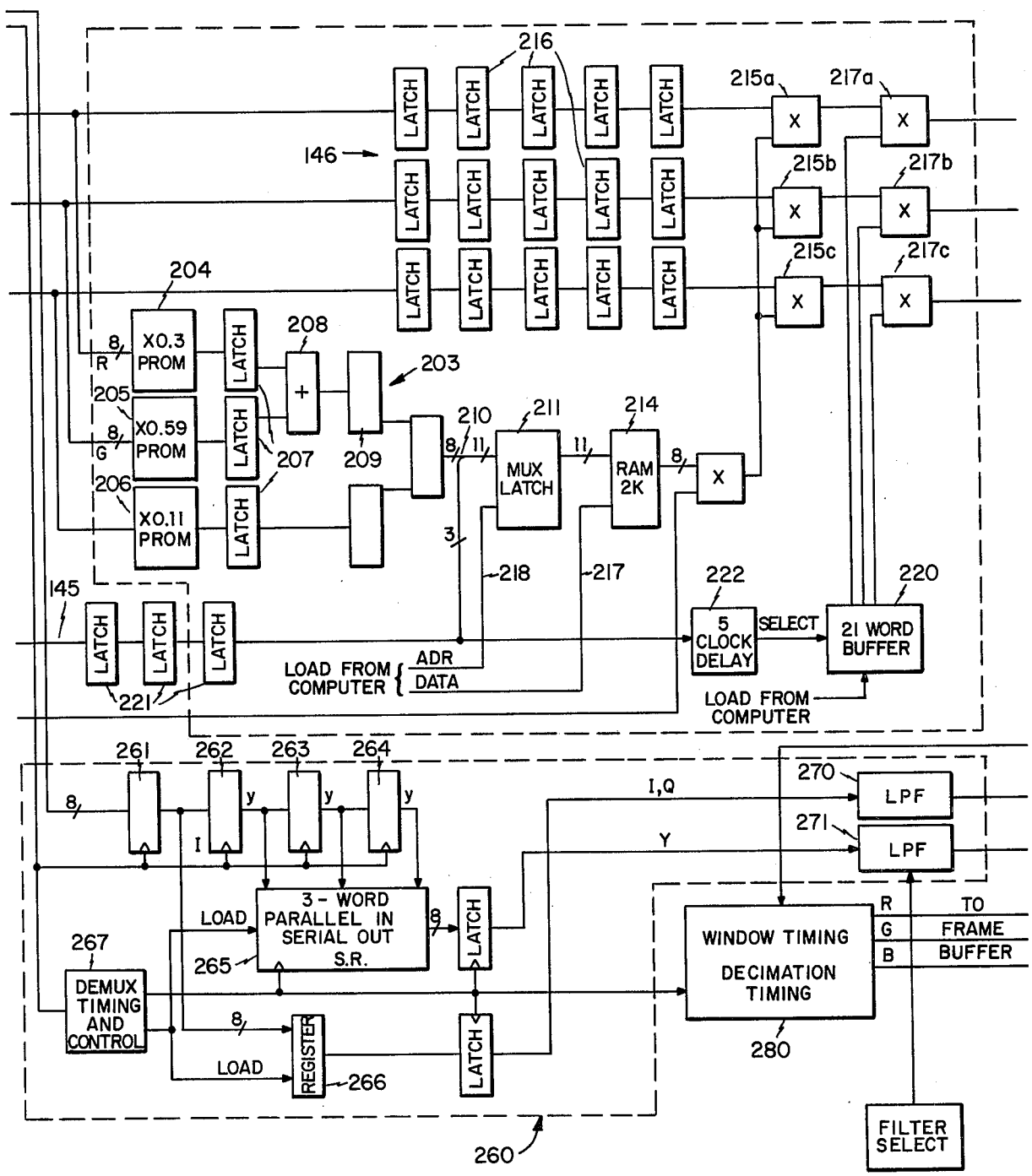
Figure 17:
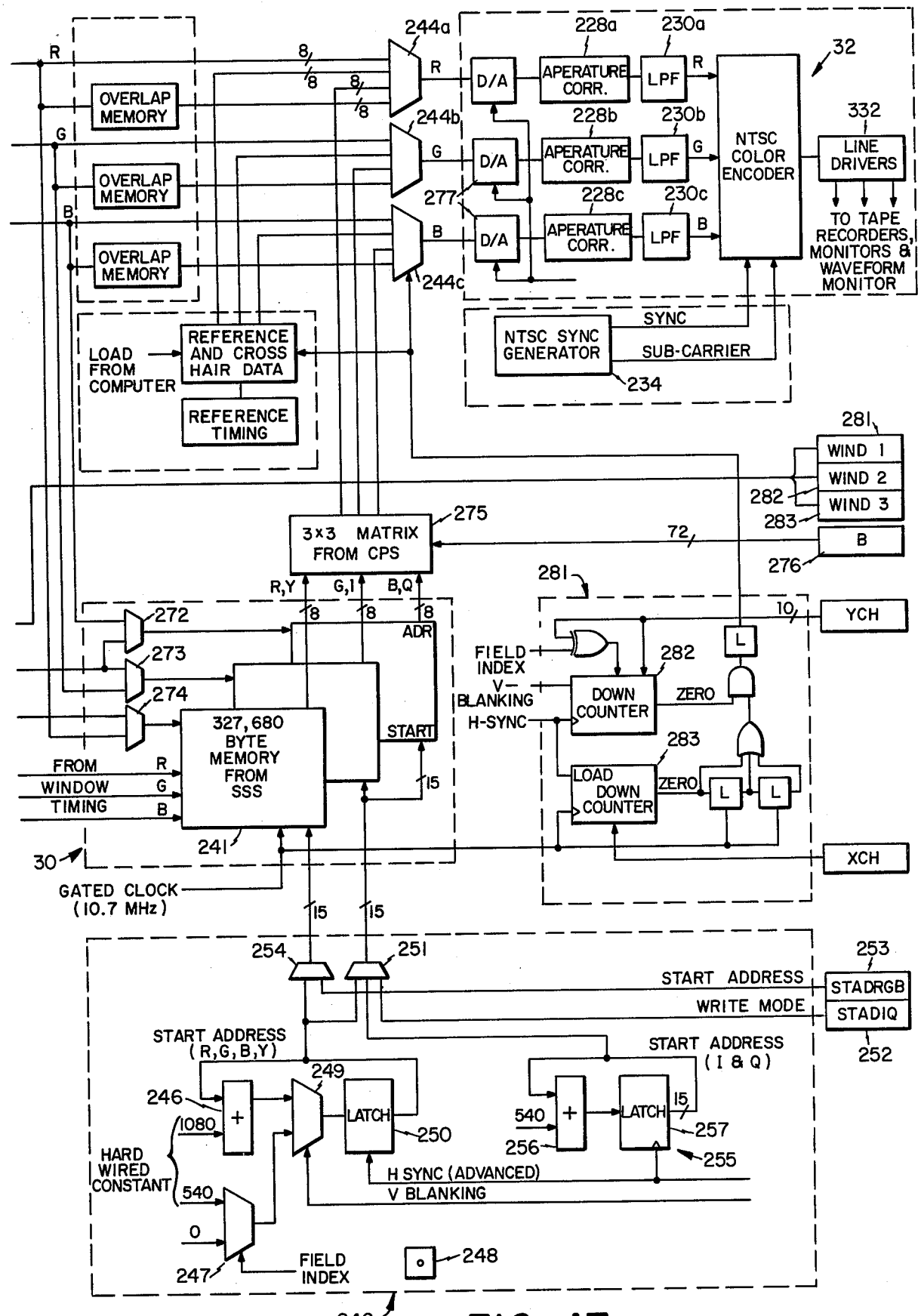

FIG. 10 is a representation of the scanning pattern over a film frame generated by the raster generator;

FIG. 11 is a schematic, partially diagrammatic representation of the raster generator portion of the image recording system;

FIG. 12 is a view, similar to FIG. 11, of the $\mu z_E$ processing portion of the image recording system;

FIG. 13 is a view, similar to FIGS. 11 and 12, showing the view identification portion of the image recording system;

FIG. 14 is a view, similar to FIGS. 11-13, of the image scanning apparatus and associated components of the image FIG. 14A is a representation showing the positional interrelationship of the recording system circuit portions of FIGS. 11-17;

FIG. 15 is a view, similar to FIGS. 11-14, showing the scene storage system and associated components of the image recording system;

FIG. 16 is a view, similar to FIGS. 11-15, showing the luminance and color correction sections of the image recording system;

FIG. 17 is a view, similar to FIGS. 11-16, showing the start address generator section, the Y, I, Q—to Red, Green, Blue conversion section, analog processing section, and associated components of the image recording section and showing the frame buffer window tuning section and associated components, of the image recording section;

FIG. 18 is a view similar to FIG. 17 showing the NTSC color encoder and associated circuitry in an enlarged scale.

Figure 19:
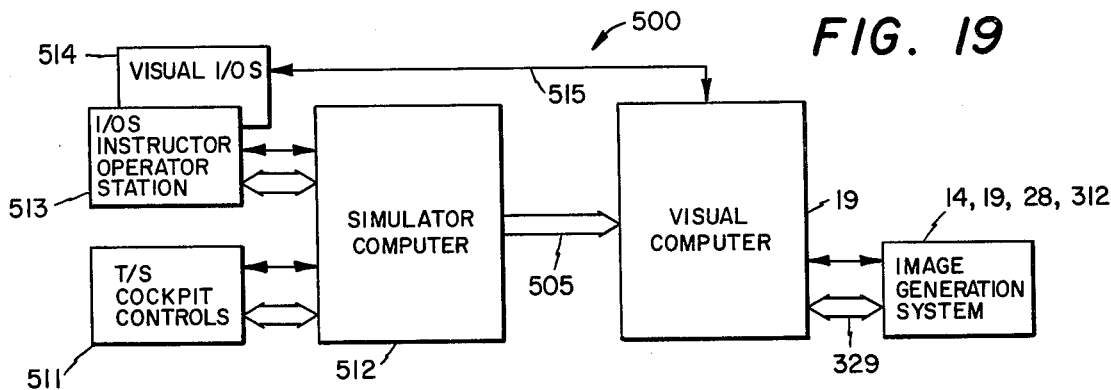
Figure 20:
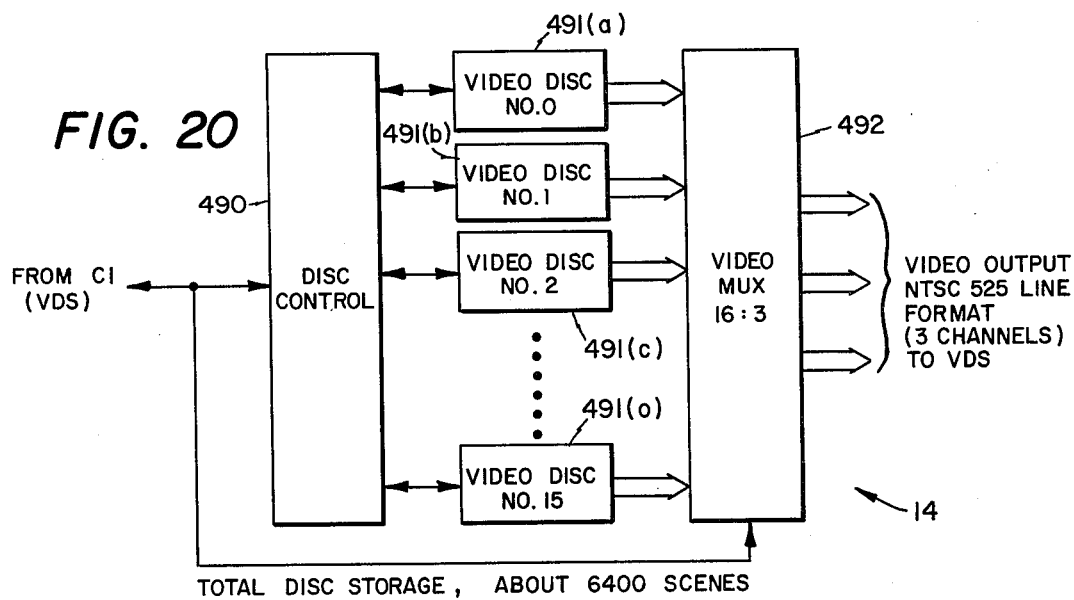
Figure 21:
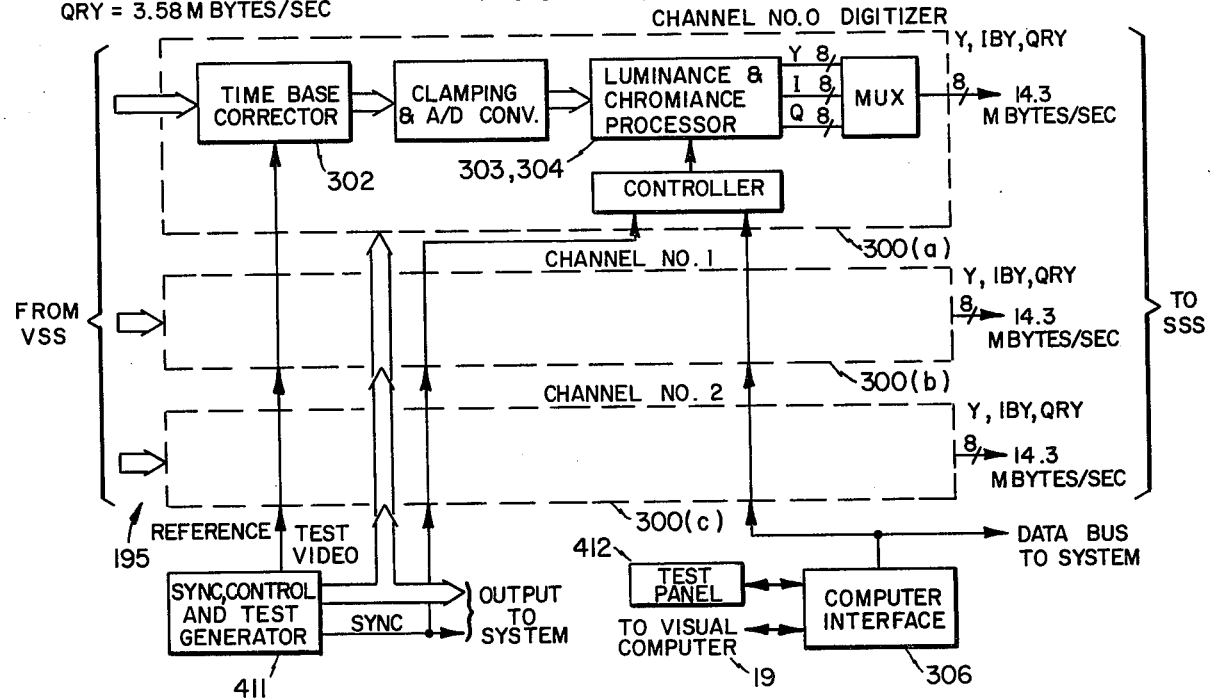
Figure 22:
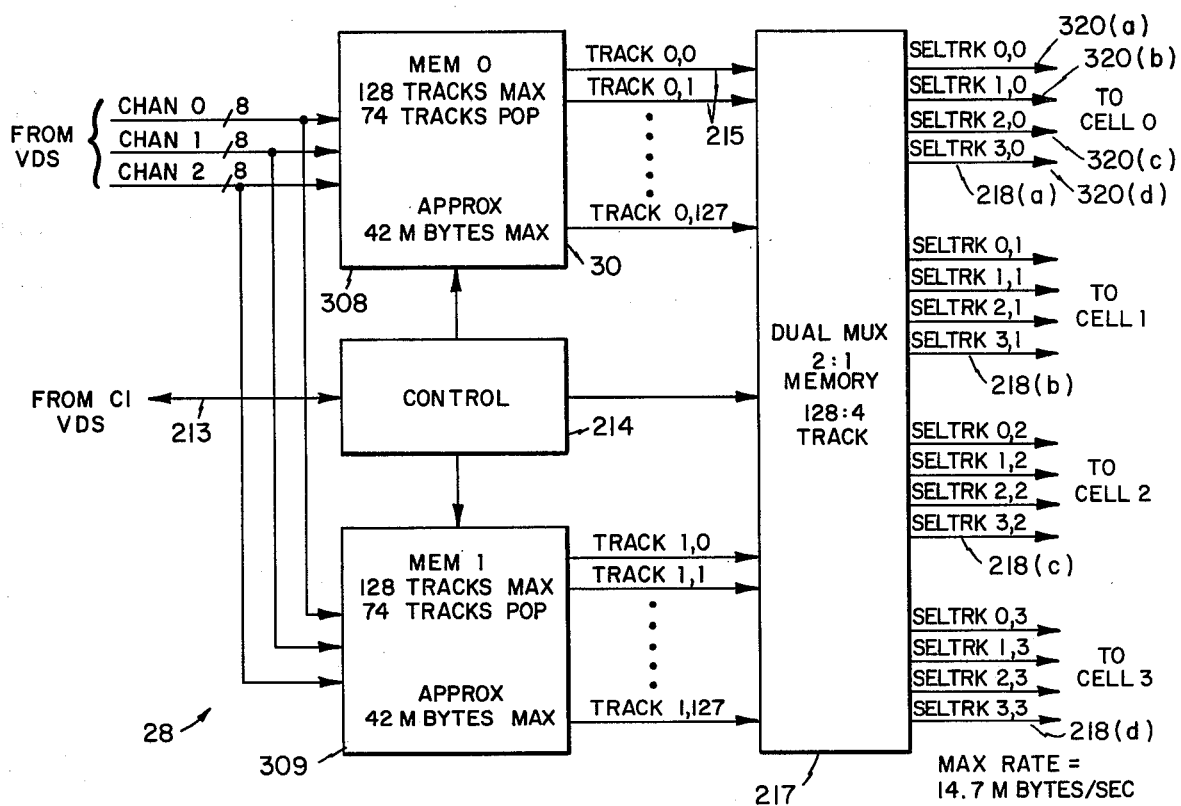
Figure 23:
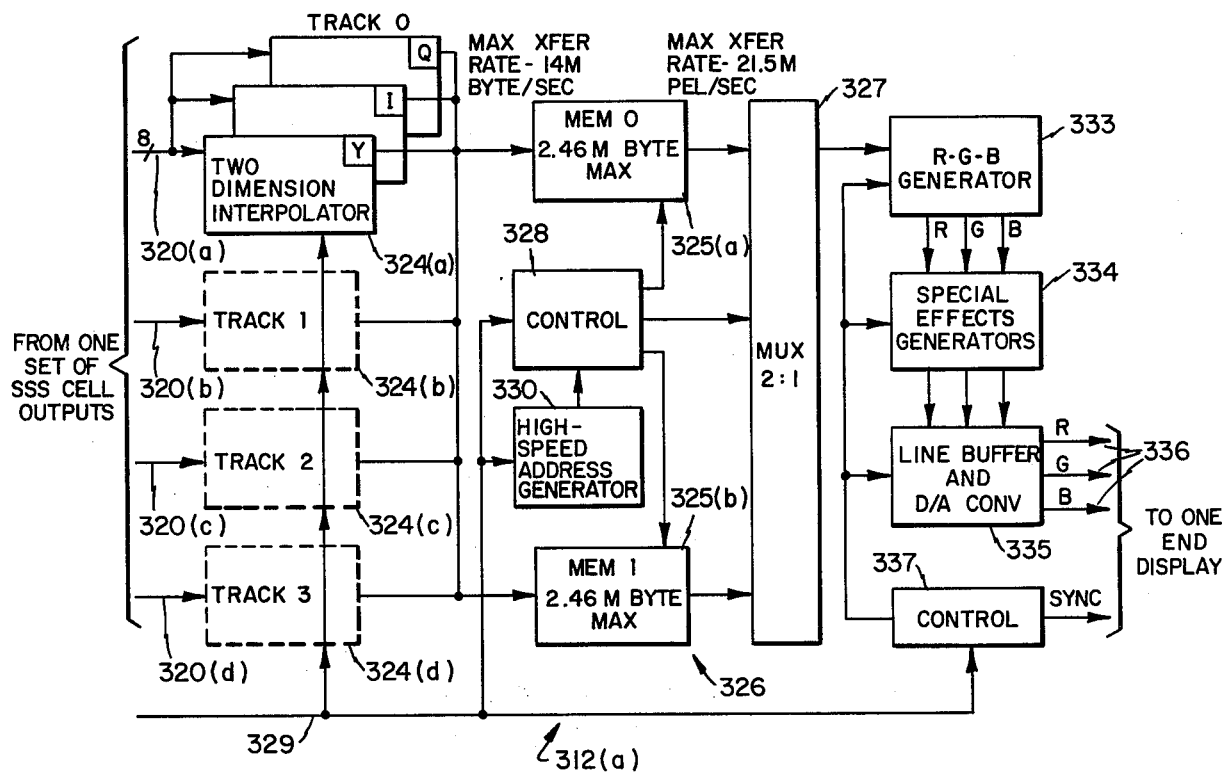
Figure 24A:
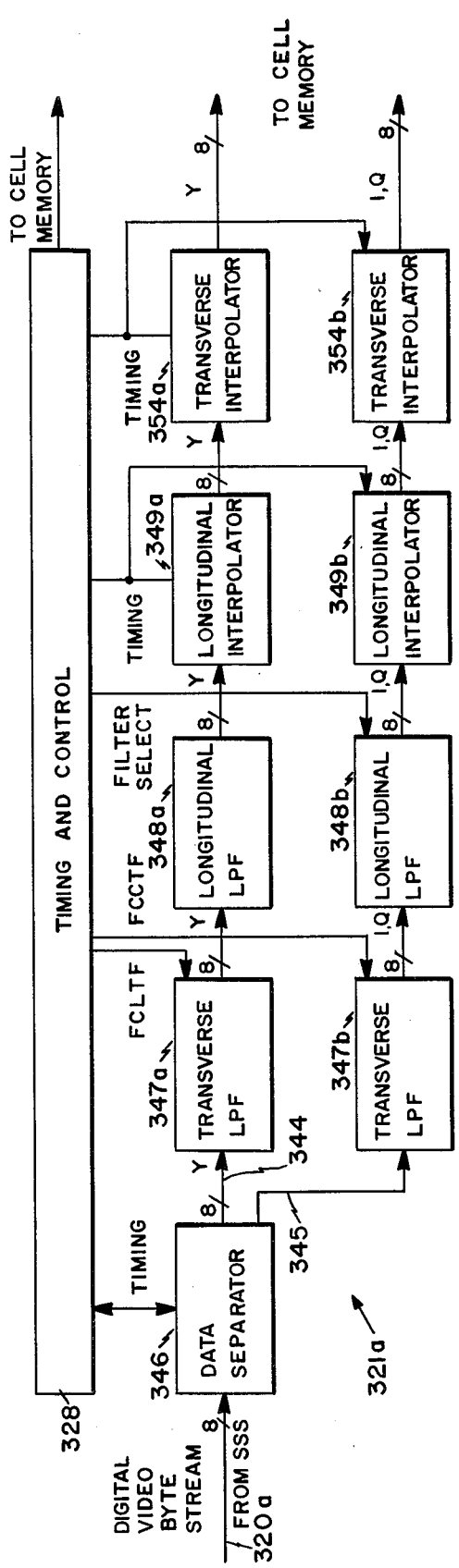
Figure 26:
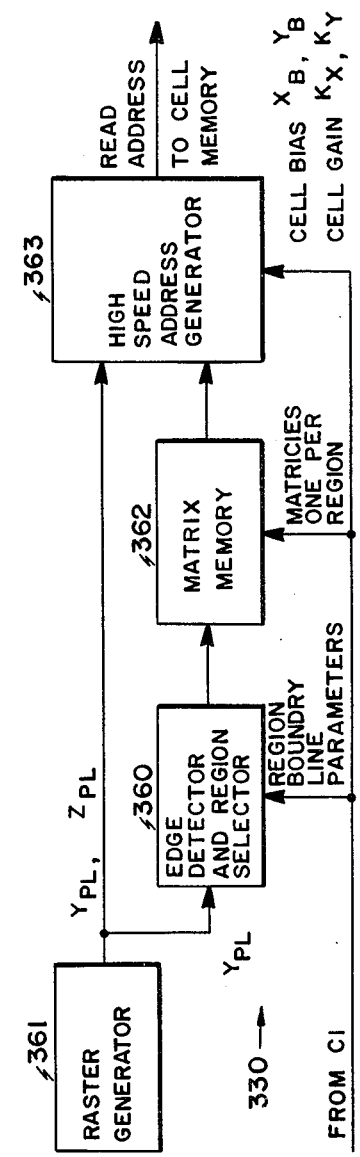
Figure 24B:
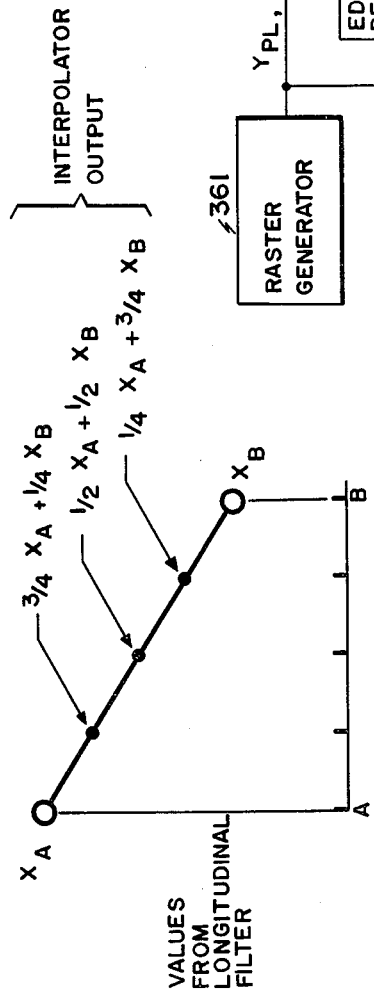
Figure 25:
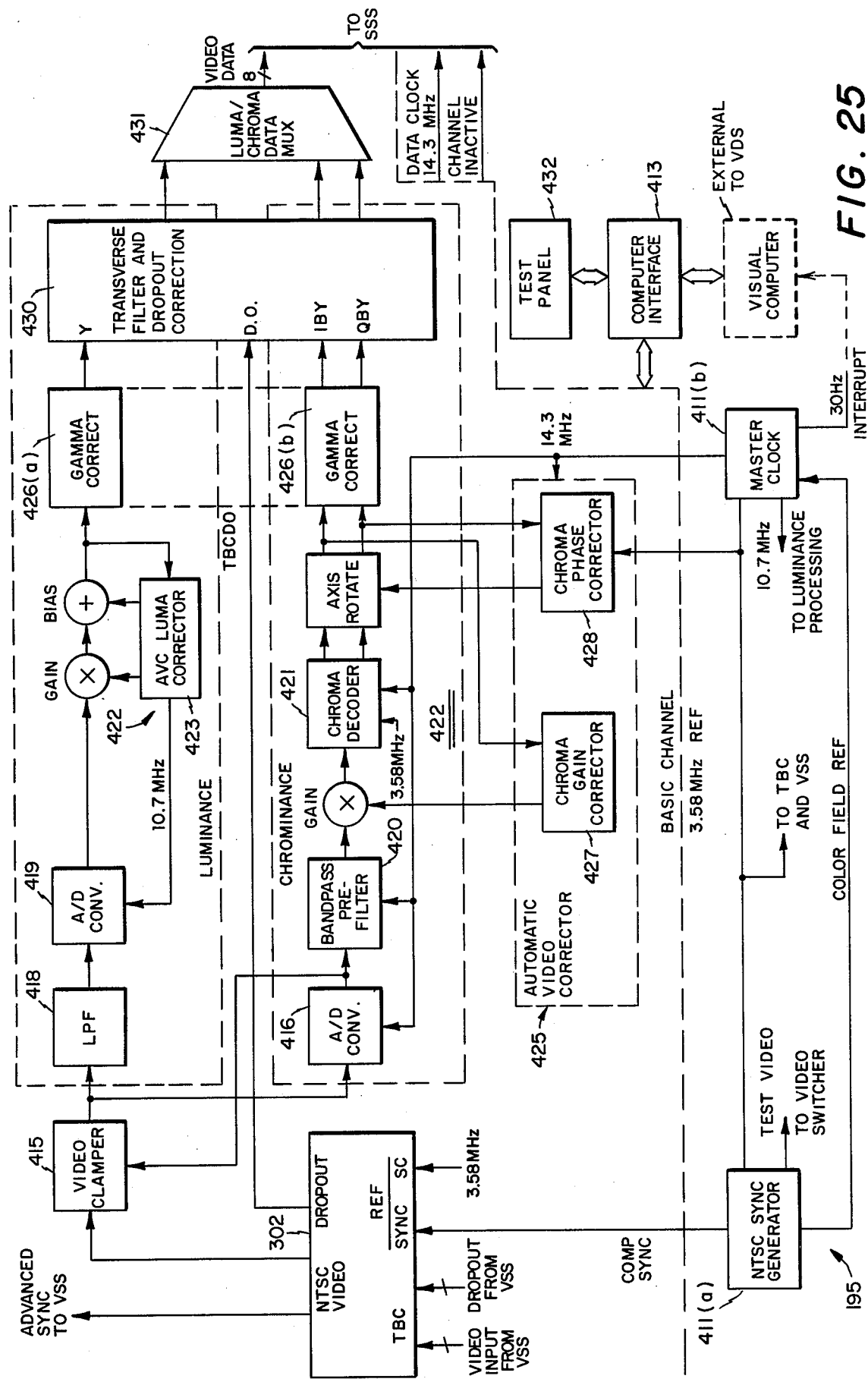
Figure 27:
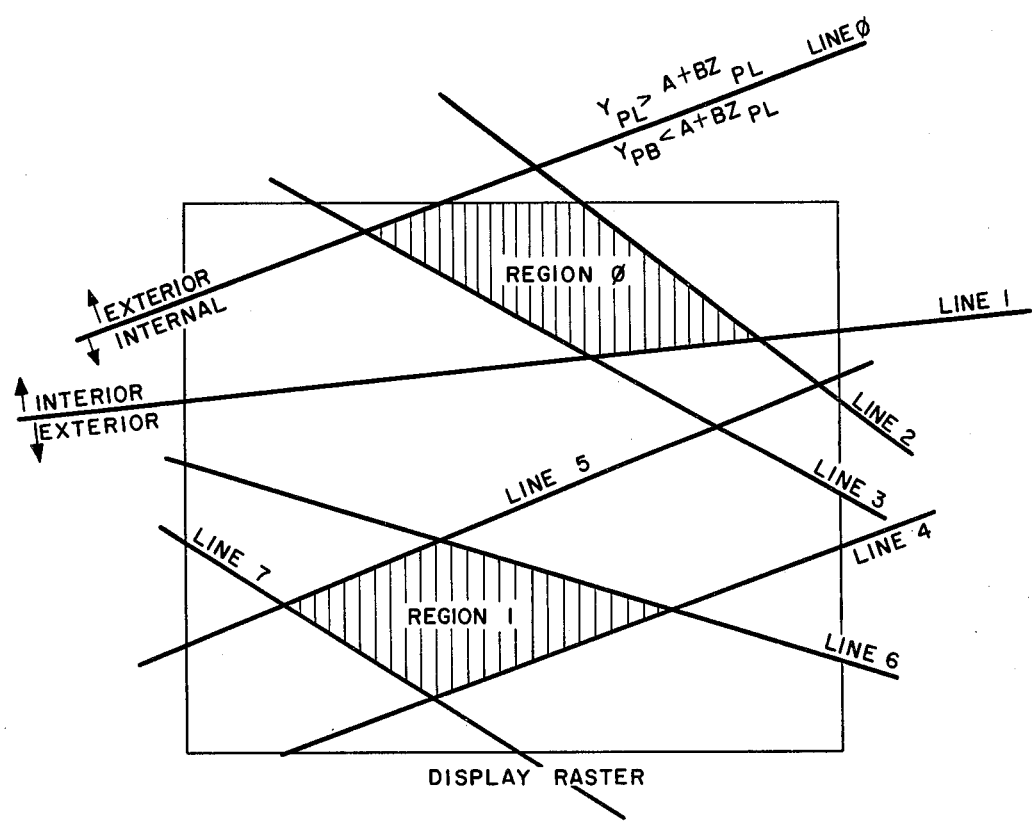
Figure 28:
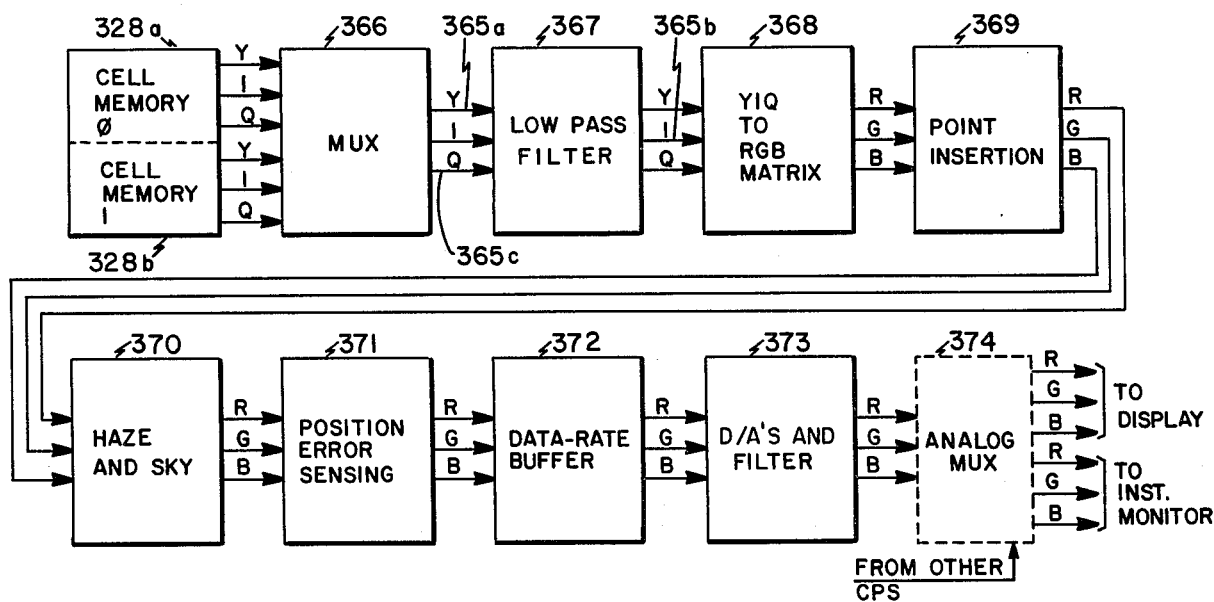
Figure 29:
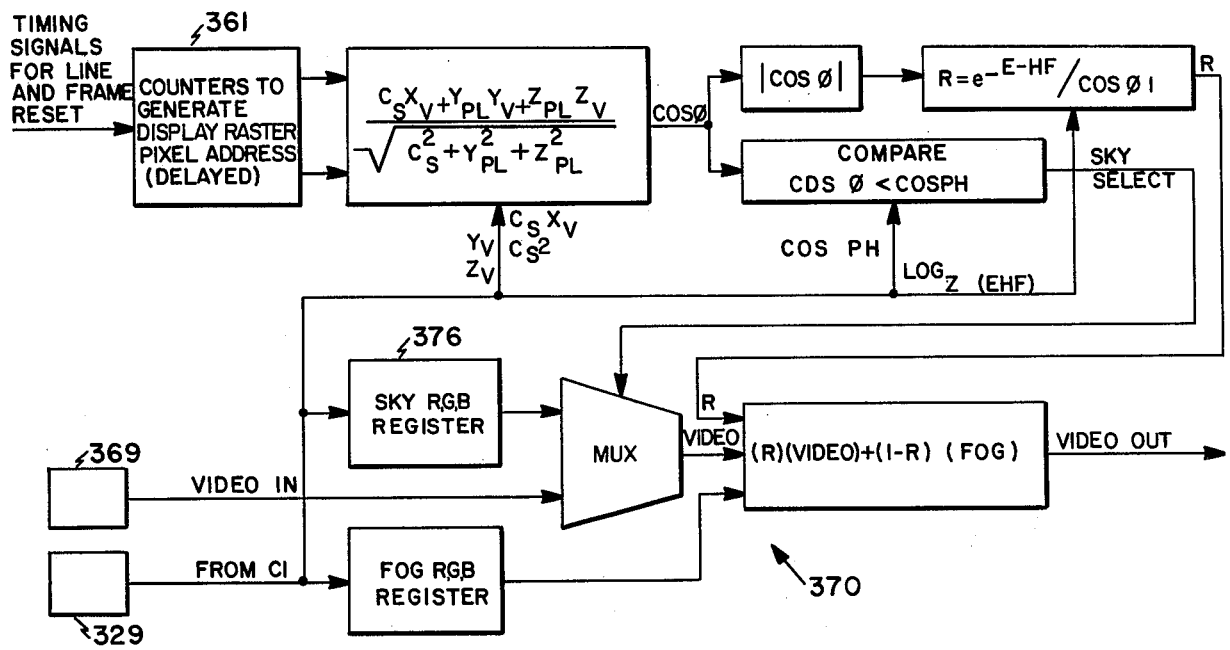
Figure 30:
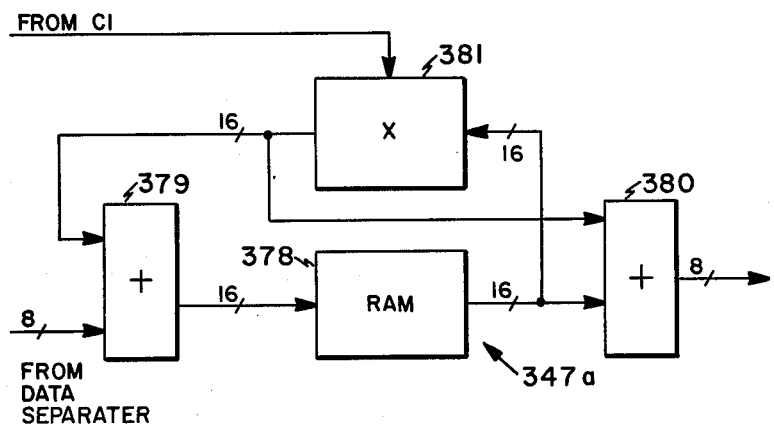
Figure 31:
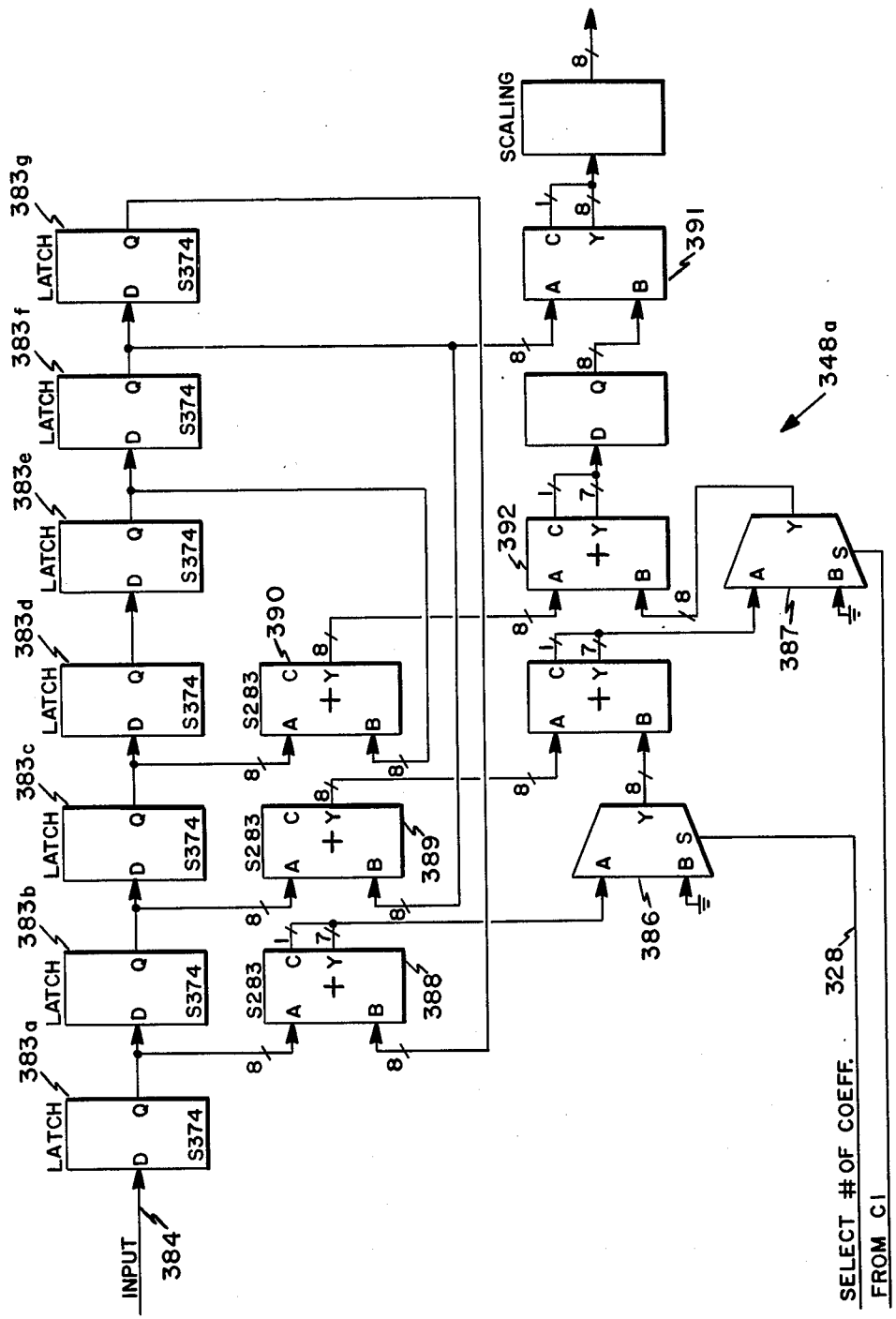
Figure 32:
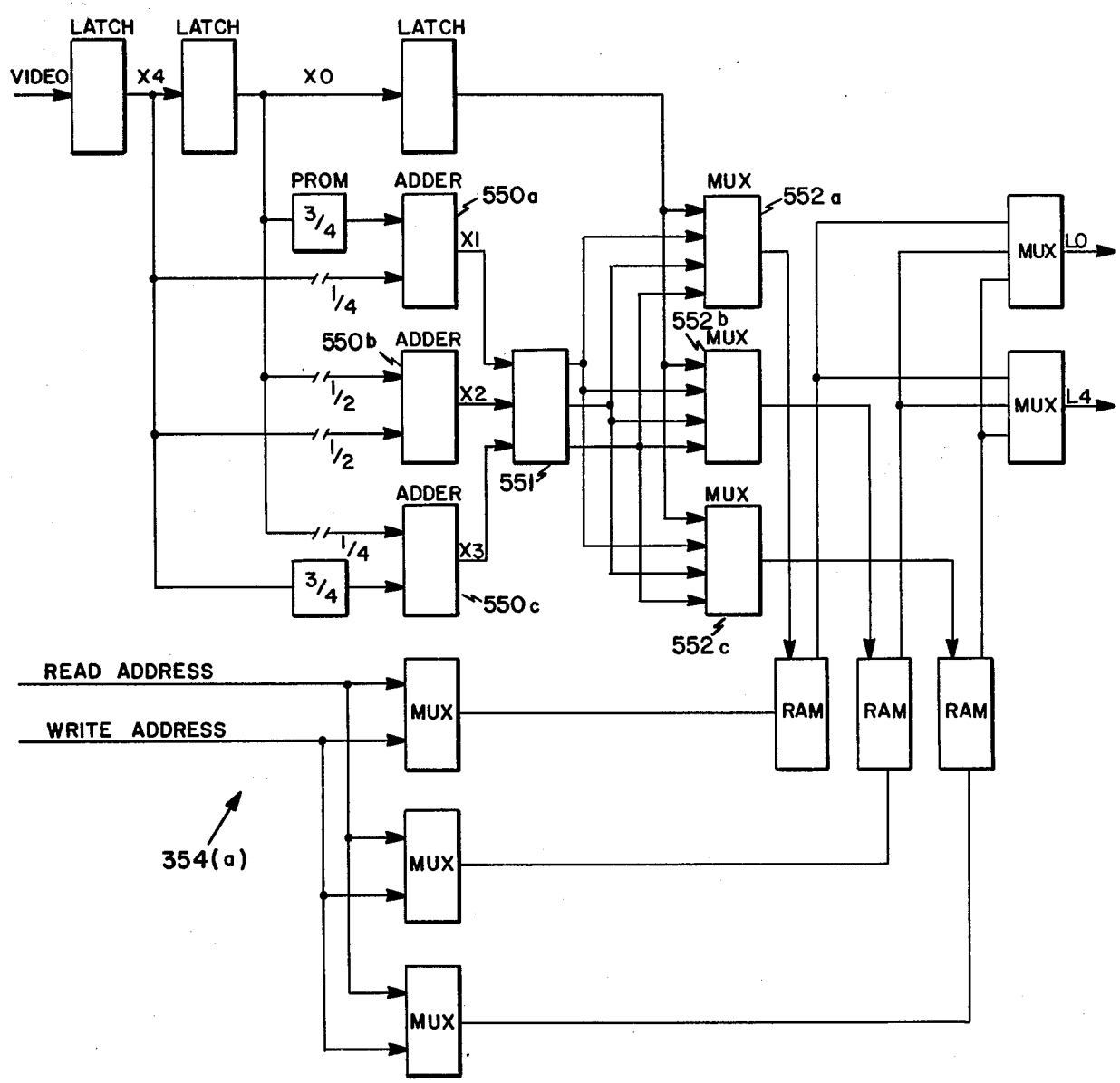
Figure 33:
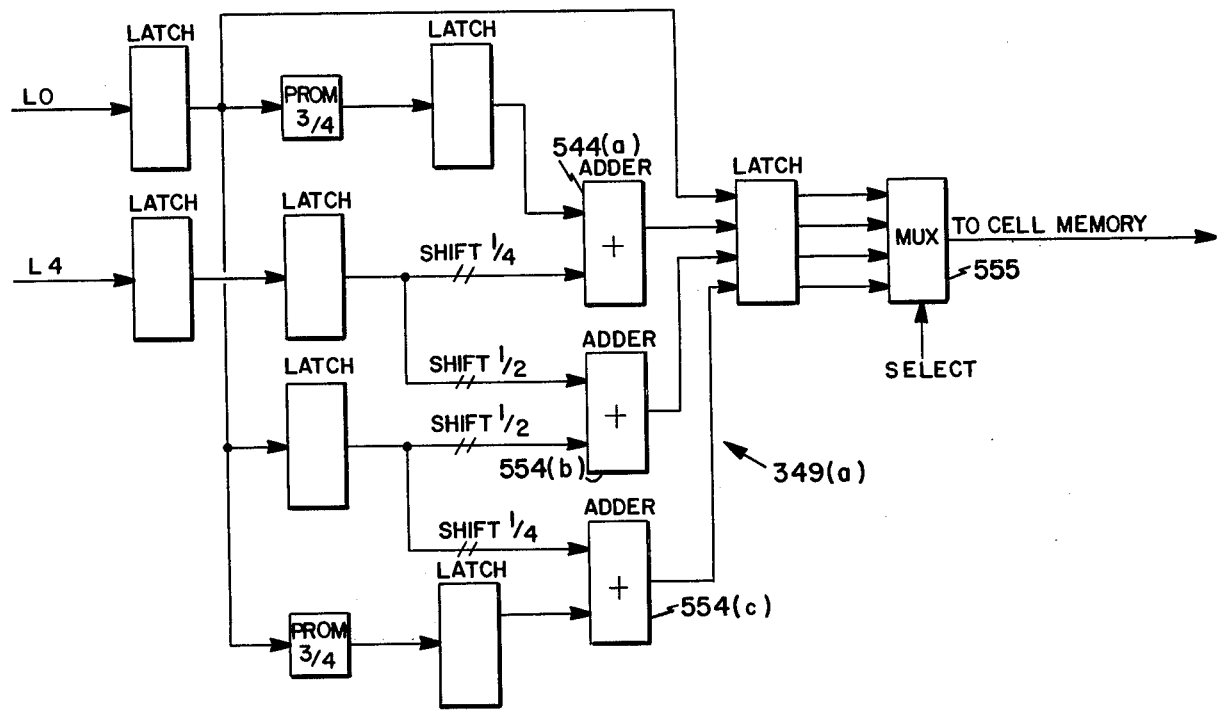
Figure 34:
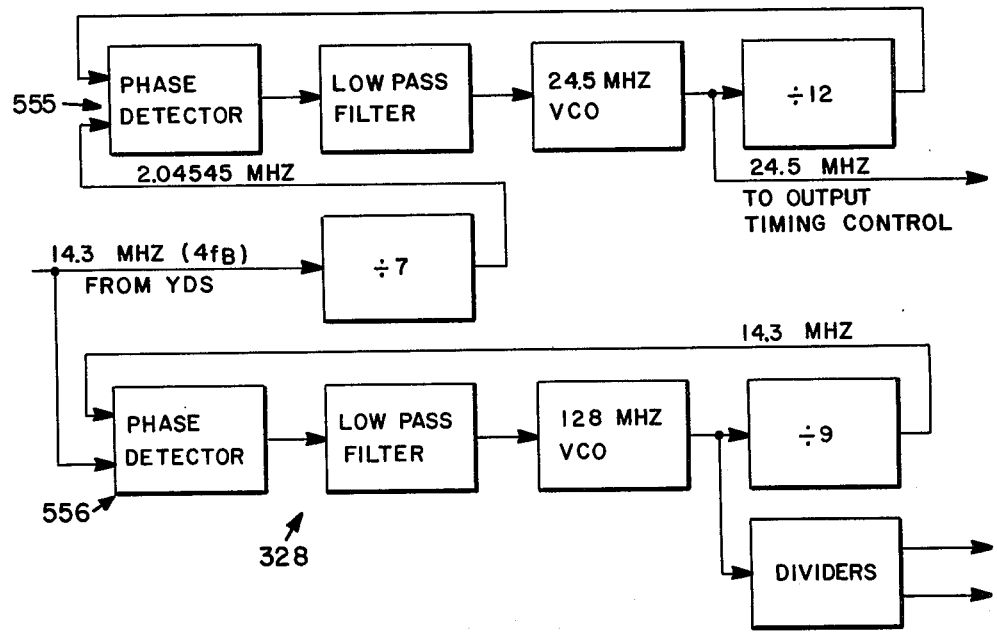
Figure 35:
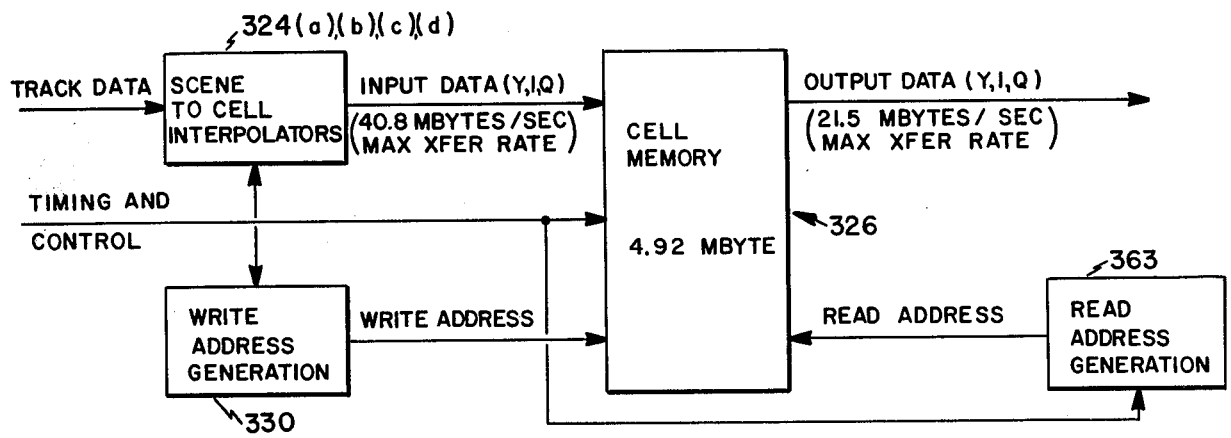
Figure 36:
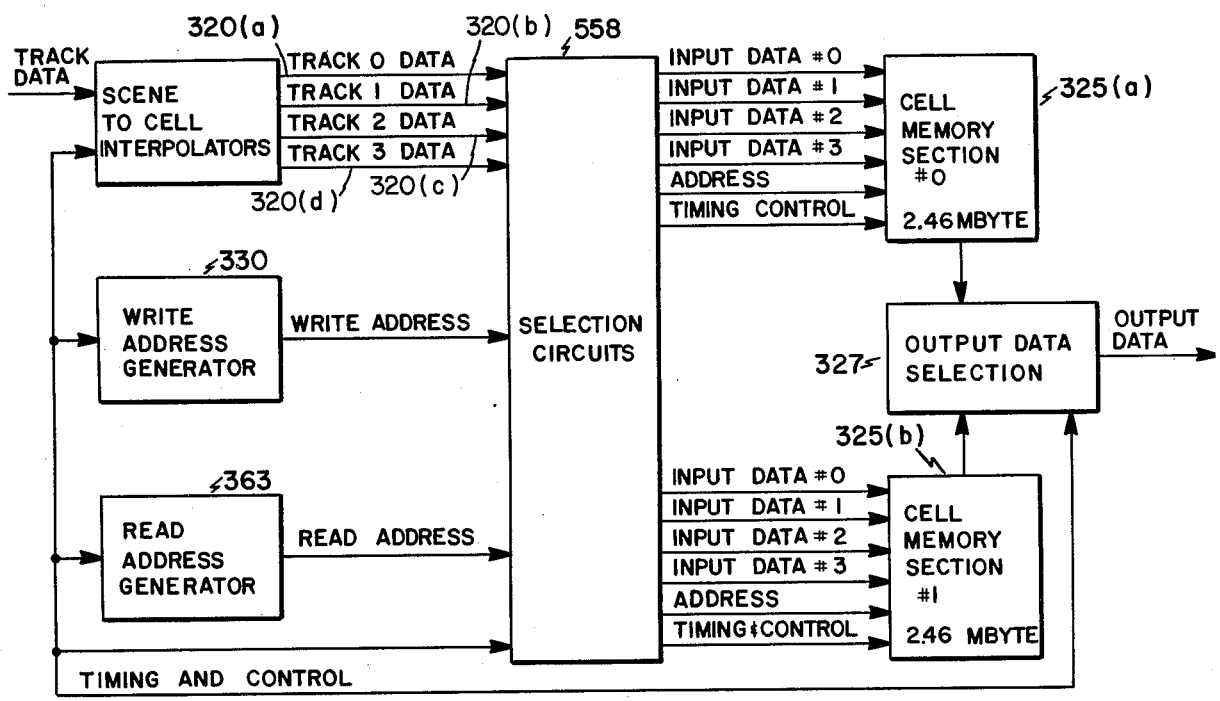
Figure 39:
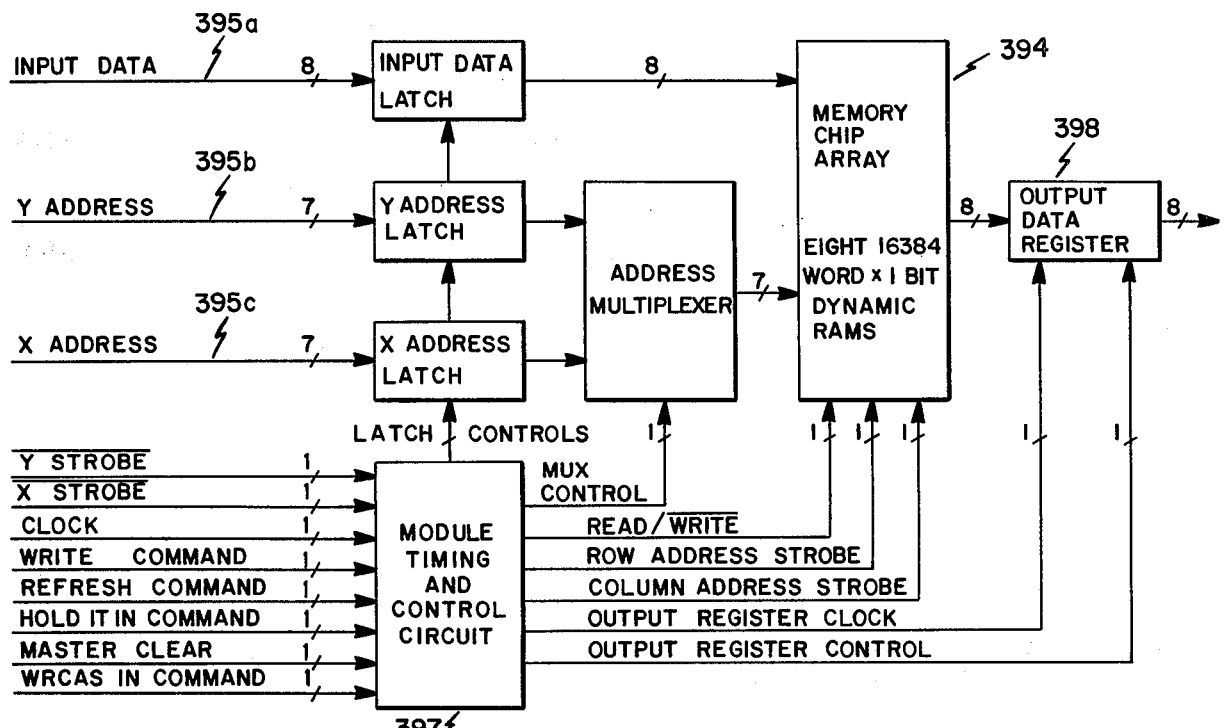
Figure 40:
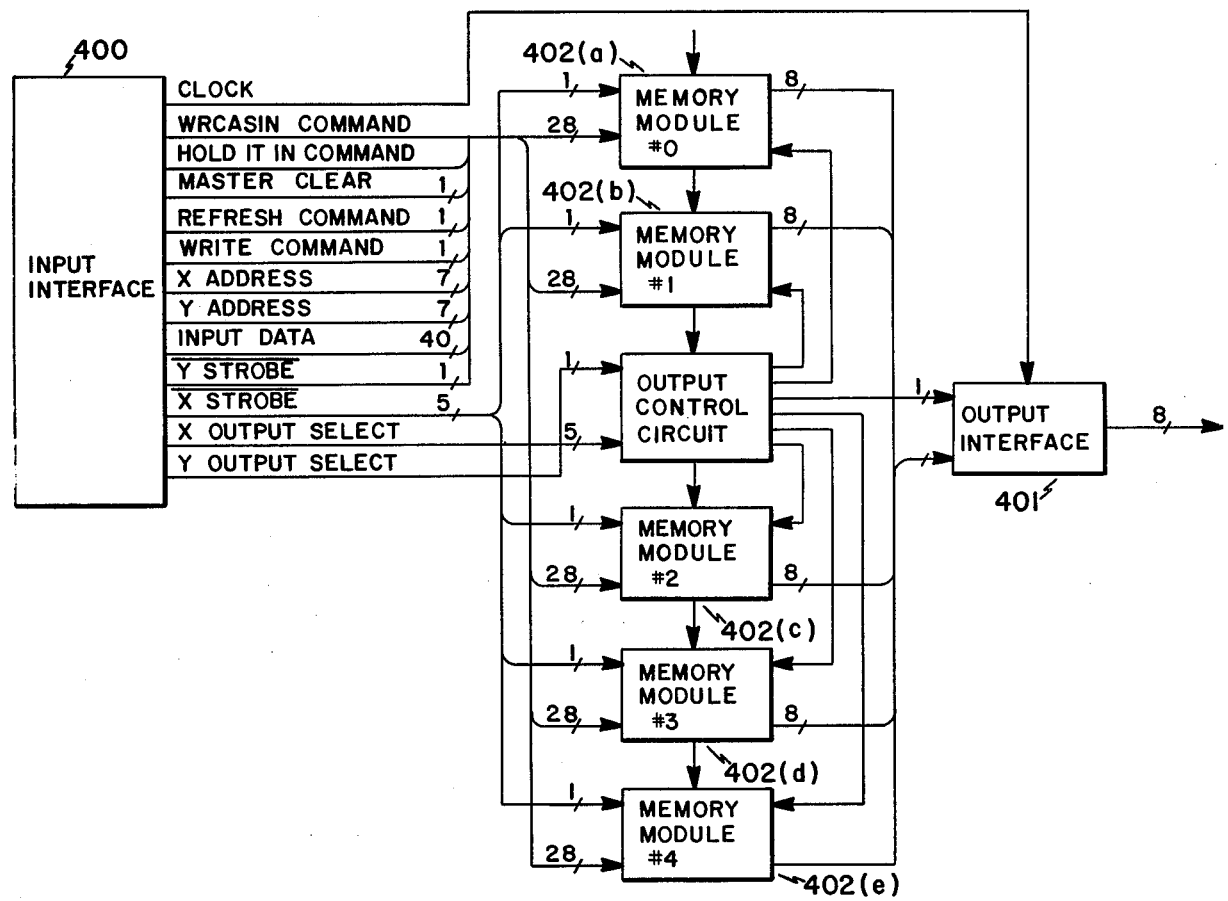
Figure 41:
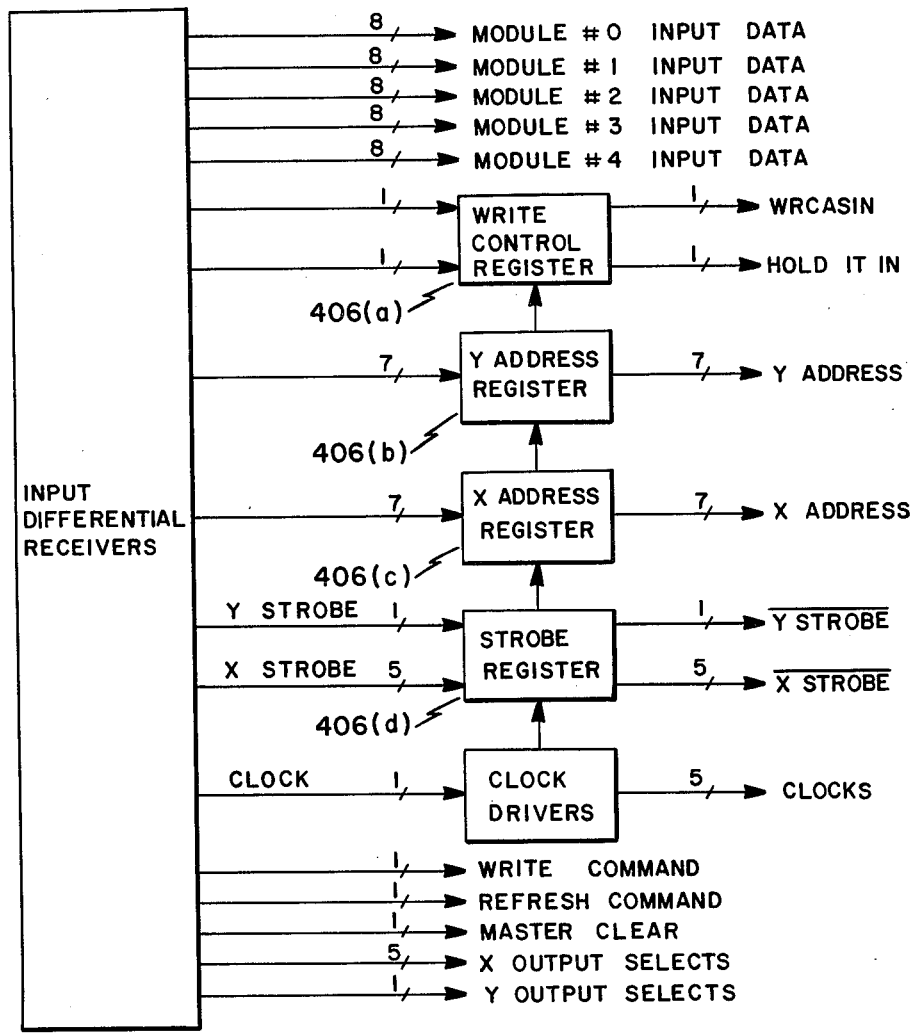
Figure 42:
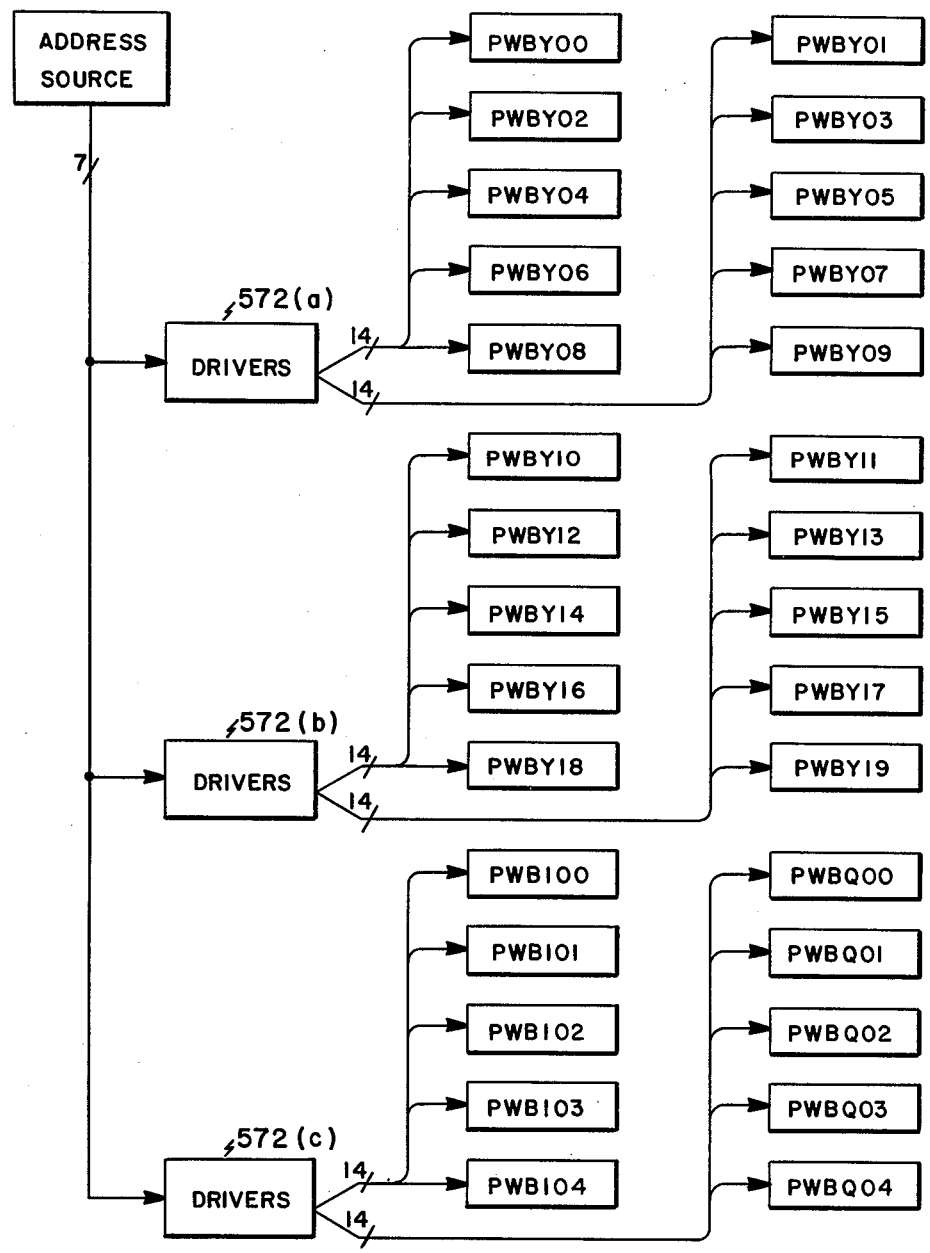
Figure 43:
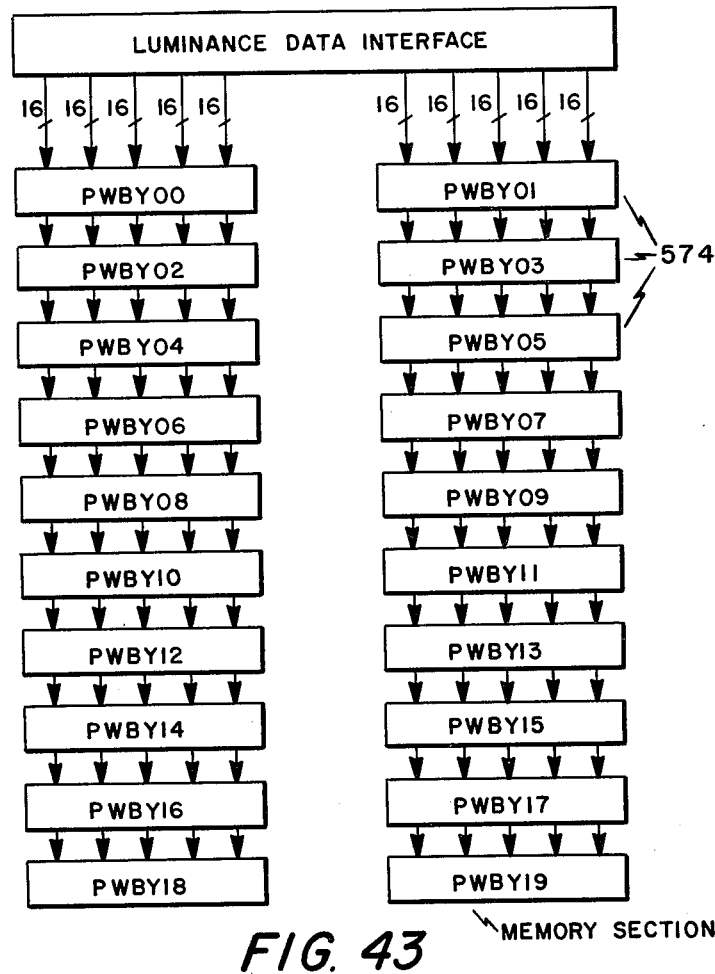
Figure 44:
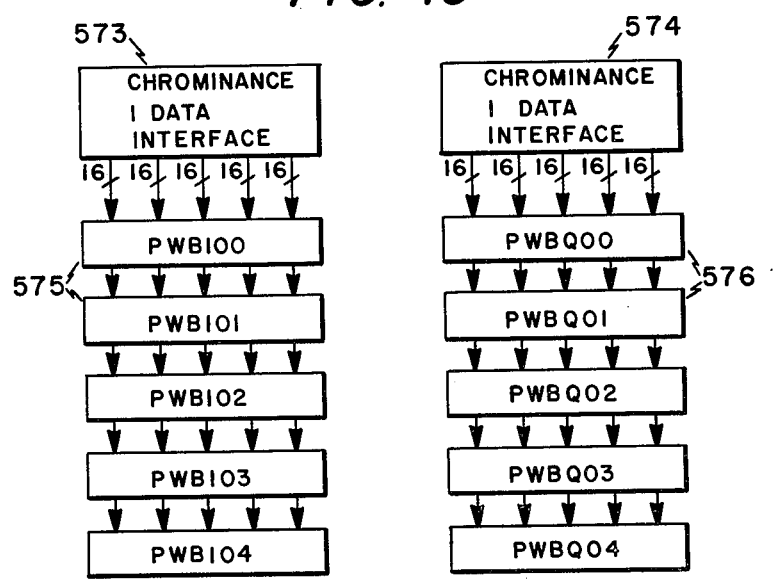
Figure 45:
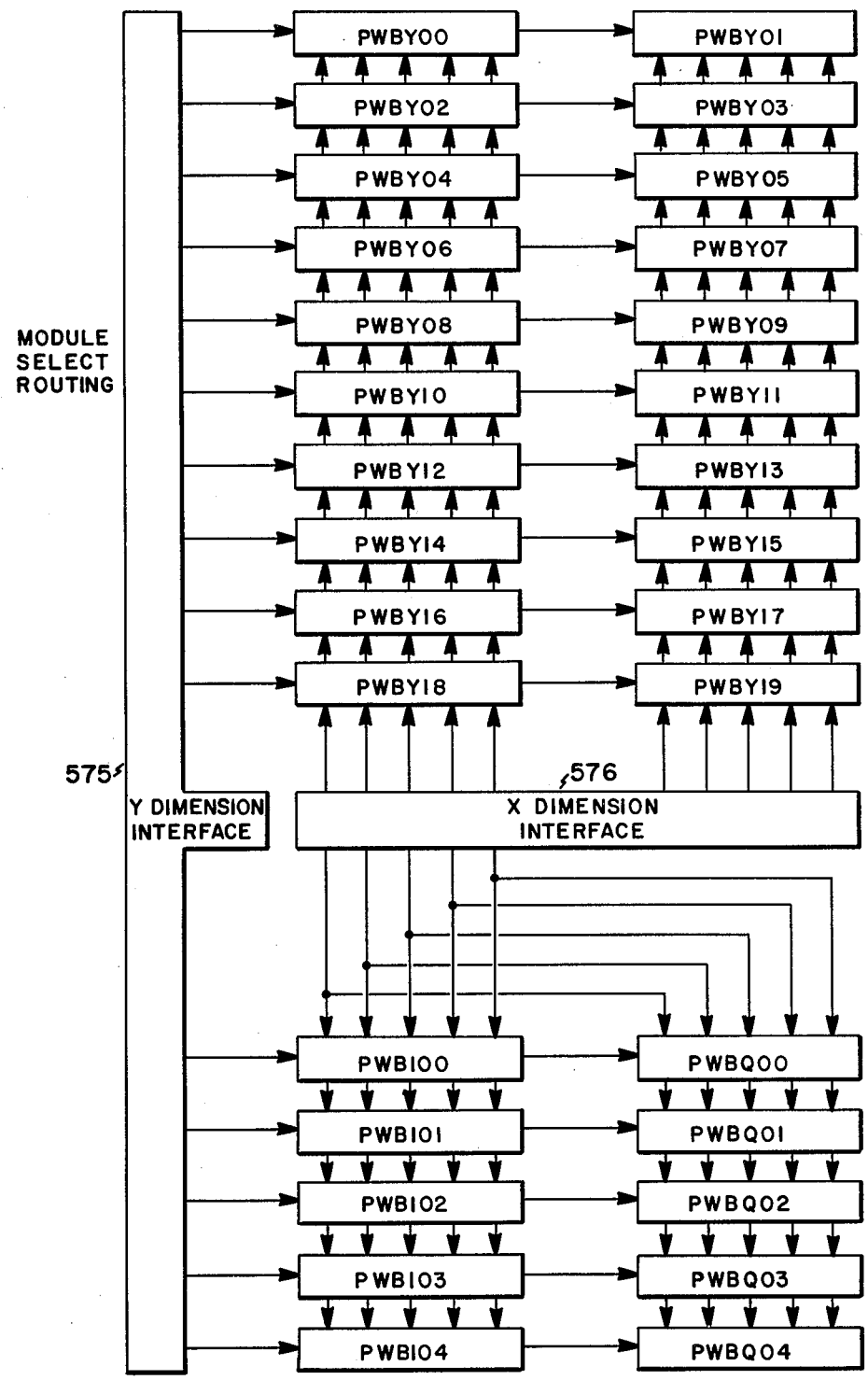
Figure 46:
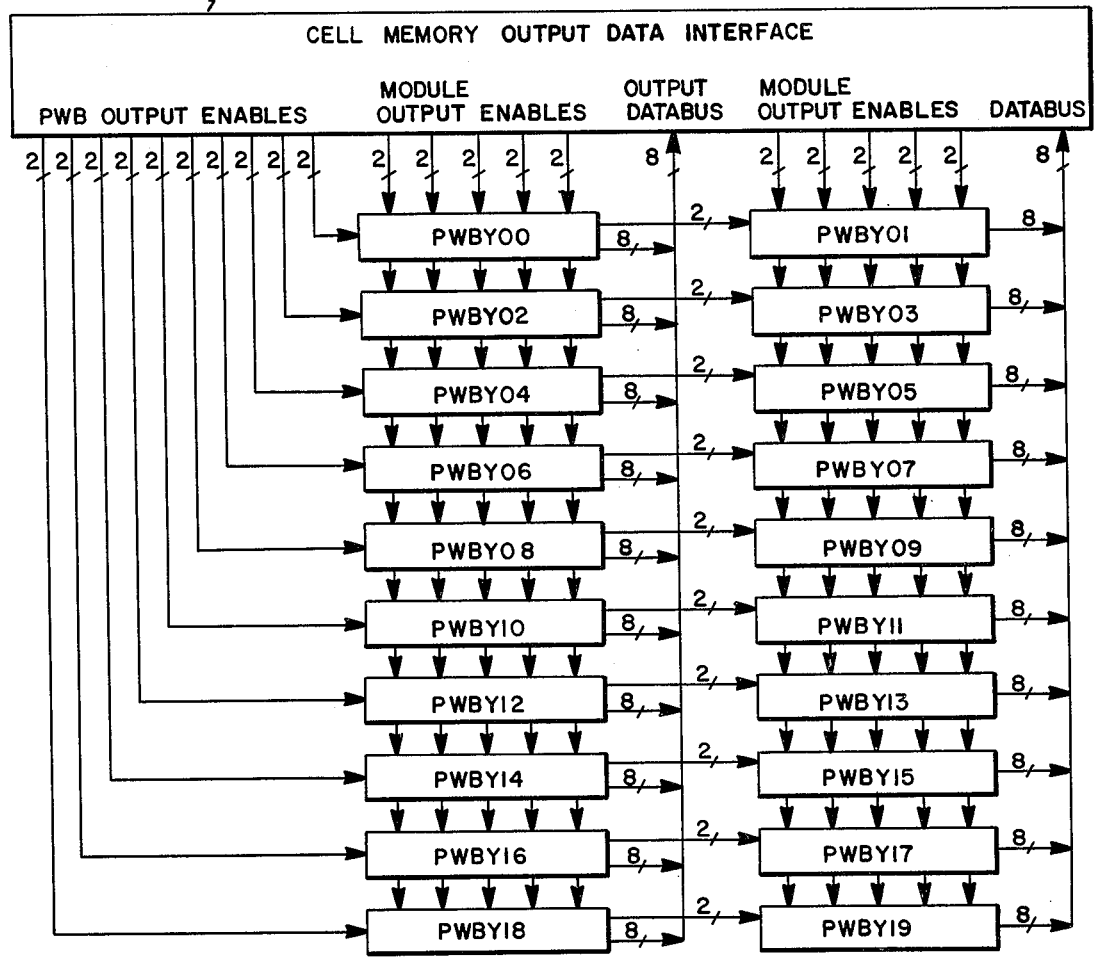
Figure 47:
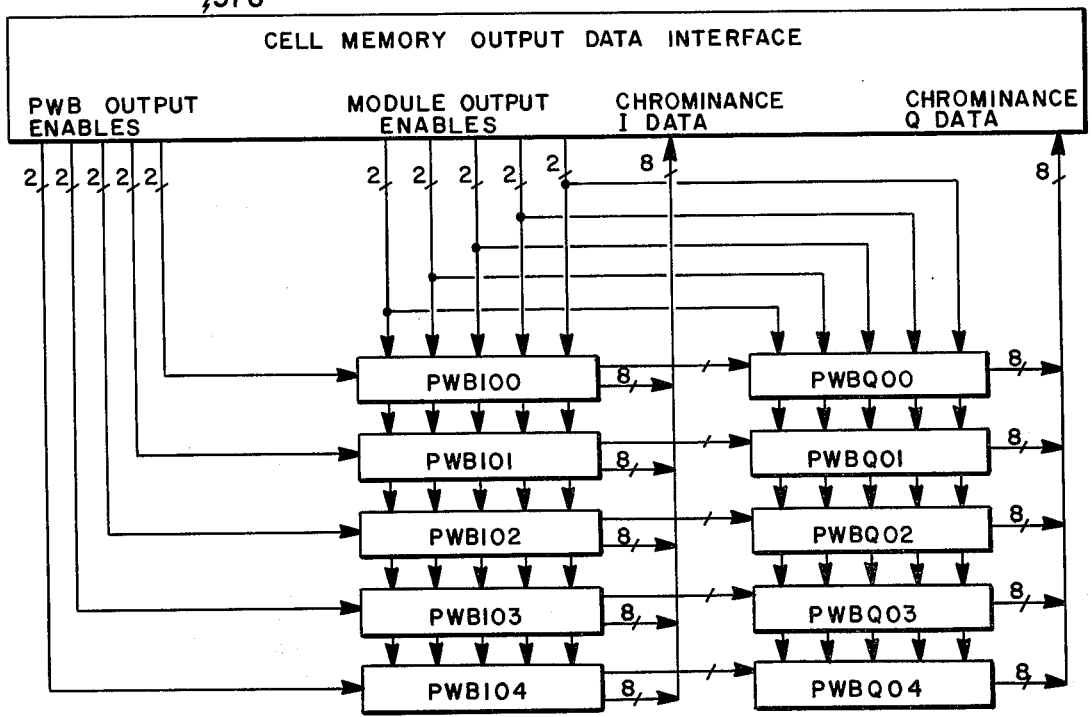
Figure 48:
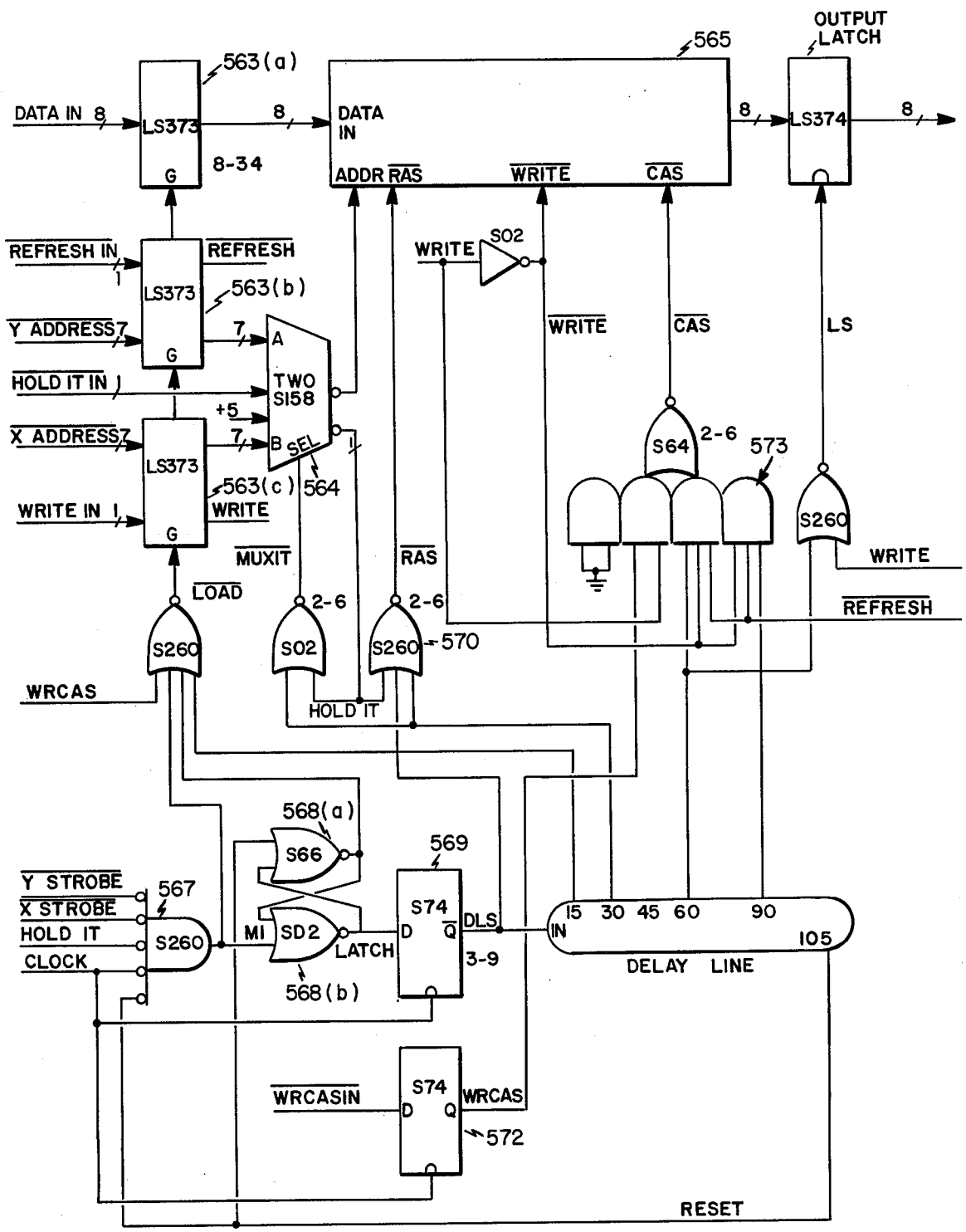
Figure 49:
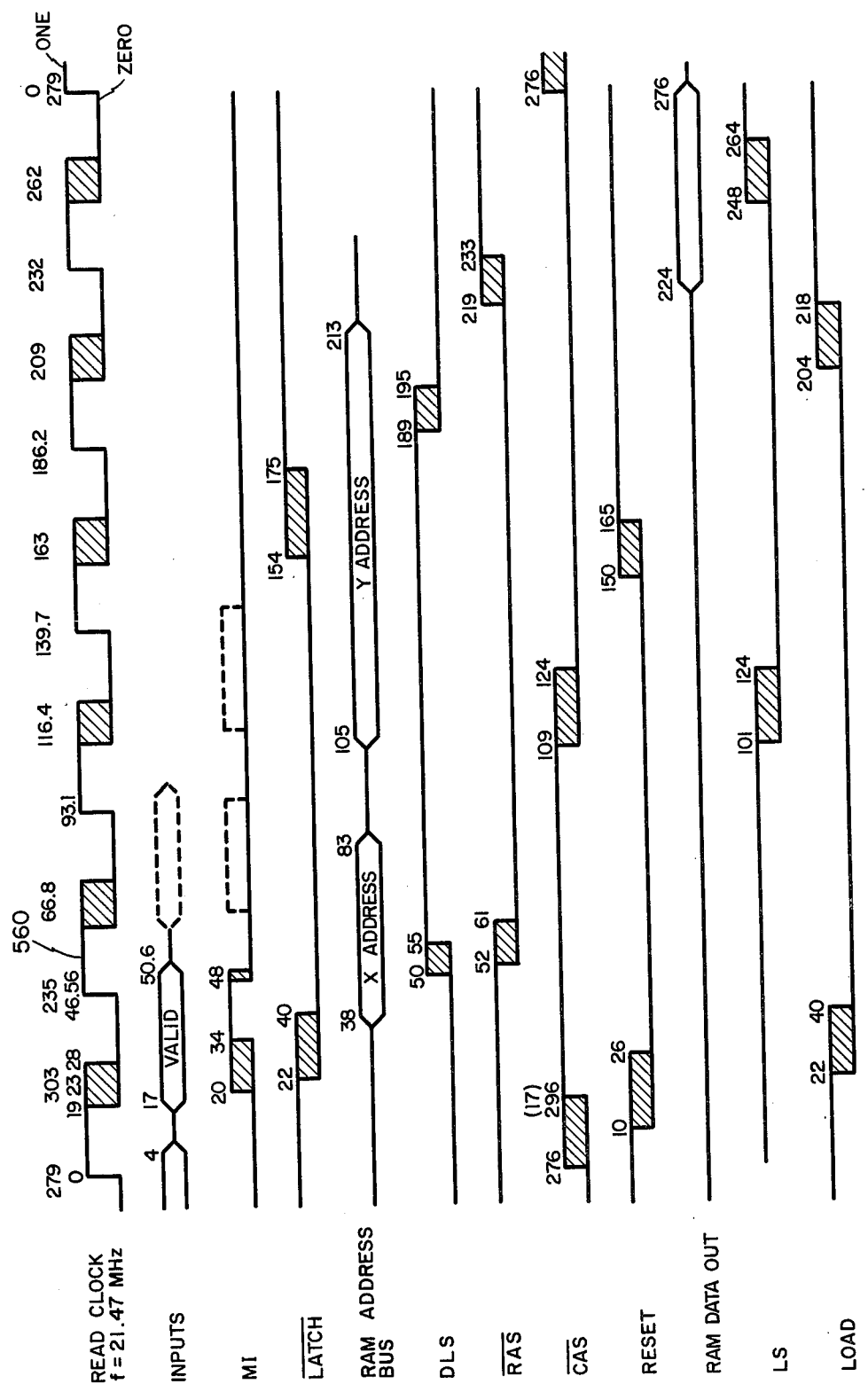
Figure 50:
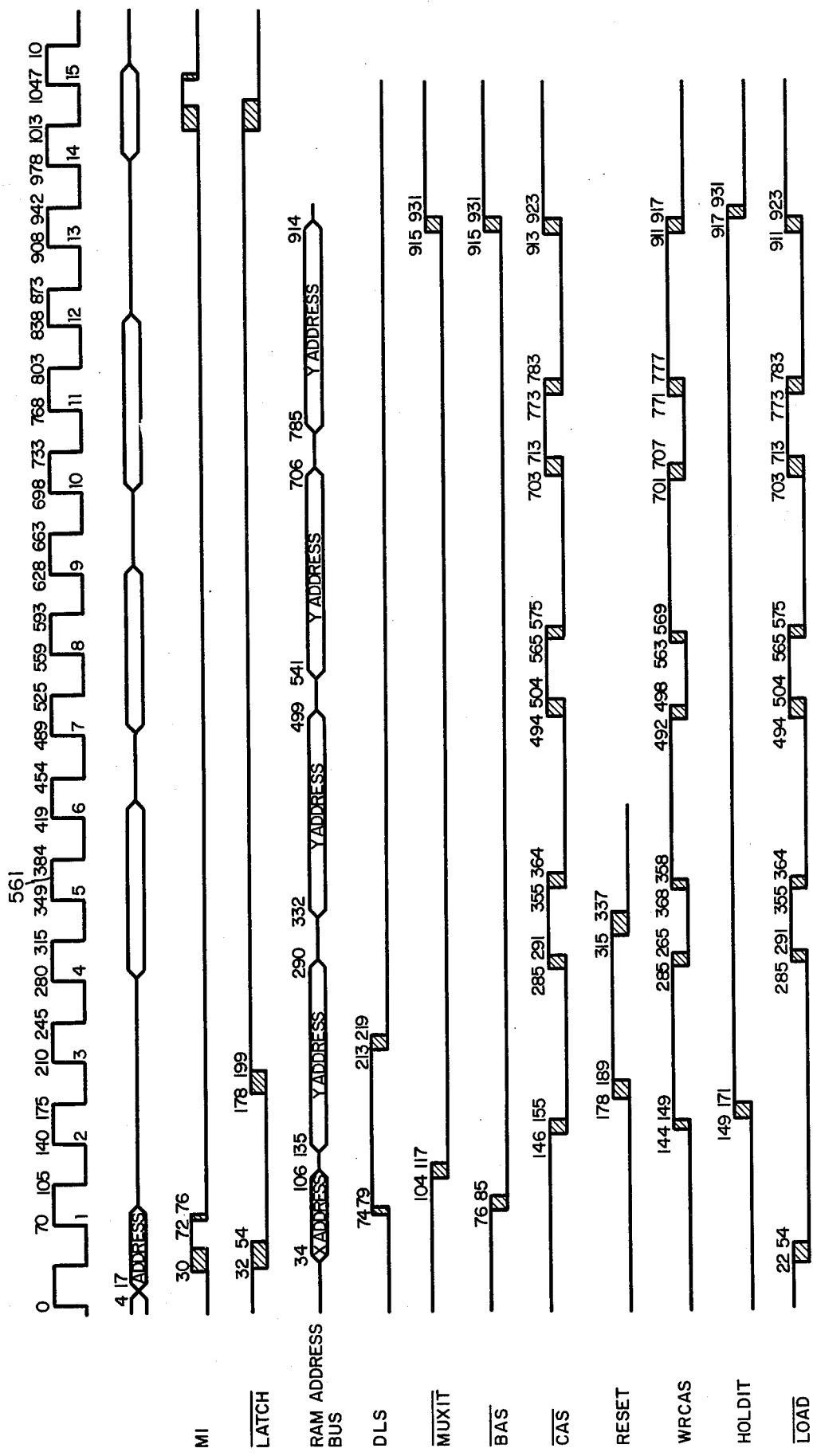
Figure 51:
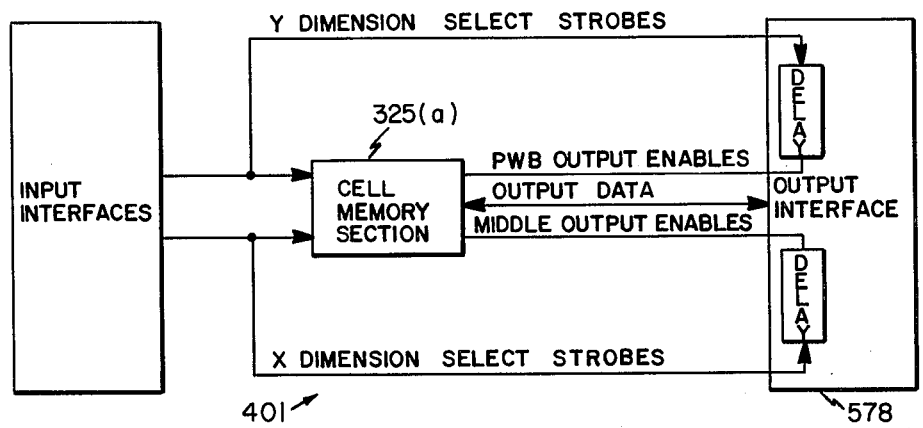
Figure 52:
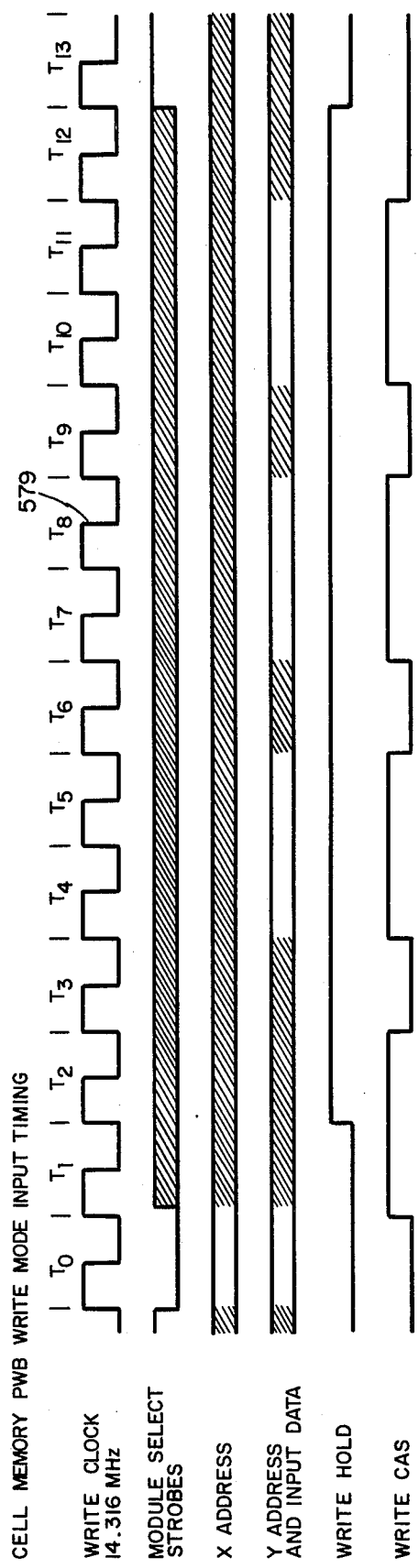

FIG. 19 is a diagrammatic representation of a simulator computer and control system;

FIG. 20 is a diagrammatic representation of the video storage system;

FIG. 21 is a diagrammatic representation of the video digitizer system;

FIG. 22 is a diagrammatic representation of the scene storage system;

FIG. 23 is a diagrammatic representation of the cell processor system;

FIG. 24A is a diagrammatic representation of the input interpolative curcuit; FIG. 24B is a graphical representation of the interpolator outputs;

FIG. 25 is a diagrammatic representation of a typical one of the digitizer channels;

FIG. 26 is a diagrammatic representation of the read address generator circuit;

FIG. 27 is a graphical representation of the lines and regions typically resolved by the display raster;

FIG. 28 is a diagrammatic representation of the output processor circuit of one cell processor system;

FIG. 29 is a diagrammatic representation of the haze and sky generation circuit;

FIG. 30 is a diagrammatic representation of the transverse filter circuit;

FIG. 31 is a diagrammatic representation of the longitudinal digital filter circuit;

FIG. 32 is a diagrammatic representation of the video clamping circuit of the time base corrector;

FIG. 33 is a diagrammatic representation of the chroma decoder section;

FIG. 34 is a diagrammatic representation of the window mapping coordinate system;

FIG. 35 is a diagrammatic representation of the cell memory address and read systems;

FIG. 36 is a diagrammatic representation of the cell memory section interfaces;

FIG. 37 is a table graphical representation of the luminance array memory module adressing pattern;

FIG. 38 is graphical representation of the luminance array memory module interleaving pattern;

FIG. 39 is a diagrammatic representation of a cell memory module;

FIG. 40 is a diagrammatic representation or functional block diagram illustrating the cell memory input/output interfacing;

FIG. 41 is a diagrammatic representation of the cell memory PWB input interface;

FIG. 42 is a diagrammatic representation of the address bus routing;

FIG. 43 is a diagrammatic representation of the luminance input data buses;

FIG. 44 is a diagrammatic representation of the chrominance input data buses;

FIG. 45 is a diagrammatic representation of the module select signal route interfaces;

FIG. 46 is a diagrammatic representation of the cell memory luminance array output interfaces;

FIG. 47 is a diagrammatic representation of the chrominance array output interfaces;

FIG. 48 is a diagrammatic representation of the cell memory and interpolative circuit;

FIG. 49 is a graphical representation of the cell memory read mode timing;

FIG. 50 is a graphical representation of the cell memory write mode timing;

FIG. 51 is a diagrammatic representation of the data output circuit from the cell memory section;

FIG. 52 is a diagrammatic representation of the cell memory output data circuit;

FIG. 53 is a graphical representation of the cell memory PWB write mode input timing.

For clarity of description, a preliminary summary of the major features of the recording and display portions of a preferred embodiment of the system is now provided, after which individual portions of the system will be described in detail.

Figure 1:
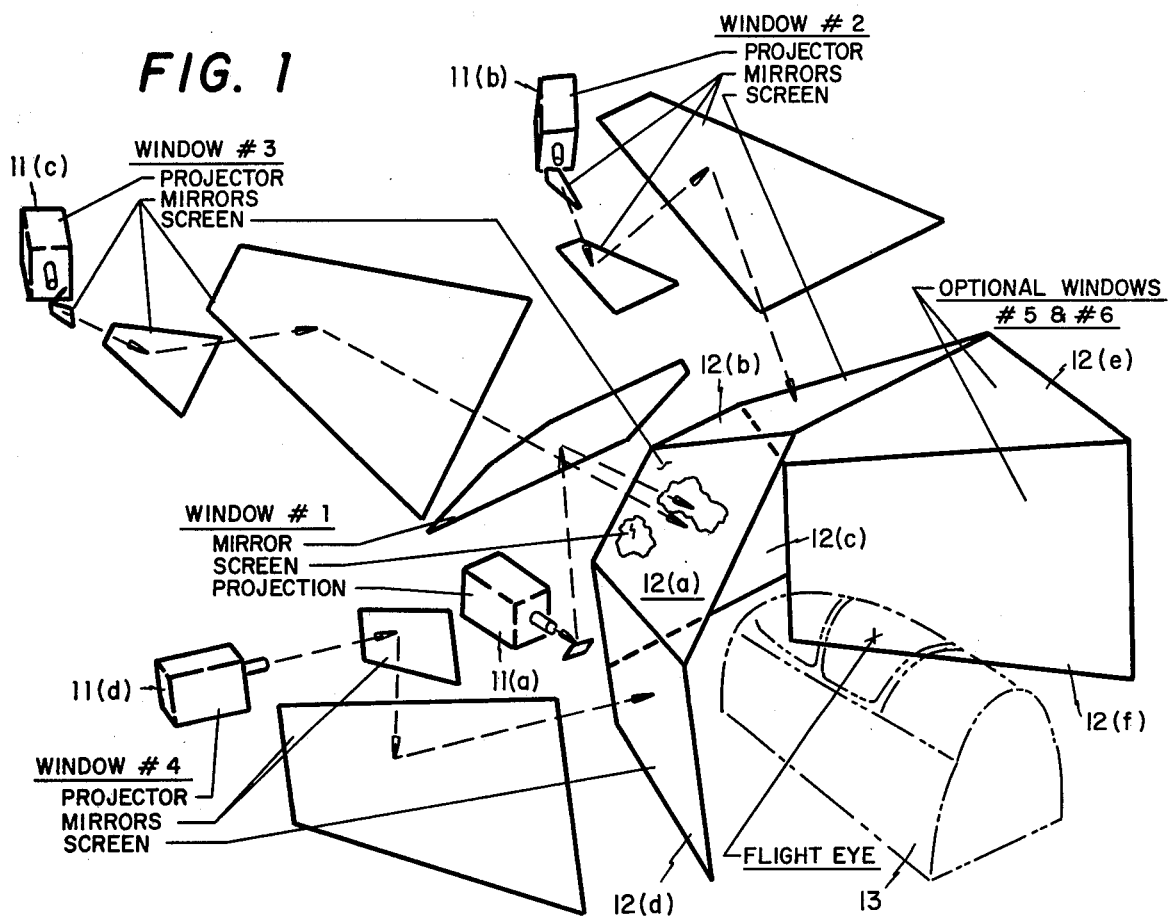
FIG. 1 is a perspective, partially diagrammatic view of the visual display portion of the system.
Figure 5:
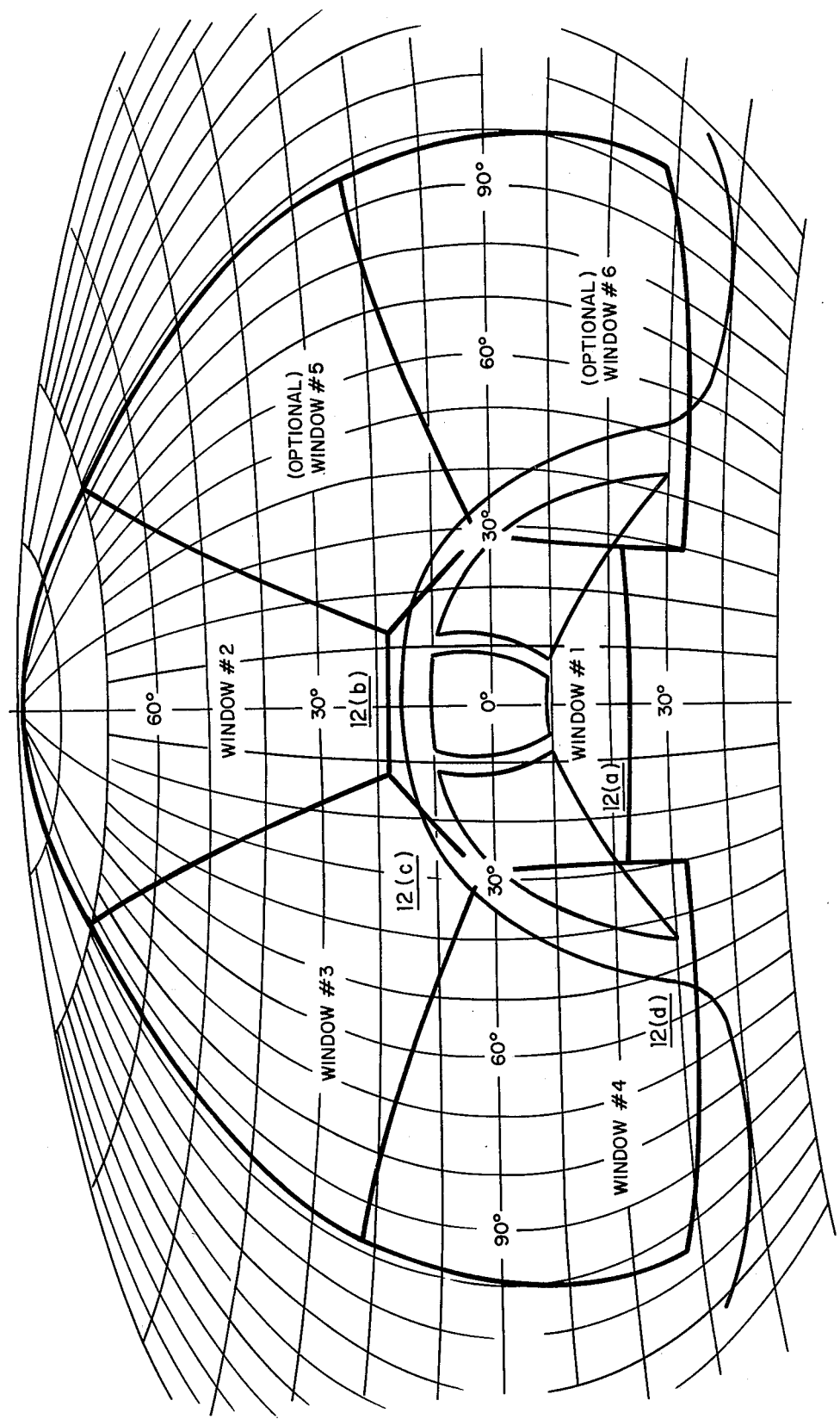
FIG. 5 is a representation of the fields of view visible from the cockpit.

The disclosed embodiment of the system as an aircraft flight simulator may be termed an "out-the-window" real world visual scene display system, and preferably employs multiple video discs for storing in NTSC TV format the visual information derived from aerial photographs of a "gaming area," i.e., the geographical area through which a simulated flight may occur. The use of video discs, or other high capacity storage media, as direct rapid access bulk storage devices is an immmportant factor in the system, which employs a series of discrete aerial photographs of the gaming area terrain as an initial data source. Each picture is electronically scanned and converted to time-base video data, which is processed into a digital television signal, and recorded and stored on video discs. When needed for display, the data are retrieved, electronically processed and manipulated to display the correct perspective view of terrain relative to the position and attitude of the simulated aircraft. The data base for the multichannel out-the-cockpit display is thus initially recorded on color film. The technical requirements for deriving real time visual images with multiple fields of view from a data bank comprising multiple images or scenes are substantial, as has been briefly discussed above. To permit real-time processing of visual information, it is advantageous to store the information electronically in multiple storage media, e.g., in multiple video tapes or disc recordings. Source data derived from high resolution photographs is preferred for realism, but the need for processing of the information necessitates its conversion into electrically encoded form. Technical difficulties are manifold because of the requirement for rapid recall of information in usable form to permit a nominal thirty frames per second reproduction of images for simulating moving scenes corresponding in real time to the path elected by the operator and, at the same time, providing the requisite massive storage of information contained in photographic images of the size and resolution required for scene realism. These techniques entail the selective retrieving, processing, and coherent display of visual images in color, suitably on multiple displays positioned adjacent the operator's seat or "cockpit," as shown in FIG. 1, at orientations corresponding to respective views seen through the cockpit windows, in a realistic, real time manner and corresponding to the "flight position" information input by computer or the operator. Such information includes the "real-time" simulated location of the simulated aircraft or vehicle, its velocity, azimuth, and attitude. The transition from information derived from one photograph, appropriate for a given set of inputs, to that appropriate for the next time sequence is also entailed. The display system includes a plurality of video displays e.g., TV projectors suitably directioned for projecting images on screens 12 positioned adjacent respective windows of the cockpit simulator 13. As seen in FIG. 5, views visible through the respective windows of the cockpit simulator 13 are appropriately "distorted" and selected from a quasi spherical overall field of view providing an appropriate perspective from the respective windows, as will be more fully understood from the description hereinbelow.

Figure 2:
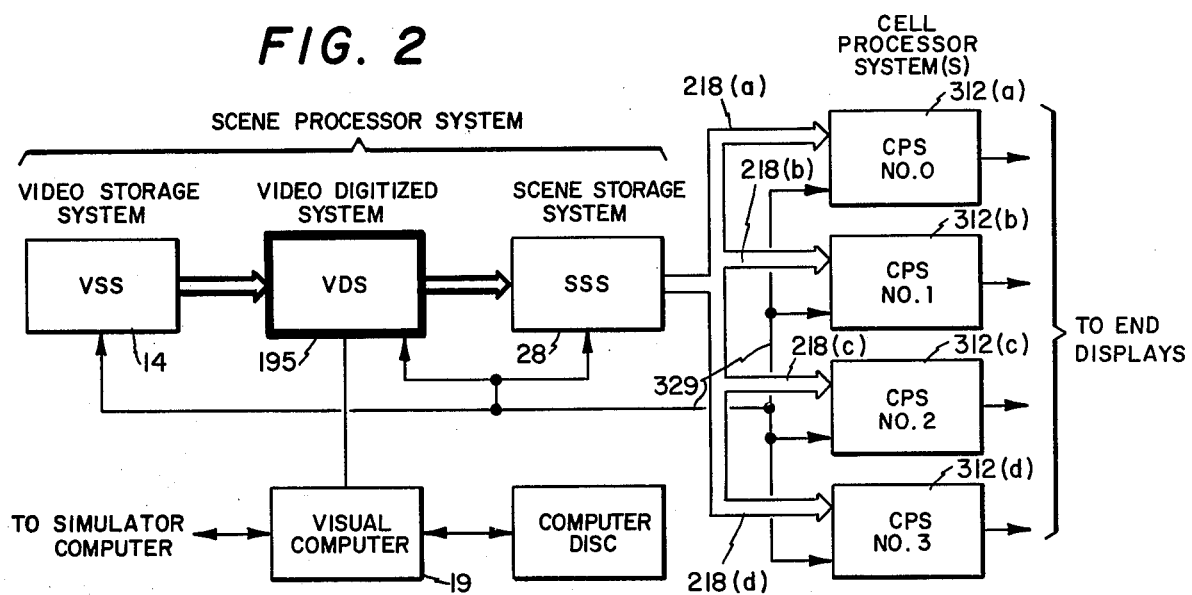
FIG. 2 is a diagrammatic representation of the image processing and display portion of the system.

As an overview of the visual on-line playback system, and with reference to FIG. 2, the playback system consists of a video storage system 14 which includes multiple video discs suitably played by disc playback units, not shown, having rapid frame selection, such as those manufactured as DiscoVision Model 720 by the Disco Vision Corporation. The discs contain the entire photograhic data base, i.e., photograhic images recorded sequentially and systematically throughout the gaming area. The video storage system 10 includes control interfacing with the control computer 19 for feeding desired portions of the information to the remainder of the system. As suggested above, massive amount of information is thus stored on the multiple video discs in standard NTSC television format, and it is not readily processed by electronic circuitry. Such processing is required, as will be understood from the description below, when coordinating the multiple inputs, derived originally from the pilots' controls, to the programmed and displayed images. As will also be understood from the description below, an important aspect of the present invention is its capability of selecting appropriate portions of the stored visual information for rapid processing to provide real-time playback, thus making compatible the requirements for both storage of required amounts of visual information corresponding to the geographical "gaming area," and at the same time, selective rapid processing of portions of the information as required for simulated real-time display.

Under control of a general purpose computer 19, suitably a Harris model 800 series, information from up to three of the video disc playback units, which information corresponds to the photograhic images, is simultaneously selected for retrieval. The playback units are synchronized under the control of the computer 19, and the disc units are actuated to play back information in National Television Standard Commission (NTSC) video format corresponding to the appropriate photographic image. The informtion is entered into a video digitizer system 195, FIG. 2, which, as suggested above, operates to take the analog information and perform color correction and time base correction functions to "fine tune" the information derived from more than one playback channel, for synchronizing it into a consistent image, and then converts the information into digital format. The requirement for digitizing the analog information relates to the need for permitting high speed digital processing techniques to be applied to the selected photographic data base extracted from the overall data base stored in the digital playback discs. This information is then stored in a scene storage system 28, which comprises a large capacity storage memory. Since up to three television frames of information, each comprising one sector of information from a photograph frame, are read at one time under control of the computer 19, the video digitizer system 195 and video scene storge system 28 select information segments from up to three of the discs, corresponding to the particular stored photographic information appropriate for the current position of the simulated aircraft, and feed this information into scene storage memory segments. Each segment of the scene storage system 28 stores in digital form information corresponding to a portion of one photograhic image. The scene storage system 28 serially records information pertaining to one or more scenes, i.e., relating to and capable of reproducing part or all of one or more of the photographic images recorded in the original photographic data bank.

Each segment of information corresponding to one photographic scene corresponds to a portion, e.g., a strip of a semi-spherical reproduction representing a fish-eye view or photograph. The scene storage system 28, under computer control, next reads and routes the appropriate portions of the information to the plurality of cell processor systems 312(a), (b), (c), (d), which portions correspond to the portions of the image to be projected from the image displays fed by respective cell processor systems which further process the information into a format suitable for driving the image displays, FIG. 1, of the visual display system.

Figure 3:
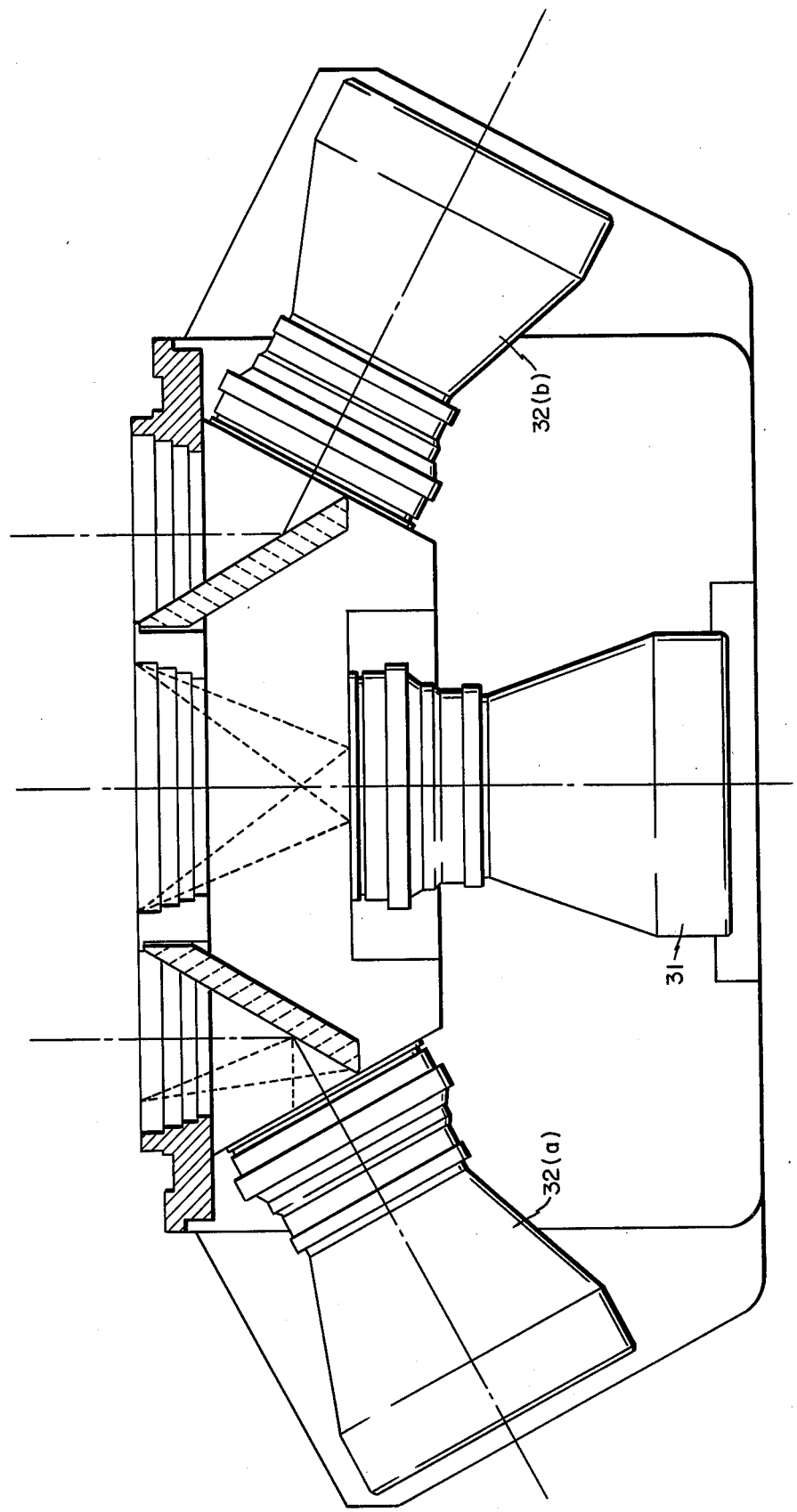
FIG. 3 is a partially diagrammatic, cross-sectional view of the lens system employed in the aerial camera.

Referring to FIG. 3, the lens system of the multi-lens aerial camera employed for producing the composite mosaic photograph for use in the recording system is shown in partially diagrammatic cross section. The lens system 36 consists of a wide angle center lens 37 normally directed vertically downwardly in use, and six oblique lenses 39(a), (b), (c), (d), (e) and (f), directioned along diagonal axes approximately 28 degrees from horizontal and angularly spaced, at approximately 60 degree intervals, concentrically around the center lens 38. The camera body itself, not shown, is a conventional roll-film aerial camaera body suitably having a $9\frac{1}{2} \times 9\frac{1}{2}$-inch field.

The camera is hexagon configured with six shutters and lenses spaced around the center shutter and lens for a simultaneous exposure of the $9\frac{1}{2}$ inch wide film for a slightly greater than hemispherical field of view. Each lens field of view (fov) overlaps the other and the entire composite wide angle fov encompasses 360°, 16° above the horizon. The camera is mounted in the hull of an aircraft and is suitably capable of making exposures at rates up to one per second under control of an intervalometer remotely mounted in the aircraft.

Figure 4:
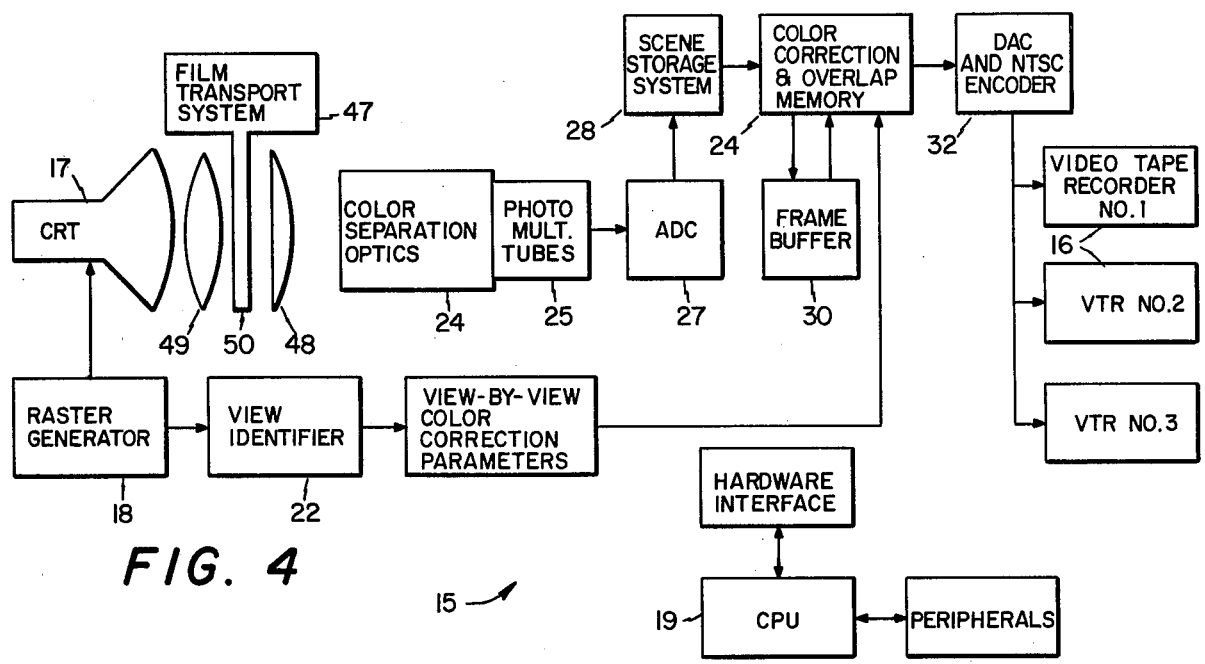
FIG. 4 is a diagrammatic representation of the image processing system.
Figure 6:
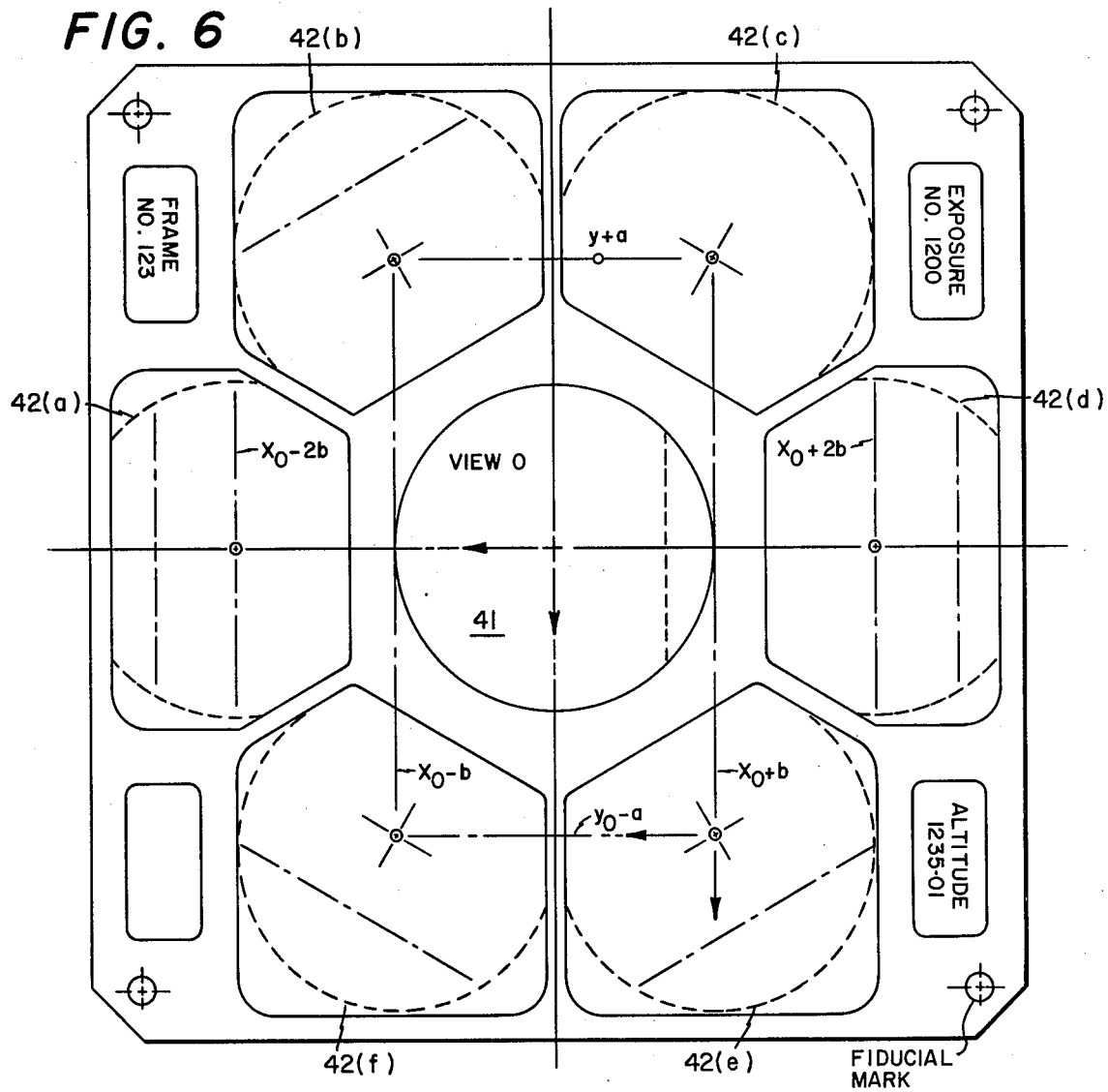
FIG. 6 is a representation of a film frame having multiple view segments.

The camera lenses are arranged to produce mosaic photographs, as represented in FIG. 6, upon a film frame 40 which includes photograph mosaics taken by each of the respective lenses, including a circular center view 41, and six oblique mosaic views 42(a), (b), (c), (d), and (e). The film frame 40 transparency is positioned in a film transport unit 47 as shown in more detail in FIG. 7, and during record processing is positioned adjacent a flying spot scanning cathode ray tube 17. Referring now to FIG. 4, the record processor system 15 serves, in essence, to scan the mosaic photograph film frame 40 produced by the multi-lens camera and provide usable data employable for forming an electronically simulated, single composite image from a film frame 40. The information is then stored in storage media, which suitably comprises the video tape recorders 16, in NTSC format. For compactness of storage and rapid access during playback, the information is then transferred, in analog NTSC form, from the tapes into a plurality of video playback discs.

Scanning the film frame 40 in the film transport 47 is accomplished by means of the cathode ray tube 17 in response to signals received from the raster generator 18 which, under control of the visual system computer 19, generates a pattern of high resolution scanning dots in accordance with a predetermined pattern, to be described, correlated with the seven view film frame pattern 40, and which are focused by lens 48 within the film transport unit upon the mosaic film frame 40. The film employed is suitably a negative transparency. The film transport circuit 47, as shown in FIGS. 7(a), 7(b), and 7(c), includes a supply roller 48 aligned with a corresponding take-up roller 49, for translating the film frames 40 across a film tray or holder 50 which is adapted to be positioned over the views while scanned by the CRT. Oppositely torqued servo motors 51(a), 51(b), maintain tension on the film, and "X" and "y" stepping motors 52(a), 52(b), respectively, drive corresponding worm screws for positioning the film holder in the "X"and "Y" axes relative to the cathode ray scanning tube. As a white scanning dot is scanned across the film 40, color separation optics filtering and lens array system 24 receive the scanned information and converts visible light patterns into red, blue, and green light information separated and conducted along respective axes, which discrete color signals are respectively sensed by first, second, and third photo multiplier tubes 25(a), 25(b), 25(c) (FIG. 1). Subsequently, the separate colors are channeled through separate processing channels, and the channels are fed through an analog-to-digital conversion circuit 27, which then feeds digital signals to a scene storage system 28, comprising a large capacity, digital semiconductor memory. The scene storage system, under computer control and in response to the signal generated by the raster generator 18, merges the multiple mosaic views into a single mosaic image scene for later use by the playback unit. The information stored in the scene storage system 28 is next processed by a color corrector circuit 29 under operator control to correct color distortions, and a frame buffer circuit 30 permits monitoring of particular portions of the overall scene by an operator. The corrected signal is then fed through an overlap memory circuit and a digital-to-analog encoder circuit 32, and is subsequently recorded in NTSC format by the video tape recorders 16.

Each video channel has the capability of being connected to any one of 16 players. All three channels operate independently of one another, under control of the master computer 19. Each video input channel is equipped with a digital Time Base Corrector (TBC). The purpose of these Time Basse Correctors is to time-base-correct and synchronize the outputs of the videodisc players. All three TBC's receive a common reference signal. The advanced reference output of one of the TBC's is used to rotationally synchronize the videodisc players. Each video input channel is equipped with an automatic color corrector which utilizes a reference signal to correct the chroma phase, chroma gain, master gain, and setup levels of the TBC output. This reference signal is generated during the data base generation process and accompanies the video data throughout the recording and videodisc mastering process.

To provide a functional overview of the system, the following description is now provided as a more detailed procedural summary prior to a consideration of the component elements in greater detail. As described above, the system converts discrete photographs into a time base electronically manipulated video pilot perspective for a real world display. Discrete photographs are made of the gaming area at various altitude spacings. A film edit system is used to identify and/or verify camera eyepoint locations, to catalog each photo with a unique number, and provide the ordering of the frame for disc mastering.

The flying spot scanner device breaks the photograph down into a mosaic of thousands of dots of varying intensities or voltages, when collected on the photomultiplier tubes. These voltages are fed into the video processor system for processing to convert the data to a format suitable for video tape storage and subsequent transfer to the video discs. The use of the video discs as a direct rapid access bulk storage device provides the means to interpolate and traverse the original photograph set from any altitude and heading within the original photographic corridor.

To create a realistic display for the simulator pilot, the original scene data is processed and manipulated for proper perspective. Processing steps provide the proper viewpoint and perspective compensation using dynamic magnification and interpolation techniques. Only a portion of the overall scene is displayed at any one time. The pilot has freedom of route and altitude within the gaming area. Transition from one photograph to another is smooth, and the perspective view is computed 30 times a second and moves smoothly in response to changes in position of the simulated aircraft as it flies through the area of the photographs.

The visual display includes a data base with high and low level navigation routes, and the display is a daylight scene in color with distinguishable scenery or geography. The total gaming area is, for examplme, approximately 1,500 square miles and extends from a few feet to 22,500 feet altitude in portions thereof.

The playback system is preferably equipped with sixteen on-line video disc players, any three of which are capable of being read simultaneously. Each video disc holds approximately 400 scenes for a total on-life capability of approximately 6,400 scenes. Laser-read video discs hold the on-line data base of pictures, providing random access to the scene of interest. A digital picture processor is provided for converting video information accessed from the video discs into display format. It consists of a Video Digitizer System 195, Scene Storage System 28 and Cell Processor System 312(*a*), (*b*), (*c*), and (*d*) as shown in FIG. 2. The Video Storage System (VSS) 14 is made up of the sixteen videodisc units. The discs are under control of the computer 19 and are capable of randomly accessing any of the stored scenes. The Video Storage System 14 feeds video from the selected disc units to the Video Digitizer System (VDS) 195. The VDS 195 has three independent channels, each of which accepts the analog video, digitizes, standardizes, and filters it, then digitally multiplexes it into a form suitable for the Scene Storage System (SS) 28, which provides fast storage of part or all of one or more color scenes. Its purpose is to buffer the scene currently being displayed between the relatively slow discs and the fast cell memories. The Scene Storage System 28 feeds the cell processors 312(*a*), (*b*), (*c*), (*d*) through a multichannel bus system. The Cell Processor System (CPS) 312 includes a respective processor 312(*a*), (*b*), (*c*), (*d*) for each window of the end display. Special effects, such as a Fresnel Lens Optical Landing System (FLOLS) and moving targets, are suitably generated and inserted for correct placement and perspective in the video stream to a single selected display channel.

Each cell processor 312(*a*), (*b*), (*c*), (*d*) stores the portion of the scene that its display window is operating in. From this stored scene data, the cell processor 312 generates a raster-scanned image, which contains the effects necessary to display the desired color view on the screen. These effects include rotation, perspective, eyepoint shift, magnification, sky generation, and haze generation. All the systems mentioned above are controlled by the video computer 19, which is linked to the host computer 512, as will be understood from the description to follow.

An important aspect of the data processing system is its progression from systems of large storage capacity and relatively long access times to succeedingly faster but smaller devices, achieving a maximum rate at the displays of one newly computed picture every 1/30 second for each display channel and for all simulated flight conditions within the data base envelope. Data base and picture processor sizes are minimized through judicious encoding of picture information, and through exploitation of the redundancies existing in the pictorial terrain being processed.

For the pilot's visual display system, any rastering display device is usable. A multiple channel rear TV projection system is suitable. As shown in FIG. 1, a typical projection system consists of six rear projection screens 12 arranged to collectively provide the pilots forward hemisphere field of view. The translucent rear projector screen is designed to provide uniform brightness over each screen area. Each display screen 12 has an associated TV projector 11 and folding mirrors arranged to provide the minimum overall system size. Each TV projector 11 is typically an 875 line color projector providing color imagery over the wide display field of view with high display resolution. In the display screen corners are located photodiode sensors that measure the position of projected targets (single bright pixels surrounded by a small dark field). The positional error of these targets reflects the real time distortion and alignment errors of the display system and is interfaced in real time with the cell processor system to continuously correct these errors, to minimize the edge matching and displayed scene geometry errors.

Each display's imagery is provided by a cell processor assembly 312(*a*), (*b*), (*c*), (*d*) which provides the 875 line color video signals. The cell processor assembly 312 is capable of providing signals with similar electronic bandpass to any display system with wide range fields of view and varied geometric shapes. The aerial camera, in exposing each frame processes several fiducial marks recorded on portions of each film plate, as shown in FIG. 6, for permitting subsequent photogrammetric analysis, for calibration of the scanning system relative to the film, and for positioning in the film transport the respective mosaic views during subsequent processing. In addition, a numerical scene identification number is recorded on each frame.

With respect now to the circuitry and apparatus for scanning the film plates 40, as discussed above, the primary purpose of the record system is to generate continuous color and geometry matched pictures from non-integrated raw photographic mosaic views, and to record them on video tape in a specific sequence for eventual use with the playback system. One of the segments of the record system 15 is the circuitry that determines the coordinates of points in the film plane, using the information from the coordinates of points in a pseudo-film plane. The term "pseudo-film plane" as used herein, refers to a two-dimensional coordinate system with a property that a mapping of the film frame plane to the pseudo-film plane generates an integrated, quasi-spherical, "fish-eye" scene. The term "film frame" refers to the square film sheet, nominally a nine-inch square area, of the original transparency in which seven views are recorded. The term "view" refers to the mosaic sub-areas of the film frame located in each of seven locations exposed by a single lens of the camera. The term "scene" refers to the data from all of the views on one film frame when integrated on the pseudo-film plane. The term "zone" refers to the portion of the scene that is stored on one NTSC frame or scene memory or video one disc track. Serial data as stored on magnetic tape is generated by scanning the pseudo-film plane 40 in the positive $X_F$ direction to form scene lines and in the positive $Y_F$ direction to form sequential scene lines. The term "segment" refers to that portion of a scene scan line which, after conpression, will be stored in one NTSC scan line time together with the line sync format and other data.

Referring to FIG. 9A, 9 perspective, diagrammatic view of the actual film plane is shown, and the raster scanning system is operative to convert this information into a pseudo-film plane, as shown in FIG. 9C, in which are stored all information for reproducing a pseudo-film image corresponding to the full scene field-of-view shown in FIG. 9B. The reason for the implementation of a pseudo-film plane image in the memory of the system, is that, it is impractical for a single lens to form an optical image having greater than hemispherical field of view with the resolution and with the short exposure time capability required. Referring to FIG. 9C, the coordinates of a point in the pseudo-film plane are given by $(X_F, Y_F)$. The coordinates of the corresponding points are denoted by $(X_E, Y_E,$ and $Z_E)$, on a unit sphere, and by $(X_S, Y_S)$ in the coordinate plane of the individual film view.

The result of the transformation is to transform position scanning information relating to the "F" or pseudo-film frame coordinates [FIG. 9(a)] to "S" coordinates, i.e., coordinates corresponding to the actual film frame. To accomplish this transformation, it is convenient to conduct an intermediate transformation in which each given point in the pseudo-film frame is mapped to the surface of a substantially hemispherical surface, FIG. 9B, centered about the theoretical optical node point of the camera, followed by a perspective transformation leading to the actual film frame. In addition, a $(2-Z_E)$ transformation term is included to uniquely map points which are close to and above the horizon. The need for this transformation derives from the inward projection of the spherical section above the horizon over the ten degree section below the horizon which would cause double-valued mapping of the spherical surface onto a plane for any simple projection mapping transformation. The $(2-Z_E)$ term also provides a resolution—equalizing mapping property such that the elevation angular metric on the sphere varies no more than two-to-one relative to the radial metric in the pseudo film plane over the full field of view of interest, e.g.; the mapping transformation conserves the resolution present in the film images. The mapping transformation implemented in the film scanning system applies the following operations to every picture element position, $(X_F, Y_F)$;

1. solution for pseudo film radial distance $$P = (X_F)^2 + (Y_F)^2$$

2. solution for $Z_E$ from the QUARTIC equation $$(Z_E)^4 - 4(Z_E)^3 + 3(Z_E)^2 - 4(Z_E) + P - 4 = 0$$

for the solution interval $0 \leq Z_E \leq 1.2$ and formation of the term uZ for that interval.

3. formation of the vector $$(uX_E, uY_E, uZ_E) = (X_F, Y_F, uZ_E)$$

4. Transformation of the scanning vector into a coordinate system having principal axes nominally aligned with the selected camera film view orientation and including the geometric effects of;
   a. Camera lens plate dimensions and angles
   b. Selected camera lens focal length
   c. Selected view orientation and position in the scanner
   d. Film linear dimensional values and sytematic errors
   e. Scanner system linear and rotational calibration values and systematic errors.
   f. Attitude of the camera
   g. Displacement of the camera from the desired picture-taking point at the time the photograph was exposed.

$$\begin{bmatrix} u\hat{X}_E \\ u\hat{Y}_E \\ u\hat{Z}_E \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} uX_E \\ uY_E \\ uZ_E \end{bmatrix}$$

5. Solution for the plane projective point $$\hat{Y}_S = \frac{Ku\hat{Y}_E}{u\hat{X}_E}$$

$$Z_S = \frac{Ku\hat{Z}_E}{u\hat{X}_E}$$

(k being a scaling constant)

Referring to FIG. 10, the typical pseudo transformation pattern is shown.

Referring to FIG. 10, each of the trapezoidal extensions 35A, B, C, D, E and F, correspond to the scanning patterns which have been determined in use to be optimally suited for one of the views 42 (a), (b), (c), (d), (e) or (f), of the film sheets, and the central, hexagonal pattern 35G is employed for the center view 41. This pattern of scanning was determined from the transformation equations just above and employing the circuitry discussed below. Referring now to FIG. 11, a pseudo-film coordinate generator circuit 60 includes input registers 61(a), 61(b), which receive computer information corresponding to initial X coordinates and delta X coordinates, and 62(a), 62(b) corresponding to initial Y coordinate address and delta Y information. The pseudo-film coordinate generator circuit 60 generates a scan as shown in FIG. 10. $X_F$ is the fast direction and $Y_F$ is the slow scan direction. The computer 19 supplies the initial values $X_0$ and $Y_0$, and the step sizes delta X and delta Y. These values are scaled so that the complete scene given on each film frame lies within a 2×2 coordinate square reference system when mapped into the pseudo film. The scanning mapping circuit operates at a 10.7 MHz nominal frequency. The input registers 61(a), 61(b), 62(a), 62(b), are each 24-bit input storage registers, each for receiving addresses as for respective point locations on the pseudo-film plane generated by the computer 19. The initial $X_S$ and $Y_S$ signals are fed to multiplex or selector circuits 63, 64, the outputs of which are fed to respective latch circuits 65, 66. The latches ensure that the signals are synchronized, and feedback loops 70, 71 return the $X_S$ and $Y_S$ signals to adders 72, 73. The $X_F$ latch is thus set to $X_0$ at the beginning of each raster line, and the $Y_F$ latch is increased by delta Y at the end of each raster line. $X_F$ is increased by delta X during each clock cycle.

An $(X_F)^2 + (Y_F)^2$ generator 75 is provided for squaring and adding the $X_F$ and $Y_F$ values. Two multipliers in parallel, each connected to the combined "X" output through respective 16-bit buffer amplifiers, are ping-ponged to provide $(X_F)^2$ to achieve the required 10.7 MHz rate. Their outputs are fed into a multiplexer 78 which is fed into an adder 80, the other input to the adder being connected through multiplier 81 to receive the buffered and squared Y signal from latch 66. Buffers 82A, 82B, 82C are connected between the inputs of the multipliers 76, 77, 81 and the outputs of the pseudo-film coordinate generator 60. When $(X_F)^2 + (Y_F)^2$ exceeds 1, a value of 1 is outputted to produce a continuous function corresponding to that portion of the pseudo film not containing scene data, and a CRT blanking signal is generated, as will be more fully described hereinbelow. The outputs of the adder 80 are conducted through "R" gate 83 to a $\mu Z_E$ circuit. The carry output lead 85 of the adder is also connected to the other side of the "R" gate, and to a latching circuit comprising first, second, third and fourth delay producing latching circuits 86A, 86B, 86C, and 86D. These latching circuits serve to delay the carry bit signal to a degree corresponding to delays produced in the $uZ_E$ circuit 84. The carry signal is generated when $X_F^{(2)} + Y_F^{(2)}$ exceeds 1. The purpose of the $uZ_E$ circuit is to generate the solution of the equation $$Z_E^{(4)} - 4Z_E^{(3)} + 3Z_E^{(2)} + 4Z_E + P - 4 = 0$$

for $Z_E$, and to further form the term $uZ_E$ where $$u = 2 - Z_E, \text{ for } 0 \leq Z_E \leq 1.2.$$

A direct closed form solution is not feasible for this quartic equation $Z_E$. Therefore, $Z_E$ is solved off-line, and a look-up table containing a piecewise linear approximation is created using first and second PROMs for solving the equations.

$$Z_E^{(4)} - 4Z_E^{(3)} + 3Z_E^{(2)} + 4Z_E + P - 4 = 0$$

Referring again to FIG. 11, the output $X^{(2)}{}_F + Y^{(2)}{}_F$ from the R gate 83 is fed through latching circuit 89 to address first and second PROM memories 90, 91. PROM 90 contains tabular information regarding the break point values of P versus $uZ_E$ and is suitably of 512×18 bits capacity. The second PROM 91 has tabular information regarding the corresponding slopes of the curve P versus $uZ_E$, and is suitably of a 512×9 capacity. Information regarding the slope from PROM 91 is conducted to multiplier 92 and simultaneously multiplied by information derived directly from the latch 89 regarding which is, again, $X_F^2 + Y_F^2$. The input to latch 89 comprises an 18 bits p value, and it is divided at latch 89 into a "9 most significant bits" signal which is fed to PROM 90 and a "9 least significant bits" signal which is fed directly to multiplier 92. PROM 90 gives the break point value, or approximate value of $\mu Z_E$ which is then fed through latch 93 and latch 94 to the adder 95. The break point value of p is also fed into the 9-bit input to the PROM 91 which provides from its memory the local slope, which is then fed through multiplier 92 and which, when multiplied by the least significant 9 bits of P, provides the correction to the break point value which is fed into adder 95, and which when thus added to the break point value gives the correct value of $\mu Z_E$. The signal $\mu Z_E$ is then fed through latching circuit 96 to a selector 100. Selector 100 has a second input which receives, when needed, a test input from the computer, and in normal operation, it merely passes the input from latching circuit 96.

Referring to FIG. 9, coordinates ($Y_s$ and $Z_s$) are expressed in a coordinate system which is centered on and relative to the flying spot scanner/optics/film handler coordinate system. Each view of the film frame is mechanically positioned so as to nominally center on the scanner axis prior to scanning that view. A 3×3 matrix system permits location of the scanning inputs relative to each view on the overall film plane, and for implementing the other mathematical operations described above for the matrix operator. Referring to FIG. 11, an input register 102 receives from the computer one of seven 3×3 matrices which correspond one to each view to be scanned. The register is a nine word AIJ register, each word being 16 bits long. The output from the input register 102 is fed to respective ones of a group of nine multipliers 104, 105, 106, 107, 108, 109, 110, 111, 112, which are part of a 3×3 matrix multiplier circuit 114. The matrix multiplier circuit serves to perform a 3×3 matrix transformation on the $\mu X_E$, $\mu Y_E$, $\mu Z_E$ information according to the relationship $$\mu \hat{X}_E = A_{11}\mu X_E + A_{12}\mu Y_E + A_{13}\mu Z_E \tag{8}$$

$$\mu \hat{Y}_E = A_{21}\mu X_E + A_{22}\mu Y_E + A_{23}\mu Z_E, \tag{9}$$

and $$\mu \hat{Z}_E = A_{31}\mu X_E + A_{32}\mu Y_E + E_{33}\mu Z_E. \tag{10}$$

The values of $AI_J$ are calculated by the visual computer, and output prior to scanning each view of the film mosaic. These values are supplied by the computer on a view-by-view basis. The multipliers 104 through 107 are loaded with "A" matrix elements, and then information is entered from the selector 100 regarding $UZ_E$ which is sent to multipliers 106, 112, and 109. Information regarding $X_F$ (which is the same as $\mu X_E$) is received through multiple latches from latch 65 and fed to multipliers 107, 110, and 104. Similarly, information regarding $Y_F$ (which is the same as $\mu Y_E$ is received from latching circuit 66 through multiple latches to multipliers 105, 112, and 109. Adder circuits 117 receives a inputs from multipliers 107, 108; adder circuit 118 receives inputs from multiplier 110, 111; and adder circuit 119, multipliers 104, 105, input respective latching circuits, and the outputs of which are added to information received from multipliers 109, 112, and 106, respectively, and fed through suitable latching circuits to adder circuits 124, 125, 126, which also receive information from multipliers 109, 112, and 106, respectively, for completing the matrix multiplication operation. The output of adder 124 represents $\mu \hat{Y}_E$; the output of adder 125 represents $\mu \hat{Z}_E$; and the output of adder 126 represents $\mu \hat{X}_E$. In operation, the scan coordinates are obtained by performing a projection operation according to the equations.

$Y_S = \mu \hat{Y}_E$ (divided by) $\mu \hat{X}_E$ $Z_S = \mu \hat{Z}_E$ (divided by) $\mu \hat{X}_E$.

In the implementation shown, the reciprocal of $\mu \hat{X}_E$ is evaluated by a piece wise linear approximation with break point values and slope stored in PROM circuits of a table look up function evaluation circuit 129 which is similar and analogous to the $\mu Z_E$ table lookup circuit 84 previously described. Information regarding $\mu \hat{Y}_E$ is fed from adder 134 through multiple latching circuits to a first multiplier 131 of the projection circuit. The second input of the multiples 13/is from the table lookup function generator evaluation circuit 129, whose output is a reciprocal of $\mu \hat{X}_E$ whereby the output of multiplier 131 is $Y_S$ which is the Y value of the scanner coordinates. The second multiplier 132 receives information regarding $\mu \hat{Z}_E$ from the adder circuit 125 along with information provided from the table lookup function evaluation circuit 129, and its output represents $Z_S$ of the scanner coordinate system. The visual computer provides a value to be added to $Y_S$ and $Z_S$ to align the raster with the film image. $Y_S$ bias is entered into $Y_S$ bias register 134, and $Z_S$ bias entered into $Z_S$ bias 135 register 135, and conducted to first and second bias adders 137, 138, whereby the bias signals are appropriately added to the raw $Y_S$ and $Z_S$ signals. A computer monitoring circuit 139 is connected to the outputs of adder circuits 137, 138 for monitoring $Y_s$ and $Z_z$ as required.

Referring to FIG. 9a, 9(c) because the pseudo-film image is divided into seven segments corresponding to the views seen from the seven lenses, and because the raster generator scans the entire pseudo film plane without regard to the particular view through which the scanning dot is passing, a separate circuit 141 (FIG. 3) is provided for identifying the particular view which is being scanned at any given moment. The output of the view identifier is compared with a view select code from the computer, as will be described, and information derived from this comparison is fed through a write enable line driver 143 to the scene storage system memory for enabling the scene storage to write information being received at that time period from the photomultiplier tubes in response to the scanning of the film view currently positioned for scanning, and no other.

The PROM 163 assigns a unique three-bit view label to each view. When this label matches the three-bit view select code supplied by the computer, a write enable signal is generated and data is stored in the scene memory 28. Video is directed by the computer to the scene memory tracks that are selected for the zone that is being scanned. It is also delayed by an amount sufficient to compensate for other delays between the pseudo-film coordinate generator 60 and the data input to the scene memory. Included in these delays is a two microsecond delay in the cathode ray tube deflection driver system. As successive views are scanned, each complete zone is assembled in three tracks (each track holding one zone of one color, R, G, or B) of the scene memory. The view label is also used to select the color correction parameters view-by-view during read-out of the scene memory for recording on tape. Thus it operates at 10.7 MHz and is timed so as to partition the pseudo-film plane always along the same boundaries whether reading or writing. This partitioning defines the "joints" between film views during and after assembling the full scene comprising the "pseudo-film."

With respect to the raster generator timing, the clock rate is made as large as possible consistent with circuit and scanner system hardware constraints. A retrace interval is provided to allow for CRT deflections settling time. A blanking signal is provided during retrace to prevent CRT phosphor damage. Compensation for deflection system delays by scan video processing delays is provided to ensure that the scene memory write signal, scene memory write clock, and data are properly synchronized.

Color separation optics 182 which comprise red, blue and green dichroic mirrors are positioned in the optical train, for separating the color information derived during scanning of the film. Respective photomultiplier tubes 183, 184, 185 are positioned to collect the red, green, and blue emitted signals, respectively, for providing electrical signals indicative of the respective color intensity. The output signals are fed through a low noise amplifier 186 and through aperture correction circuitry 187, successively through an A to D converter 188.

The three photomultipliers generate signals proportional to the red, green, and blue light intensities transmitted through the film. The gain of each PMT depends upon its anode voltage, under computer control. A preamplifier drives a cable which carries the signal from the optical section to the video processing section. The low pass filter 156 is provided, for each of the three channels, which bandwidth limits the signal to below the Nyquist frequency corresponding to the maximum pixel rate. Provisions are provided for further band width reduction when lower scan rates are used. The resulting signals are buffered, having blanking inserted, and provisions are made, through the use of a low pass filter circuit 190, for further band width reduction when lower scan rates are used. Resulting signals are accessible to the operator's console for observation on an XY monochrome cathode ray tube monitor. The green signal alone is used for film frame label identification.

The view identifier information is also fed through data path 145 to the gamma map and to the luminence and color correction circuitry 146 for permitting selection of the appropriate gamma map luminance, and color corrective data for each pixel read from the scene storage system 28. Referring to FIG. 9(c), $VS_2$ is the distance between the center of the hexagonal center view and its top boundary, $VS_2$ is the distance between the left corner of the hexagonal view and its top left corner, and $VS_3$3 is the width of the hexagonal view. Knowing the regular hexagonal configuration, then it follows that $$VS_2=(1/\sqrt{3})(VS_1), \text{ and } VS_3=(2/29\ 3)(VS_1).$$

Then $$X_F = VS_3 - (1/\sqrt{3}) \times Y_F,$$

and $$X_F = (1/\sqrt{3}) \times Y_F.$$

The latter two equations correspond to straight, diagonal lines which are used in defining the boundaries between the respective views. The nominal hexagonal view boundaries in the pseudo-film plane described mathemetically above, and in implentation below, may be varied by selection of constants and more generally by providing computer control to variously assign portions of providing computer control to variously assign portions of the pseudo-film area to corresponding film views.

Referring to FIG. 13, first and second data buses 152, 153 provide 13 bit numbers representing $Y_F$ and $X_F$ to the exclusive NOR gate arrays 148, 149. Because of the symmetry of the hexagonally laid out view, the exclusive NOR gate 148, 149 can determine the absolute values of $X_F$ and $Y_F$. The output of NOR gate 149 is fed to multiplier 150 and multiplied by a signal proportional to a constant representative of the value of the reciprocal of the square root of 3, e.g., $X_F=(1/\sqrt{3})Y_F$, The output is conducted to comparator 151 where it is compared with the absolute value of $X_F$ received from NOR gate 148, comparator 151 generating a signal indicative of whether the absolute value of $X_F$ is greater or less than the signal received from the multiplier 150. Second comparator 152 compares the absolute value of $X_F$ with a quantity received from adder 153 representative of $V_S{}^2$ minus the absolute value of $Y_F$ divided by the square root of 3. The output from comparator 152 indicates which of the input siganls is greater. Similarly, the third comparator 155 receives inputs from the exclusive NOR gate 149 and from input gate VSI 156 from the computer. Input register 156 gives information regarding VS1, and the other input comparator 155 provides information from exclusive NOR gate 149 regarding the absolute value of $Y_F$. Similarly, input 150 provides an input corresponding to VS3 to the adder circuit 153. The outputs of the three comparators 151, 152, 155 are fed to the view label PROM circuit 163, along with the sign values of $X_F$ and $Y_F$, the PROM memory 163 having been programmed with tabular information which is employed to determine from the input information which view is being scanned at any particular moment. The output from the prom is fed to a delay latch to a comparator circuit 164 which also receives an input via data 165 link from a computer register 166. The visual computer maintains information regarding the current view being scanned on the photographic transport plane, and it feeds information, through the view select register 166, indicative of the respective frame being scanned on the film transport. The comparator compares the view select information from the visual computer with the raster scanning information representing the momentary position of the scanning dot, and provides an indication when the scanning dot is within the boundary of the view. This information is delayed and synchronized in a delay and synchronization timing circuit 164, which synchronizes video information with information received directly from the PROM circuit 163, and delays the output through output line 167. Output 167 is connected to the differential line driver 143, which enables the scene storage system 28 to write into memory, the delay serving to synchronize the input from the comparator 164 with the video signals derived from the CRT through the photomultiplier tubes.

The rastering position command signals are determined by the "Y" and "Z" adder circuits 137, 138 whose outputs are latched and fed to digital-to-analog converter circuits 169, 170, respectively, whose outputs are fed through leads 171, 172 through first and second low pass filters 173, 174 which, in turn, are inputs to the analog deflection driver circuitry 175 provided for driving the cathode ray tube 176. An analog beam intensity control circuit 177 is provided for intensity control of the CRT under control of the computer and the blanking circuit 180, FIG. 12.

The A to D converter 188 is a video rate 10-bit device. A random access, 1K×8 memory 191 receives the digitized information for the respective channel, and in the drawing, one typical channel is shown. Similar RAM memories are used for the other two channels, respectively. The ram memory receives the digitized information as addressing information, and are loaded by, and may be read by, the computer 16. A reciprocal function is generated which corresponds to the positive red, green, and blue data, which in turn is conducted through a latch circuit and loaded through a selector 192 in a differential line driver 193 for loading into the scene storage memory 28. The selector 192 provides a transmission either of the curren rastering information from ram 191, or, alternatively, a test pattern generated by test pattern generator 194 or information from a video digitizer system 195 which is employed for reviewing particular frames which have been recorded in the video disc memory system. The remaining parts of the record circuitry serve to process the information, correct and coordinate the views with respect to color and luminence values, and then to feed information through a signal compression system 29 adapted to format the digital signals so as to allow encoding into NTSC color format. Recording on at least one of the video tape recorders 16 (as seen in overall diagrammatic view in FIG. 3) provides the output of the record system. The circuitry 29 for compressing digital signals to allow subsequent NTSC encoding is described in detail in the co-pending patent application Ser. No. 294,546 filed Aug. 20, 1981 of John T. Hooks, Jr., entitled "Method and System for High Density Analog Data Storage, Retrieval and Transmission," which describes the encoding procedure for one black and white channel, which application is incorporated by reference into the present specification.

For scene data synchronization, in the record mode, Red, Green and Blue are read from their respective tracks in the scene memory 28. At this point, at least two views have been assembled in the scene memory—one track for each color component of each zone. The scene memory is clocked at 10.7 MHz, and the data is shifted into an 8-bit shift register 198 (FIG. 15). When this register is full (after eight clock cycles), a buffer 199 is loaded, and the data is held until corresponding data is available from all three tracks. This buffering is required because there can be a differentisl delay in the scene storage system memory 28 of several hundred nanoseconds. When the buffered data stream is then inputted from the buffer 199, it is again converted to serial format, by "parallel in-serial out" conversion circuit 200 (register circuit) prior to inputting into the color correction circuit 29.

A luminence signal, representative of the intensity of the signal, is obtained as a weighted sum of the red, green, and blue signals, the weights being defined according to NTSC standards, as 0.3, 0.59, and 0.11, for red, green, and blue, respectively. The resulting luminence value is used to arrive at a common, gamma map input for the three colors. The gamma map, as will be understood by those in the art, is the implementation of a graph with luminence values charted as on one axis (abscissa) and gamma factors on the other axis (ordinate). A different gamma map can be stored for separate views. Referring to FIG. 16, a weighted summing circuit 203 effects this processing through the use of first, second, and third PROMs 204, 205, 206. PROMS with table lookup constant multiplication tables corresponding to the 0.3, 0.59, and 0.11 constants, are employed to permit rapid multiplication. The output of PROMs 204, 205, 206 are latched by latching circuits 207 and 208, and added by adder 209 to provide at lead 210 a common output weighted sum of red, green, and blue values. The 8-bit luminence value transmitted through lead 210 is multiplexed with the 3-bit label in the MUX multiplexer latch circit 211. The MUX latch multiplexes the 8 bits corresponding to luminence with the view label received from the view identifier circuit through delay circuit 165, and the 11-bit address formed is inputed to the gamma map ram memory 214 which, outputs the suitable gamma factor to multiplier circuits 215A, 215B, 215C, which in turn receive respective signals from the scene data synchronization circuit 197 which have been latched by latching circuits 216 for synchronization with the gamma factor output. The inputed gamma factors thus serve through the multiplier circuits 215A, B, and C, to perform luminence correction on the raw color intensity signals. The gamma map 214 is initially loaded with information provided through data link 217 from the computer and the address link 218 as required for the particular scene. Signals outputed from multipliers 215A, B, and C are thus luminence corrected, and are subsequently color corrected in multipliers 217A, 217B, 217C, each of which receives a multiplying constant from a 21-word buffer circuit 220. The 21-word buffer 220 has been loaded from the computer with sets of color corrector constants for each color, and for each view from the computer, and its outputs are synchronized with the other inputs to multipliers 217A, B, and C in accordance with the view label input received from the view idemntifier circuit through conductor bus 145, trugh latches 221, and subsequently delayed in five clock delay circuit 222 for providing select input signals to the 21-word buffer 220.

In operation, an operator views the raw signals taken from the scene memory by means of a monitor connected to the frame buffer 30. If colors are not as required, he inputs color correction signals into the 21-word buffer 220 by keyboard input connected to the computer, and the signals are subsequently corrected before entering into the recording media. After being luminence and color corrected, the signals are each passed through respective video processing and conversion circuits 225 for formatting the digital color signals for subsequent conversion into NTSC-compatible analog signals. The reason for this conversion is to permit their convenient recordal on the tape recording medium, and subsequently, on high density video discs. These circuits are described in detail in the co-pending, above-mentioned patent application. The insertion of NTSC synchronization pulses into the long scan lines to arrive at NTSC compatible short scan line signals is accomplished by the overalp memories 226 in cooperation with the digital-to-analog conversion circuits 227, connected in series, each channel comprising one of the circuits as described in the above-mentioned patent application. Aperture correction circuits 228A, B, and C are provided in series with the digital-to-analog converters 227 for providing aperture correction, and the signal is next passed through low pass filters 230, 230A, 230B, 230C, with a cutoff of 2.5 MHz. Signals are converted to standard NTSC color format using commercially available color encoder circuits 231. The output is fed through line driver circuits 232 to at least one tape recorder, suitably a standard TV studio recorder having addressable edit insert capability. Multiple tape recorders provide the capacity to record multiple zones for increasing readback access speed, as will be described below with respect to the playback system.

An NTSC synchronization signal generator 234 provides proper synchronization and subcarrier signals to the NTSC color encoder 231.

In converting to analog video format, all synchronization and subcarrier timing relations are consistent. When the number of NTSC lines per long line is even, the component pixels for odd long lines are delayed by one half cycle of the color burst frequency before modulating into composite format, thus reducing the luminence/chrominance cross contamination when long-line to long-line averaging is performed downstream.

Provision is made for generating and recording on the tapes full-field test data in either of two formats. One format comprising color bars for use in the disc mastering setup process, and the other is the format required by the automatic color corrector circuit in the VDS for the automatic setup systems. Either of these may be selected by the computer. The parameters of these signals are fixed by constants. A test pattern may also be inserted in the "off-photo corners" of the pseudo-film scan area. It consists suitably of non-overlapping squares generated by combining various bits of the pseudo-film coordinate signals $X_F$, $Y_F$. A frame buffer circuit is provided for holding three tracks of video for display information regarding the red, green, and blue signals of one frame. The buffer consists of three scene memory circuits which form a frame buffer. The first 259,200 locations out of 327,680 contains 480 lines of active video with 540 pixels per line. Lines are not interlaced.

The purpose of the frame buffer system is to permit monitoring of the picture being scanned prior to its recordal on the tape media. In operation, it is advantageous to monitor the scene stored in the scene storage memory 28 prior to its recordal in the tape and disc mediums, and to correct any deficiencies in color balance between the respective views and any geometrical mismatches. The frame buffer circuit 30 thus serves to provide the capability of storing information regarding portions of the photograhic plate being scanned, (at a scanning density of nominally 72 zones). Because of limited capacity in the buffer, the capability exists of viewing only a small portion of the total scene at any one time using the frame buffer. However, it may also be recalled that the density of scanning is programmable, and that a low resolution picture can be produced in which one scene equals one frame, which provides a coarse view of the overall photographic plate. In normal operation, it is sufficient to store information regarding portions of the film in the buffer memory and to reproduce these on a monitor screen, not shown, to permit color and geometric correction.

To start loading the buffer, the frame buffer loading start address is supplied by the computer unit 19 or computer. As the computer 19 commands transfer of sequential zones from the scene memory 28 to the frame buffer, the start address is loaded. When the frame buffer is read, the start address is generated at the start of each line in such a way as to produce interlaced video. For Red, Green, Blue, and Y data, the required sequence is even multiples of 540 for even fields and odd multiples of 540 for odd fields. For I and Q data, the required sequence is 0 pixels, 540 pixels, and 1080 pixels because only 240 lines are stored, so data is repeated for even and odd fields. Hardware to generate these starting addresses is provided and enabled when the frame buffer is in the display mode.

The frame buffer circuit receives color corrected and luminence corrected red, green, and blue signals from the outputs of the multipliers 217A, B, and C, before it is formatted into NTSC format for recordal in the tape recorder. After storing in the frame buffer, the information is fed back from the frame buffer through selector circuits 244A, B, and C. Information is fed back through the selector circuits through the NTSC processing circuit to the monitor for operator viewing and for subsequent correction of the signal. During normal recording of the information from the transparencies, the scanning signal derived from the analog deflection driving circuit 175 is non-interlaced, for scanning efficiencies, and it is stored in the tape recorders and discs in the non-interlaced format. However, when it is desired to monitor the signal on a monitor screen, it must be input into the monitor in the interlaced mode for clarity of viewing, and the signal stored in the non-interlaced mode in the frame buffer memory 241 is converted to interlaced mode by being read out in interlaced mode when it is fed back through the selectors 244A, B, and C for processing in the NTSC conversion circuit.

For reading out information regarding R, G, B, and Y from the memory 241 in the frame buffer 30, interlace read addresses are provided through the start address generator 242 as follows. The NTSC sync generator 234 provides a first field index number through input 248, and selector 247 selects a 0 pixel input for feeding into the selector circuit 249 which is latched in latching circuit 250 and fed through selector circuit 254 and 251 into the frame buffer memory 241. This in effect permits the frame buffer memory 241 to be read along alternate video lines starting with line number 1. Hard wired constants of 1080 are fed also through adder 246 and the sum of 1080 is added from the output of latching circuit 250 to the previous address through selector 249, which allows the skipping 1080 pixel addresses thereby allowing the reading process to skip one line and provide interlaced output. Selector 254 is activated from a buffer input 253 from the computer which inputs a start address for R, G, B, and Y factors. A corresponding computer buffer input 252 receives starting addresses for I and Q factors which enable the selector circuit 251 and the start address generator circuit 255 for I and Q factors. Start address circuit 255 consists of an adder circuit 256 connected in series with a latch 257, the adder circuit receiving from a hard wired constant a 540 constant factor. This enables it to repeat each I and Q line twice to compensate for encoding done at the video digitizer system 195, as will be more fully understood from the description of the playback system hereinbelow, the monitor system can also monitor material which is loaded onto the tape or discs themselves, albeit in scrambled form. The reading of information from the discs is accomplished through the video digitizer system 195, which will be more fully described hereinbelow with reference to the playback section of the circuit. As will be understood from that description in more detail, when analog video information from the video disc is played into the video digitizer system 195, it is compressed for storage efficiency in the scene storage system 28. This presents difficulties when it is desired to view the material on the monitor, in that the compressed material must be expanded, and the red, green, and blue channels cannot handle the compressed Y, I, and Q information. Therefore, a separate circuit path is provided in the recorder system when the Y, I, and Q signals are to be expanded before being viewed or fed through the frame buffer for viewing.

Output information is derived from the video digitizer system 195 (FIG. 2) fed through the scene storage system 28 through the scene synchronizing circuit 197 and then through an IQY loading circuit 260 for processing prior to loading into the frame buffer memory 241.

After the disc or tape has been read and the data digitized and stored in the scene memory 228, it has the "playback" format, Even Long Line Y..Y..Y..I.....Y..Y..Y..I
Odd Long Line Y..Y..Y..Q.....Y..Y..Y..Q As the first four pixels are read from the scene, they are stored in four latches 261, 262, 263, 264. At this time the three Y values are loaded into a shift register 265 and I is loaded into a buffer circuit 266. A timing and control circuit 267 provides three clock pulses generated at 10.7 MHz, which clock the three Y bites out of the shift register and also generates a series of three repeated I bites. These two data streams are clocked through two low-pass filters 270 and 271 which perform bandwidth limiting. The filter parameters are under control of the computer. This expanded scene information is then fed through first, second, and third selector circuits 272, 273, and 274 into the buffer memory 241 providing expanded scene information in color from the selected portion of the disc, and the Y, I and Q information is converted to red, green and blue signal information through a 3×3 matrix multiplier circuit 275 which provides Y, I, and Q to RGB conversion. The constant coefficients of the multiplier circuit 275 are provided from a computer input 276. Thus, the signal transmitted through the 3×3 multiplier 275 is expanded, red, green, and blue and interlaced information but remains in the scrambled format used for recording on the tapes and discs. Data may be loaded from the scene memory 28 to the display buffer 241, and the resulting data in the buffer will correspond to data within a field of view window in the scene memory. The computer must specify three numbers to define the window: (1) WIND1—the number of pixels that are skipped before the first pixel is written into the buffer; and (2) WIND2—the number of pixels that are utilized for storage in the buffer; and (3) WIND3—the magnification factor for the data. WIND1 information is provided from WIND1 register 281, WIND2 from register 282, and WIND3 from register 283.

To review the process in the display buffer, VIND1 is representative of the number of pixels which are entered in by computer control to the display buffer which determines the number of pixels which are to be skipped before the write for enabling the buffer memory 241 to store information regarding the first portion of a desired window. WIND2 is the number of pixels that are utilized for storage in the buffer of a desired window. WIND3 represents the number of pixels to be skipped before the next "write" is enabled for storing the next lower portion of the window as the overall pictures scan downwardly. This circuit generates "write" clocks for each of the memories within the buffer memory 241. Separate clocks are required because I and Q data are available only during alternate lines. A display cross-hair generating circuit 281, including down counter 282 and downcounter 283, is provided for generating a pair of cross hairs consisting of a horizontal line which is one scan line in height and a vertical line with a width which is approximately 1/200th of the display monitor width, generated when enabled by the computer. Position and color of these lines are determined by the computer.

Referring to FIG. 20, the video storage system 28 comprises the bank of 16 disc players which, when scanned under control of the computer, provide up to three channels of output information corresponding to one scene of information corresponding to the particular scene which has been selected for display. The information is fed through the video digitizer system 195 which functions to process the analog composite video from the video storage system 28 and send digitized video to the scene storage system 28. The video digitizer system 195 has three identical channels, as seen in FIG. 6 as channels 300(a), 300(b) and 300(c), since at any given time three video disc players can be simultaneously accessed. The quasi-NTSC video from the Video Storage System memory is read, time based corrected by time base corrector 302, clamped and converted to digital format by an analog/digital (A/D) converter circuit 303. A composite luminance and chrominance processor performs composite video-to-component video conversion and spatial compression of the digitized video in an effort to take advantage of the redundance present in the I and Q components of the color signal and to save memory storage space in the scene storage system 28. The video digitizer system, as will be described in more detail, interfaces with the visual computer 19 through a computer interface circuit 306 and provides interface between the visual computer 19 and the rest of the visual system hardware.

Referring to FIG. 22, three digitizer channels are fed into the scene storage system which includes two identical storage sections 308, 309, each storage memory 308, 309 having a maximum of up to 128 tracks of information which is sufficient to record at least one scene of information from a respective digital disc.

The scenes represent information derived from respective ones of the zones of information into which pictures are recorded, up to 128 zones being employed for recording information derived from one scene.

Each track has the capacity to store digital video information, including color, present in one NTSC line TV frame (1/30 of a second). Video information is read to one of the memory sections 308, 309, while it is written from the second section. When fresh data is required, the input side becomes the output side and viceversa. Three channels of data are thus input to the scene storage memory system, FIG. 22, and the scene storage system in turn outputs multiplexed Y, I, and Q digital data to the cell processor systems 312(a), 312(b), 312(c), and 312(d) as seen in FIG. 2.

An address and data bus 213 receives inputs from the visual computer 19 through the video digitizer 195 and an interface control circuit 214 includes registers receiving these command signals and, under computer control, selects the appropriate tracks necessary to be read out into the cell processor memories for reproducing the required portions of the original scene corresponding to the current location of the simulated aircraft.

Selection of the appropriate tracks is accomplished under computer program control. A plurality of output buses 215, one per active memory track within the computer memory segments 308, 309, transfers the information on the track selected under the control circuit 214 to a dual multiplexer 217 which serves to route the selected information to the cell processors which are connected to the visual display appropriate for displaying the particular view of scene portion selected. In the present application, four active cell processors and projector systems are employed. The multiplex includes four output buses 218(a), 218(b), 218(c), 218(d), for conducting information to the appropriate cell processor for projection on the appropriate screen. The multiplexer circuit acts as a switching circuit to route the output from any track of the scene storage system to any one of the cell processors.

As seen in FIG. 2, any one of the data buses 218(a), 218(b), 218(c), 218(d) is inputted into a respective one of the cell processor units 312(a), 312(b), 312(c), and 312(d), respectively.

As seen in FIG. 22, each of the data buses includes four channels for transmitting the data from four tracks in the memory 308, or 309. Bus 218(a), for example, includes channels 320(a), 320(b), 320(c), and 320(d), each of the channels transmitting information derived from one track in the memory 308, 309 to a respective input interpolator circuit 321(a), 322(a), 323(a), and 324(a) in the cell processor system 312(a), as seen in FIG. 23. The interpolators 321(a), (b), (c), and (d), as will be more fully described below, optimize the pixel density of the incoming signals, and perform filtering functions for optimizing its form for storing in the cell memory segments 325(a) and 325(b) of the cell processor memory circuit 326. The two cell memory segments 325(a), 325(b) are "ping-ponged" for alternative filling and reading into the multiplexer circuit 327, the control of the memories being derived through control circuit 328 from an input, under command sent through a computer interface bus 329 from the digital video digitizer system 195. A high speed address generator 330 is employed for addressing the portion of the memory being currently read for generating an output corresponding to the particular picture portion being read for projection. The output of the multiplexer 327 is fed thrugh a red, green, blue generator 333 which converts the Y, I, Q signals into red, green, and blue signals. The red, green, and blue signals are fed through a special effects generator circuit 334 which, as will be understood, inserts information simulating sky color, haze, fog, and the like. The output of the special effects generator circuit 334 is fed to a line buffer and digital-to-analog conversion circuit 335, which compresses in time the information derived for a particular line and converts the signal to TV analog format for driving the video display projectors. A control synchronization circuit 337 which is actual practice comprises a portion of the control circuit 328, operates to generate standard NTSC synchronization pulses for synchronizing the TV projector, the line buffer and D/A conversion circuit with the cell processor output.

The playback system, as can be understood from the above description, thus incorporates a sequence of memory systems which progresses from a large, fixed memory incorporated in the video storge system 28, from which a portion of the information is read under control of the video computer 19, to smaller but faster memory segments 308, 309 of the scene storage system 28. Each memory segment 308, 309 stores digitized information corresponding to at least part of one visual scene, i.e., a reconstructed image corresponding to at least part of one initial transparency 40. Depending on the number of frames which record the particular scene being transferred from the discs, several seconds may be required to read out the information from the disc and to store it in one of the memory segments 308, 209 under control of the visual system program, and stored in one of the smaller, but higher speed memory segments 325(a), 325(b), (FIG. 23) of a respective one of the cell processor systems 312(a), (b), (c), (d),. Each cell processor memory segment 325(a), and 325(b), stores information for reproducing one out-the-window view and during rapid simulated motion, may be changed every 1/30 second visual display change cycle.

Reading out of the information stored in the cell processor memories 325(a), 325(b), is accomplished by the raster generator 60, which generates a series of addresses in the high speed address generator which address and cause to be read out, selected portions of the cell memory segments 225(a), (b). The transformation, or manipulation of a portion of a view to distort, i.e., to skew, rotate, or magnify or otherwise distort the view, as would be seen by a pilot during motion occurring between points of view requiring new overall scenes to be recalled from the video storage system disc memory 28, is effected by mathematically controlling the output of the address generator, to produce what is termed herein a "line random address sequence" read out pattern from the cell processor memories 325(a), (b), as will be more fully understood from the description to follow.

VIDEO DIGITIZER SYSTEM

The video digitizer system is the central source of various clocking, synchronization, control and test signals for the Visual System. The Visual Computer 19 communicates with the Visual System via the Computer Interface 416. The interface provides buffering, handshaking, and timing signals to a common bus which is shared by all systems. The Visual Computer 19 sets the operational mode of the Video Storage System via the Computer Interface. The modes are (1) Channel Enable, (2) Video Reference Frame, and (3) Built-in-Test. The individual bits control the internal configuration of each digitizing channel. In general, the Video Digitizer System 195 processes data continuously in a "pipe-line" manner. As the Video Storage System 14 outputs video data, the Video Storage System 195 processes and sends the data to the Scene Storage System.

When a digitizing channel is in the Channel Enable mode, the Channel Inactive signal will go low whenever valid pixel data is presented to the video digitizer. While in this mode, the active Video digitizer system channel assumes that the video will be used to establish video correction factors. The correction process is initialized at the start of the frame and continues until the end of the frame. These factors are used during subsequent frames as gain and bias constants. The factors will not change until the next Reference Frame mode unless a reset command is sent.

When the Video Digitizer System is in the Built-in-Test mode, a video test signal (generated by hardware internal to the VDS) is applied to the digitizing channels. Video Storage System data will be ignored. All of the other Operational Control Word bits are functional in this mode.

Digitizer Control

The Visual Computer 19 via the Computer Interface 413 can set various constants in each digitizing channel 300(*a*), (*b*), (*c*). Also, specific functions can be disabled. Normally, the sequence of events is as follows;

(a) After power-up, send Master Reset, send the "base Line" control word (Channels disabled, VR disabled, AVC enabled, BIT disabled), send the AVC constants (Chroma gain, luma gain, luma bias).

(b) When operation is required, send VR Enable during the reference frame, send Segments per Line, send Channel Enable at the start of the appropriate Video Storage System transmission.

Note: The Visual Computer coordinates the operation of the Video Digitizer System 198 with the VSS 14 to insure that the VDS will send valid data to the Scene Storage System 28.

System Timing and Synchronization

The Video Digitizer System 195 provide a 30 Hz interrupt signal to the Visual Computer 19. This signal coincides with each video frame sync. The disc players and all system operations will "lock" to this sync.

The Video Digitizer System also provide clock signals to link the transmission of pixel data between systems.

Computer Interface

The Visual Computer 19 communicates with the various systems via the Computer Interface 413. Each system is assigned a block of addresses unique to that system. The CI provides a "party line" bus that links all systems to the Video Storage System. A system that recognizes an assigned address will respond to the associated data.

Basic Digitizer Channel

The requirements of the basic channel of the Video Digitizer System are as follows with continued reference to FIG. 25, the time-base corrector (TBC) 302 for the video digitizer is suitably Nippon Electric Company model NTCF5000. The TBC 302 standardizes the time base of quasi-NTSC composite video received from the Video Storage System video disc players. The Time Base Corrector has velocity-compensation circuitry to correct rotation errors of the video disc players.

The Time Base Corrector 302 provides an input to accept a signal from the Video Storage System 14 that indicates a video drop-out has been detected. Due to the long-line nature of the video, masking of drop-outs is accomplished external to the Time Base Corrector. The drop-out indication from the selected disc maintain a fixed correlation with the corrected video from that disc. Normal drop-out compensation ins disabled and several sequential lines are read before a common adjacent area of the picture is repeated (in contrast to normal TV scanning techniques.)

With reference to FIGS. 8 and 21, the fundamental timing and synchronization signals are derived from the synchronization, control, and test generation circuit 411 which is incorporated into the video digitizer circuit 195. The 30 HZ frame synchronization signal feeds the disc players, causing synchronous rotation in phase with the 30 HZ clock, feeds the computer 19 to provide frame cycle computation interrupt, and feeds all the other processing and downstream of the video digitizer circuit 195 which cycle at 30 HZ. Referring to FIG. 25, the clocking and control circuit comprises a conventional, NTSC sync generator 411(*a*) and a clocking circuit 411(*b*) having a high frequency timing circuit which is divided into several lower frequency clock outputs, including the 30 HZ signal.

Preceeding each scene on the discs, there is recorded a test pattern having known chrominance and luminance levels recorded for providing convenient color and brightness matching between scenes during play back. Before each scene is entered into the scene storage system this reference signal is standardized by the automatic video correcting circuitry 422, by comparing it to predetermined values of chroma and luminance.

The Video Digitizer System (VDS) 195 is the functional unit which processes analog composite video from the Video Storage System (VSS) 14 and sends digitized video to the Scene Storage System (SSS) 25. The VDS 198 also provides the interface between the Visual Computer 195 and the visual system. Further, the VDS 195 provides test, synchronization, and control signals for the VDS. A test panel is included in the VDS to provide limited manual testing of the VDS.

The VDS has six functional secions: three Digitizer Channels, 300(*a*), (*b*), (*c*), Timing Generator 411, a Computer Interface 306, and a Test Panel.

DIGITIZER; DETAIL IMPLEMENTATION

The VDS has three identical digitizer channels (FIG. 21), each of which accepts quasi-NTSC composite video from the VSS (FIG. 21). FIG. 25 shows a more detailed block diagram of the basic channel. Each of the three channels sends to the SSS 28 an output data clock, a channel inactive signal, plus an 8-bit multiplexed luminance/chrominance signal. The output video is delayed by one NTSC line time relative to the drop-out pulse. This relationship allows an increase in the drop-out width to insure complete masking of the video dropout.

The TBC is supplied a reference composite-sync signal from the sync generator 411(a) and a reference subcarrier signal from the master clock 411(b). The output video from the TBC is to be genlocked to both of these sources. The TBC generates an advanced sync for the disc player as a rotation reference.

Clamper

The TBC 302 is not sufficiently clamped to inhibit the composite video ouput from shifting with the average picture level. The "front porch" of the quasi-NTSC video signal is sampled and restored to a reference level. This is accomplished by a convergent feedback process that biases the TBC video output. The sample occurs at 657C from horizontal sync. As shown in FIG. 25 and in greater detail in FIG. 32 a clamping circuit 415 receives the digital sample at the chroma A/D converter 416 (to avoid the luma low pass filter delay) and develops an analog bias signal. The bias signal is summed with the incoming video by an analog summing circuit 417, FIG. 32 to reduce the shift. The loop gain of the clamper 415 is set to optimize the error convergence.

Luminance Low Pass Filter

The luminance signal path is passed through low pass filter circuit 418 to attenuate chroma interference. The filter response may be obtained using an Allen Avionic's VFL2P2 filter, or equivalent device.

Luminance A/D Converter

The Luminance signal is digitized at a 10.7 MHz rate by a luminance A/D converter 419, suitably an Analog Device's MATV-0816 A/D converter or an equivalent. The output of the converter 419 has an 8-bit, two's complement format.

Output signals from the video clamper 415 are also fed to a Chrominance A/D Converter 410. This converter 416 operates at four times the burst frequency. The luminance and chrominance sample rates are synchronized via the Master Clock 411(b). A Chroma Bandpass Prefilter 420 is placed before the chroma decoder 421 to provide additional luminance rejection. The Chroma Decoder 421 operates with respect to the B-Y and R-Y axes rather than the I and Q axes. It should perhaps be noted that the "I" and "Q" notation employed in the description of the visual provision is equivalent the IBY and QRY notation employed hereinbelow. The chroma separation into IBY and QRY signals is performed using phase-sensitive digital filtering by properly weighting a sequence of samples which bears a fixed relationship to the color-burst phase. The chroma samples to the decoder are represented by the series:

A B C D A'B'C'D' A"B"C"D" A'"B'"C'"D'"

(first)                          (last)

The decoder 421 performs the following operation on the series to resolve the IBY and QRY components:

$$IBY = \tfrac{3}{8}[\tfrac{1}{2}(A'-C) + \tfrac{1}{4}(A-C')] \quad (1) \tag{1}$$

$$QRY = \tfrac{3}{8}[\tfrac{1}{2}(B'-D) + \tfrac{1}{4}(B-D')] \quad (2) \tag{2}$$

Four input samples are accumulated for each output sample, producing a 3.58 MHz output sample rate. FIG. 33 shows an implementation of the above equations.

Error averaging is accomplished by summing 64 samples at a 10.7 MHz rate in an accumulator, then dividing by 64. This averaging process is necessary to reduce the effects of noise and dropouts during the time period of each reference level. A PROM error limiter is used to increase the correction time-constant for large errors. In addition, the transfer function of the limiter determines the loop gain of the corrector. The loop gain is set to optimize the error convergence during the VR frame.

The output of the error limiter is time integrated and accumulated into registers. The values of these registers cause the luminance and background levels to converge toward the reference levels. After the VR frame, the gain and bias registers hold their last values. These registers are present to nominal values (unity gain, zero bias) on power-up or reset.

An Automatic Chrominance Corrector Circuit 425 section 427 of the AVC contains two major components, a chroma gain corrector 427 and the chroma phase corrector 428. The encoded VR chroma signal is of the same phase and P—P amplitude as the burst. Since the IBY and QRY axes are used for demodulation, the VR amplitude and the sine of the VR phase error are available as the IBY' and QRY' outputs, respectively. When the VR chroma signal is properly decoded and corrected, the QRY component will be zero and the IBY component will be equivalent to 40 IRE units.

The operation of the chrominance gain corrector 427 is similar to the luminance gain corrector 423.

The chrominance phase corrector 428 is similar to the previous correctors except for control to the axes. A coordinate rotation process uses the value of the phase register to rotate the IBY' and QRY' axes. The direction of rotation reduces the QRY phase error.

A Gamma Corrector 426(a), (b) is connected to review output from the luma corrector 423. For each value, a number K(Y) is determined by a RAM look-up-table and this number is used to multiply Y. Since there are three time sequential values of Y for each value of IBY or QRY, the three values of K(Y) are averaged before multiplication with IBY and QRY.

A RAM containing the K(Y) table is loaded and read by the Visual Computer. The loading of the RAM is done by a high speed data-block transfer via the CI.

A transverse filtering and drop out correction circuit 430 is connected to receive the gama corrector outputs. The original video generated by the film-scan process is a long-line type which does not have a blanking/sync interval every 63us as NTSC format does, but has a blanking interval only every $N_s$ NTSC line times, where $N_s$ is programmable (similar to the FSS output of the Record System Film Scanner).

The Record System converts this long-line video into the "NTSC" format required by the disc-mastering process. $N_s$ is typically an even number (from 4 to 10). The horizontal and vertical blanking intervals are used in the VDS 195 as "dead" times for hardware update, control, etc. The VDS 195 continuously processes NTSC lines. During the appropriate sections of a series of NTSC lines, the VDS enables the SSS Data Clock and lowers the Channel Inactive signal. The SSS 28 may then accept the VDS output.

The transverse filter and dropout correction circuit 420 also performs Drop Out Correction, and when a drop-out is detected, the faulty portion of a reconstructed scan line is replaced with the corresponding section of the previous reconstructed scan line. This requires that video samples be stored from the previous $N_s$ "NTSC" scan lines. $N_s$ is a constant provided by the Visual Computer 19. The VDS 195 stores a series of NTSC lines into a memory. The memory addressing is restarted every $N_s$ lines.

The time base correction (TBC) drop-out signal (TBCDO) is sampled and stored in a memory to provide a hardware programmable delay of nominally one NTSC line time. TBCDO leads the video drop-out by about one NTSC line time. A memory delay of less than one line allows an increase in the TBCDO pulse width. This overlap procedure insures masking of the video drop-out. Whenever the delayed TBCDO becomes active, the prior reconstructed line data is sent to the SSS 28 and also recirculated to mask the drop-out.

The Chrominance Transverse Filter, a portion of the transverse filter circuit 430, permits a scan line averaging technique to be used to improve the chrominance S/N ratio. Since the Drop-out Corrector contains the stored video necessary to average two reconstructed lines, the Transverse Filter is implemented with two summing networks.

A luma/chroma data multiplexing and output formatting circuit 431 next serves to multiplex the data from the transverse filter circuit 430. The data sent to the SSS 28 is time multiplexed as follows:

Reconstructed even line: YYY I YYY I YYY I ...
Reconstructed odd line: YYY Q YYY Q YYY Q ...
(PAIRED CHROMA DATA)

IBY and QRY data are alternated line-by-line. In order to maintain hue, a line delay is necessary for QRY to remain matched with IBY.

The amplitude format of the Y data is 8 bit, straight binary. The amplitude format of the IBY and QRY data is 8 bit, two's complement. The nominal Y output scale factor is one level per 0.394 IRE luminance unit. The nominal IBY output scale factor is one level per 1.102 IRE subcarrier peak-to-peak unit times the consine of the subcarrier phase angle. The nominal QRY output scale factor is one level per 1.102 IRE subcarrier peak-to-peak unit times the sine of the subcarrier phase angle.

Built-In-Test

A built-in-test (BIT) feature 432 provides for the exercising and testing of the gamma memories by the computer via the CI. Provision is also made for accepting a video test signal. This input is applied to the digitizing channels when the system is in the BIT mode.

A Sync, Control, and Test Generator (SCTG) 411 is depicted in its Visual System context. The SCTG 411 is the central source of sync, control, and test signals for the entire Visual System. Some of its outputs are from two of its functional entities, and NTSC sync generator 411(*a*) and a Master Clock 411(*b*). The Master Clock signals are derived from a crystal oscillator and are phase synchronized by a Color Field Reference pulse. The Color Field Reference is provided by the NTSC sync generator 411(*a*). The required clock outputs include:

(1) $4f_b$ (about 14.3 MH$_z$)
(2) $3f_b$ (about 10.7 MH$_z$)
(3) $f_b$ (3.579545 MH$_z \pm$ 10H$_z$)
(4) 5RFRMSYNC (about 30 H$_z$)

Computer Interface

The Computer Interface (CI) 413 is the means whereby the Visual Computer 19*b* interfaces with the Visual System. The interface 413 provides an address bus, a 24-bit data bus, and control signals for the Visual Computer 19*b* to communicate with the Visual System. The CI 413 has a Data Acquisition System (DAS) that includes D/A, A/D, and discrete I/0 capabilities. The CI 413 is similar in concept to the interface for the Record System.

Test Panel

A Test Panel (TP) 432 is included and provides the means for limited off-line mode manual testing of all the Visual System subsystems using the CI address and data buses. The TP 432 includes switches to set address and data for manual word-at-a-time communication with any subsystem. Indicator lamps monitor the status of the address and data buses.

CELL PROCESSOR SYSTEM

Described hereinbelow are requirements, operation, and interface characteristics of the Cell Processor System (CPS) 312 portion of the Digital Picture Processor.

The cell processor 312 receives the digital luminance and chrominance data corresponding to a scene from the Scene Storage System (SSS) 28. Under software control it selects the portion which is visible to the pilot through one window, performs the geometric transformation on this data as required by motion of the pilot's eyepoint, and generates analog red, green, and blue video signals for display. Data is received from the SSS 28 by the four input interpolators 312(*a*), (*b*), (*c*), (*d*), (FIG. 312(*a*) which operate independently and simultaneously (FIG. 2). Each interpolator channels the luminance (Y) and chrominance (I and Q) data into separate data streams, performs low pass filtering, and interpolates or decimates as required to provide data at the proper rate to be loaded into the Cell Memory 325(*a*), (*b*). Filtering and interpolation is done in both longitudinal and transverse directions, and the parameters controlling these operations are supplied by the Visual Computer 19. The Cell Memory, as discussed above, consists of two sections 325(*a*), (*b*). One section may be read for display while the other is being loaded by the interpolators 321(*a*), (*b*), (*c*), (*d*). The output multiplexer 327 selects the data from the appropriate section and provides it to the output processor. The addresses for the Cell Memory are provided by the Address Generator 330. The read addresses are obtained from the display-raster pixel coordinates by a transformation corresponding to rotation, skew, magnification and other distortions in order to create a display of the scene data as seen from the pilot's eyepoint.

In summary, the output processor the Red-Green-Blue Generator 333, the special effects generator 334, and the Line Buffer and D/A converter 335, receives data through the memory multiplexer 327, performs the conversion from Y,I,Q format to Red, Green, Blue (R, G, B) format, performs low pass filtering, simulates haze, and inserts a representation of sky above the horizon. It also provides for replacement of a limit number of pixels in the output scene with pixels supplied by the Visual Computer and for insertion of a light point surrounded by a black square for an automatic display position error sensing system. A data rate line buffer 336 is provided to increase the data rate, and allow time for flyback as required by the display. Finally the R,G,B digital data streams are converted to analog signals, filtered and provided to the display along with a sync signal.

In operation, the function of the cell processor system 312 depends on a set of control and parameter words received from the Visual Computer 19 through the Computer Interface 329. The communication between the cell processor system 312 (CPS) and the Visual Computer 19 is provided by the Computer Interface (CI) which is a part of the Video Digitizer System (VDS) 195. A common bus 329 (FIG. 2) connects each CPS 312(a), 312(b), 312(c), 312(d), the Video Storage System (VSS) 14, the Video Digitizer System (VDS) 195, and the SSS 28 to the Computer Interface. This bus 329 comprises a twenty-four-bit-wide bidirectional data bus, an address bus, and control and handshaking signal channels.

A block of address is associated with the cell processor system 312. In addition, control words with unique addresses are provided for each CPS 312(a), (b), (c), (d). The computer 19 may communicate with a cell processor 312(a), (b), (c), (d), addressing a word or a block of words within the CPS address space.

All control and parameter words used during normal operations are double buffered. The computer communicates with a first-rank buffer in the control system 328 (FIG. 23) at any time except during a transfer interval which occurs during the vertical blanking time between frames (30 Hz). The transfer to the second-rank buffers is initiated by a frame synchronization signal from the VDS. The words that are not double buffered in this way are those associated with the Cell Memory on-line BIT operation. Double buffering of these words is avoided so that the speed of this test mode is not limited by the 30Hz transfer rate.

Each of the four input interpolators 321(a), (b), (c), (d), receives digital video from the SSS and processes a portion of it for storage in the Cell Memory. Referring to FIG. 24, each interpolator consists of two channels 344, 345, one for luminance and one for chrominance. The SSS is organized as tracks or zones with each zone having a storage capacity of 327,680 ($10 \times 2^{15}$) bytes of which 312,000 bytes are utilized. Each zone contains multiplexed luminance and chrominance data arranged in lines according to the following format:

Y Y I     N (even line)     Y Y Y I . . . Y

Y Y Q     N + (odd line)     Y Y Y Q . . . Y

The Visual System Software Program supplies the line length (number of bytes of data per line) and the number of lines per zone. The number of lines per track (LPT) is suitably 120, 80, 60, 48, or 40 and the number of luminance bytes per line (SLL) is suitably 1950, 2925, 3900, 4875, or 5850 respectively making a total of 234,000 luminance bytes per zone. These quantities depend on the scene data format which is chosen when the data is recorded on video discs. A Cardinal Sync pulse is generated each time the number of luminance bytes received is equal to an integer multiple of the

| Y ADDRESS BCD SEGMENT | X ADDRESS BCD SEGMENT | | | | | | | | | |
|---|---|---|---|---|---|---|---|---|---|---|
| | 0,1 | 2,3 | 4,5 | 6,7 | 8,9 | 0,1 | 2,3 | 4,5 | 6,7 | 8,9 |
| 0,1 | B00 | B01 | B02 | B03 | B04 | C00 | C01 | C02 | C03 | C04 |
| 2,3 | B10 | B11 | B12 | B13 | B14 | C10 | C11 | C12 | C13 | C14 |
| 4,5 | B20 | B21 | B22 | B23 | B24 | C20 | C21 | C22 | C23 | C24 |
| 6,7 | B30 | B31 | B32 | B33 | B34 | C30 | C31 | C32 | C33 | C34 |
| 8,9 | B40 | B41 | B42 | B43 | B44 | C40 | C41 | C42 | C43 | C44 |
| | CHROMINANCE I ARRAY | | | | | CHROMINANCE Q ARRAY | | | | |
| | TABLE 2A | | | | | TABLE 2B | | | | |

Luminance address assignment to memory modules

TABLE 1

Chrominance address assignment to memory modules

| BINARY SEGMENT | BCD SEGMENT | | | X AND Y DIMENSION |
|---|---|---|---|---|
| BIT10 BIT9 BIT8 BIT7 BIT6 BIT5 BIT4 | BIT3 | BIT2 | BIT1 | BIT0 ADDRESS FORMAT |

| SELECTED LUMINANCE ARRAY MODULES | | | | | SELECTED CHROMINANCE ARRAY MODULES |
|---|---|---|---|---|---|
| | ADDRESS | | | | |
| A00, A10, A20, A30, A40, A50, A60, A70, A80, A90 | 0 | 0 | 0 | 0 | B00, B10, B20, B30, B40 |
| A01, A11, A21, A31, A41, A51, A61, A71, A81, A91 | 0 | 0 | 0 | 1 | C00, C10, C20, C30, C40 |
| A02, A12, A22, A32, A42, A52, A62, A72, A82, A92 | 0 | 0 | 1 | 0 | B01, B11, B21, B31, B41 |
| A03, A13, A23, A33, A43, A53, A63, A73, A83, A93 | 0 | 0 | 1 | 1 | C01, C11, C21, C31, C41 |
| A04, A14, A24, A34, A44, A54, A64, A74, A84, A94 | 0 | 1 | 0 | 0 | B02, B12, B22, B32, B42 |
| A05, A15, A25, A35, A45, A55, A65, A75, A85, A95 | 0 | 1 | 0 | 1 | C02, C12, C22, C32, C42 |
| A06, A16, A26, A36, A46, A56, A66, A76, A86, A96 | 0 | 1 | 1 | 0 | B03, B13, B23, B33, B43 |
| A07, A17, A27, A37, A47, A57, A67, A77, A87, A97 | 0 | 1 | 1 | 1 | C03, C13, C23, C33, C43 |
| A08, A18, A28, A38, A48, A58, A68, A78, A88, A98 | 1 | 0 | 0 | 0 | B04, B14, B24, B34, B44 |
| A09, A19, A29, A39, A49, A59, A69, A79, A89, A99 | 1 | 0 | 0 | 1 | C04, C14, C24, C34, C44 |
| | Y ADDRESS | | | | |
| A00, A01, A02, A03, A04, A05, A06, A07, A08, A09 | 0 | 0 | 0 | 0 | B00, B01, B02, B03, B04 |
| A10, A11, A12, A13, A14, A15, A16, A17, A18, A19 | 0 | 0 | 0 | 1 | C00, C01, C02, C03, C04 |
| A20, A21, A22, A23, A24, A25, A26, A27, A28, A29 | 0 | 0 | 1 | 0 | B10, B11, B12, B13, B14 |
| A30, A31, A32, A33, A34, A35, A36, A37, A38, A39 | 0 | 0 | 1 | 1 | C10, C11, C12, C13, C14 |
| A40, A41, A42, A43, A44, A45, A46, A47, A48, A49 | 0 | 1 | 0 | 0 | B20, B21, B22, B23, B24 |
| A50, A51, A52, A53, A54, A55, A56, A57, A58, A59 | 0 | 1 | 0 | 1 | C20, C21, C22, C23, C24 |
| A60, A61, A62, A63, A64, A65, A66, A67, A68, A69 | 0 | 1 | 1 | 0 | B30, B31, B32, B33, B34 |
| A70, A71, A72, A73, A74, A75, A76, A77, A78, A79 | 0 | 1 | 1 | 1 | C30, C31, C32, C33, C34 |
| A80, A81, A82, A83, A84, A85, A86, A87, A88, A89 | 1 | 0 | 0 | 0 | B40, B41, B42, B43, B44 |
| A90, A91, A92, A93, A94, A95, A96, A97, A98, A99 | 1 | 0 | 0 | 1 | C40, C41, C42, C43, C44 | number of bytes per line. The Cardinal Sync is thus the start-of-long-line sync signal.

A data separator 346 (FIG. 24 A) demultiplexes the incoming data from the SSS into luminance and chrominance streams. The luminance stream consists of a maximum of 5850 bytes for each line. The chrominance stream consists of a maximum of either 1950 bytes of I data 1950 bytes of Q data for each line. The starting signal for the data separator is derived from the first byte signal supplied by the SSS track zero. Thus if fewer than four interpolators 321(a), (b), (c), (d) are operated, at least track zero will be activated. In the transverse filters 347(b), (FIG. 24 A) the data streams are passed from the data separator 346 (FIG. 24) to transverse filters 347(a), 347 (b). One filter 347(a) processes luminance data, and the other 347(b) alternates between I and Q data. These filters have the transfer functions:

$$\frac{1\text{-FCLTF}}{1\text{-FCLTF} \times (Z^{-1})} \text{ and } \frac{1\text{-FCCTF}}{1\text{-FCCTF} \times (Z^{-1})}$$

for the luminance and chrominance channels respectively and are functionally equivalent. The parameters FCLTF and FCCTF are supplied by the Visual System Software Program. One value of FCLTF is supplied to all four luminance filters (of each cell processor), and one value of FCCTF is supplied to all four chrominance filters (of each cell processor).

The operator $Z^{-1}$ represents a delay of one line. The function of these filters 347(b) is to provide smoothing between lines. The values of the parameters FCLTF and FCCTF control the amount of smoothing for luminance and chrominance. If these values are zero no smoothing occurs. These filters utilize a RAM for accumulation of one line of data. Each RAM has a storage capacity of 8192 bytes for Y (luminance) or a combination of 4096 bytes each for I and Q (chrominance) data. Since the output depends on the input of several successive lines, each interpolator processes zones in order of increasing line number.

Each interpolator is equipped with two low pass filters 348(a), (b) to provide filtering in the longitudinal direction. One operates on Y (luminance) data, and the other operates on multiplexed I and Q (chrominance) data. The response of each filter follows one of four curves which is selected by a control word (FVLLF or LVCLF) from the Visual System Software Program.

Longitudinal interpolators 349(a), (b) generate new data streams at intervals of DELXL and DELXC (in units of the input sample spacing). These parameters range between ½ and 16. DELXL is the luminance output sample spacing, and DELXC is the chrominance output sample spacing. These parameters are supplied by the visual software as an integer part and a fractional part. To insure an accuracy of ½ for 1280 samples, the fractional portion of these variables is specified with 12-bit numbers. The Visual System Program provides the same values to all four interpolators. Since the data from the SSS is formatted as streams with one chrominance value for every three luminance values, and since the Cell Memory chrominance X-address range is one-half of the luminance X-address range, the Visual System Program insures that

DELXL=⅓DELXC.

The program also supplies a sweep delay number i.e., the number of bytes from cardinal sync to the leading edge of the video segment to be interpolated, and the length of the line (number of pixels per line) to be written in the Cell Memory.

The new data stream consists of a linear combination of the two values nearest the desired point. The coefficients are ¼, ½, or ¾ and depend on the position of the desired point as shown in FIG. 25, wherein the nature of "A" and "B" represent the value from the longitudinal memory, of filtered data from the scene memory, and wherein points 350, 351, and 352 are defined respectively, by the following relationships:

$$X(350) = (\tfrac{3}{4})X_A + (\tfrac{1}{4})X_B$$

$$X(351) = (\tfrac{1}{2})X_A + (\tfrac{1}{2})X_B$$

$$X(352) = (\tfrac{1}{4})X_A + (\tfrac{3}{4})X_B$$

Wherein X is the values derived from the longitudinal filter 348(a).

Transverse interpolators 354(a), (b) generate new data streams corresponding to an output line spacing DELYL and DELYC (in units of the input line spacing) for luminance and chrominance respectively. These parameters are supplied by the Visual System Software Program and range between ½ and 8. DELYL is the luminance line spacing, and DELYC is the chrominance line spacing, and the same values are supplied to all four interpolators 324(a), (b), (c), (d). In order to maintain registration between luminance and chrominance, these two parameters are equal if the cell memory chrominance Y address range is one-half the luminance Y address range. Values at the points on the new line are determined by linear combinations of nearest lines with coefficients of ¼, ½, and ¾ as in the longitudinal interpolator 349(a). The visual system software program also supplies a luminance and a chrominance offset for each interpolator track 320(a), (b), (c), (d). These quantities specify spacing between the first interpolator output line and the first interpolator input line in units of output line spacing.

The Cell Memory circuit 326 (FIG. 23) stores the digital information that is sent to the output processor 333, 334, 335, 337. The data to be stored consists of luminance (Y) and chrominance (I and Q) byte streams from the input interpolators 324(a), (b), (c), (d). The Cell Memory 326, as discussed above is comprised of two identical sections 325(a), 325(b), henceforth referred to as Cell Memory Sections. Luminance and chrominance data may be alternately written into one section and read from the other. Each Cell Memory Section 325(a), (b) is organized so as to be capable of storing data from up to four separate input interpolators 324(a), (b), (c), (d).

Each Cell Memory Section 325(a), (b) contains one 1280×1280 array of byte storage locations for luminance data and two 640×640 arrays of byte storage locations for chrominance data. Total storage is thus 2,457,600 bytes for each section. The cell memory sections 325(a), (b) are described in more detail hereinbelow. For addressing purposes the luminance portion of each Cell Memory Section is organized as a 10×10 interleaved array of memory modules (as shown at 500 in FIG. 31). Each memory module is organized as a 128×128 byte array. This creates a 1280×1280 address space. The chrominance portion of each Cell Memory Section 325(a), (b) is organized as two identical 5×5 interleaved arrays of memory modules, one array for I data and one array for Q data. The memory modules are identical to those in the luminance array.

The Cell Memory 326 is capable of operating in three distinct modes under external control: Read Mode, Write Mode, and Refresh Mode. While one Cell Memory Section is in the Write Mode, the other section is in the Read Mode. The Refresh Mode is utilized in both the Read and Write modes to preserve the contents of both Cell Memory Sections. The implementation of refresh in the Write Mode is dependent on the timing required to accomplish scene-to-interpolator data transfer. No attempt is made to preserve stale data in the Cell Memory 326 after a shift from the Read Mode to the Write Mode. Refresh is accomplished on a "picture line" basis in parallel with normal write operations; i.e., while some modules are being written into, others are refreshed using the same X dimension address. Refresh rate is programmable to vary between once per line and once per eight lines as the "picture line" varies in length. A control word from the computer 19 specifies the refresh rate.

A Built-In-Test (BIT) function for cell memory under control of the computer 19 is provided. On-line and off-line testing is possible. For on-line BIT, a block of ten bytes of luminance data and five bytes of chrominance data is written in or read from the cell memory by the computer. In this mode the starting address is specified by the computer 19, and the data is stored in or read from sequential locations addressed by incrementing the X-address. The two memory sections are tested independently.

Off-line BIT consists of loading the Cell Memory with hardware-generated data patterns during a write cycle and verifying that the memory contents conform to the chosen pattern during a read cycle. Off-line BIT pattern selection and read-and write-cycle initiation is controlled by the Visual System Software Program. During write operations, the Cell Memory section is treated as four segments with starting Y-addresses of 0, 320, 640, and 960. Each segment has its starting X-address at zero, and write rates are high enough to satisfy refresh requirements. The write sequence will fill every memory location in each Cell Memory segment 325 (a), (b) and then initiate a refresh sequence to retain the data.

The off-line BIT data-pattern generator, not shown, has four modes of operation. Alternate loading from two registers (ALT) utilizes two data words initially loaded from the diagnostic program, and SWEEP UP and SWEEP DOWN utilize outputs from a counter. SHIFT utilizes loading a shift register which is then shifted serially in ring fashion. Off-line BIT status is reported using the four output status words. Address streams are provided to the Cell Memory. One is for writing data from the input interpolators, and one is for reading date to the output processor. The read addresses generator is shown in block 330 in FIG. 23, and the write addresses generator comprises a portion of the memory segments 325(a), (b). The addresses utilized by the Cell Memory 326 during the write mode are generated by counters in the Cell Memory interface circuit and are controlled by signals from the interpolators 324(a), (b), (c), (d).

In the write mode, a common X address is provided to all modules of the luminance and chrominance array portions of the memory segments 325(a), (b), simultaneously. The input interpolator sets the X-addresses to zero before a line is written by generating a reset signal. During a write cycle (14 periods of a 14.3 MHz clock) ten bytes of luminance data and five bytes of either I or Q data are written from each input interpolator which has valid data. The X address is then advanced to the next block of ten modules for luminance and the next block of five modules for chrominance unless a reset is generated by the interpolator.

Twelve separate counters are provided for each section of Cell Memory to generate the Y write addresses. These counters are set to the Y-address of the first line to be written during a frame. At the beginning of a frame, four luminance starting addresses supplied by the Visual System Program are loaded into the four luminance counters, and four chrominance starting addresses are loaded into the eight chrominance counters. During interpolation, these twelve counters are independently incremented under control of the interpolators. These counters are advanced on the completion of writing of one line of the cell memory.

The read adresses generator system 330 generates an address stream utilizing the Cell Memory 326 to read data to the output processor 333, 334, 335, 336 for display. A point on the display screen is represented by $(C_s, Y_{PL}, Z_{PL})$ where $C_s$ is the normal distance from the pilot's eyepoint to the origin of the screen, and $Y_{PL}$ and $Z_{PL}$ are the raster address:

$$-385 \leq Y_{PL} \leq 385 \text{ (fast sweep)}$$

$$-403 \leq Z_{PL} \leq 403 \text{ (slow sweep)}.$$

The point $(C_s, 0, 0)$ corresponds to the origin of the screen.

Edge Detector/Region Selector

The raster may be divided into at least four ordered regions wih labels 1, 2, . . . 4, each bounded by four straight lines on the display defined by equations of the form (one equation for each bounding line):

$$Y_{PL} = \pm (A + BZ_{PL})$$

where $Y_{PL}$ and $Z_{PL}$ are the fast and slow scanning pixel address of the display raster, respectively. See FIG. 26 and FIG. 27.

The parameters A and B and the overall sign are supplied by the Visual System Program for each line. The separate, bounded regions correspond to regions of the scene which will be given different distortion processing during maneuvers of the simulated aircraft, for correction of visual perspective. A 9-element matrix associated with each of the above defined regions is used in the high-speed address generator to generate the cell memory read address while the corresponding region is read.

If a pixel lies in the interior of a particular one of the above defined regions, the associated matrix will be used, but if pixel is outside of all regions, the last valid pixel will be repeated until a new region is selected. If two regions overlap, then the one with the smallest label (e.g.; the "nearest" or highest priority) will be selected. Thus, the data will be organized such that region 1 is the one which is near the eyepoint—region 2 behind region 1, etc. The edge detectors region are shown in FIG. 27.

The Hardware design for four regions, (as part of the address generators 330 as shown in FIG. 26 (parameters for 16 lines and four sets of matrix elements) is illustrative of the implementation.

The edge detector and region select circuit 360 operates at a frequency of at least 7.16 MHz ($2f_B$) updating the read-address pipeline at least every third pixel. The address circuit 330 includes a raster generator circuit 361 for generating a scan raster pattern.

The matrix selected by the region selector 360 depends on the position and orientation of the pilot's eyepoint. This matrix represents a combination of rotation, skew, and other distortions of the original scene in mapping a part of that scene into a display window screen. The matrix is computed anew by the software program every display frame time.

This matrix is output to the high speed address generator 363 and is used to generate the vector $$\begin{bmatrix} \hat{X}_E \\ \hat{Y}_E \\ \hat{Z}_E \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} C_s \\ Y_{PL} \\ Z_{PL} \end{bmatrix}.$$

A matrix memory 362 stores the A parameters, and, when the matrix memory 362 is filled, loads the information into the high speed address generator 363 under the control of the edge detector 360. Next a unit vector is generated by the equation $$\begin{bmatrix} \hat{X}_E \\ \hat{Y}_E \\ \hat{Z}_E \end{bmatrix} = \begin{bmatrix} 1/R & 0 & 0 \\ 0 & 1/R & 0 \\ 0 & 0 & 1/R \end{bmatrix} \begin{bmatrix} \hat{X}_E \\ \hat{Y}_E \\ \hat{Z}_E \end{bmatrix}$$

Where $R^2 = \hat{x}^2 + \hat{y}^2 + \hat{z}^2$

Since ($X_E$, $Y_E$, $Z_E$), is independent of the scale of ($\hat{X}_E$, $\hat{Y}_E$, $\hat{Z}_E$), the matrix A may be multiplied by a constant multiplied by the identity matrix. This constant is chosen so that $1/16 \leq R^2 \leq 4.$ The matrix elements $A_{12}$, $A_{22}$, $A_{32}$, $A_{13}$, $A_{23}$, and $A_{33}$ and the products $A_{11}C_S$, $A_{21}C_S$, and $A_{31}C_S$ for each active region are supplied by the Visual System Software Program. The point on the unit sphere, FIG. 9 defined by ($X_E$, $Y_E$, $Z_E$) is mapped into the Pseudo-Film plane by the transformation $X_F = X_E(2 - Z_E)$ $Y_F = Y_E(2 - Z_E).$ These quantities lie between approximately $-2.2$ and $+2.2$.

From these coordinates, the address in the Cell Memory 325(a), (b) is obtained by the equations $X_C = (X_F + X_B)K_x$ $Y_C = (Y_F + Y_B)K_Y.$ The cell bias ($X_B$ and $Y_B$) and the cell gain ($K_X$ and $K_Y$) are supplied by the Visual System Software Program and are constant during a frame. The cell bias and cell gain values are typically the same for all regions.

Output Processor

The output processor 333, 334, 335, 336, is organized as a pipeline (see FIG. 28). Three serial byte streams 365(a), (b), (c), (d), FIG. 28, of Y,I,Q data are received from each Cell Memory section 325(a), (b) at a rate of 21.47 MByte ($6f_B$) for each stream. These data are sequentially processed by the subsystems: Multiplexer 366, Low Pass Digital Filter 367, Red, Green, Blue Decoder 368, Point Insertion 369, Haze and Sky Generator 370, Position Error Sensing 371, Data-Rate Buffer 372, Digital-to-Analog Converter and Low Pass Filter 373, Display Multiplexer 374.

Multiplexer

The memory data multiplexer 366 is controlled by a select signal from the computer interface which selects the section of memory 325 which is read. A control signal which originates in the region-select portion 360 of the read address generator 330 indicates when a pixel must be repeated. When this signal is true the last value read from the cell memory is repeated and sent to the low-pass filter 367.

Low-Pass Digital Filter

The filter circuit 367 allows the selection by a computer control word of the transfer function 1 or $\frac{1}{2}[1 + \frac{1}{2}(Z^1 + z^{-1})]$ for each of Y,I, and Q. This filter replaces each pixel with the average of itself and the average of the two nearest neighbors. It rolls off to 6 db at 5.4 MHz and has a linear phase response (see FIG. 13).

Red, Green, Blue Decoder

The function of this section 333, 368 is to evaluate the equation, $$\begin{bmatrix} A_{13} \\ A_{23} \\ A_{33} \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} Y \\ I \\ Q \end{bmatrix} + \begin{bmatrix} B_1 \\ B_2 \\ B_3 \end{bmatrix}$$

where Y,I, and Q are data streams received from the low pass filter 367. $A_{ij}$ and $B_i$ are values received from the Visual System Software Program which are constant during one frame. The matrix $A_{ij}$ is the product of several factors. If the luminance and chrominance low pass filter 367 gains at zero frequency are $G_L$ and $G_C$, then the above matrix must include a factor $$\begin{bmatrix} 1/G_L & 0 & 0 \\ 0 & 1/G_C & 0 \\ 0 & 0 & 1/G_C \end{bmatrix}$$

Additional factors are included to reduce light levels for simulation of low-light flight conditions and to correct for color balance errors in the data base. The offset term $B_i$ enables the software to add a red, green, or blue bias to the output video.

Point Insertion

Circuit 369 is provided to generate up to 20 points. These points replace the stored scene information at their respective locations. The position, color, and intensity of each is determined independently by the Visual System Program. The position ($Y_o$, $Z_o$) of each is determined to $\frac{1}{2}$ pixel accuracy (11 bits for Y and 11 bits for Z).

Each point consists of one, two, or four pixels depending upon whether its location has integer or half-integer coordinates. When multiple pixels are utilized, the computer 19 makes a corresponding reduction in intensity (divides by approximately 2 or 4) depending upon the pedestal level and display response function. The hardware allows two or more points to be in adjacent pixels, if desired, in order to simulate nearby lights. If the Y portion of the light point location in the display raster is a whole number, a pixel will be activated when $Y=Y_o$.

If the Y position of the light point location is a half-integer, pixels will be activated at $Y=Y_o$ and $Y=Y_o+1$.

Haze and Sky Generators

The sky generator system 370 simulates a diffuse sky above a line approximately 10° above the horizon. The haze generator simulates fog by reducing the intensity of the video from the cell memory and adding a fog luminance. These two functions are considered as a single system because they both utilize the function COS $\phi$ where $\phi$ is the angle between the pilot's line-of-sight and the earth vertical. The hardware which generates COS $\phi$ is shared by the sky and haze generators (see FIG. 14).

Sky Generator

Referring additionally to FIG. 29, when a display pixel corresponds to a position above a line approximately 10° above the horizon, a sky register 375 generates a constant video value to simulate a diffuse sky, and when the position is below this line data from the Cell Memory is displayed 325. The position of this line and the color of the sky are determined by the Visual System Software Program. The Visual System Program supplys the Y and Z components of a unit vector ($X_v$, $Y_v$, $Z_v$) with $$1 = X_v^2 + Y_v^2 + Z_v^2$$

which is directed downward in a coordinate system in which the X-axis is directed from the pilot's eyepoint to the origin of the display screen, and the Y-axis is parallel to the display fast scan direction of the display. If 0 is the angle between the line-of-sight and the vertical, then $$\text{Cos } \phi = \left[ \frac{C_s X_v + Y_{PL} Y_v + Z_{PL} Z_v}{\sqrt{C_s^2 + Y_{PL}^2 + Z_{PL}^2}} \right]$$

where $Y_{PL}$ and $Z_{PL}$ are the display raster pixel coordinates and $C_s$ is the distance from the pilot's eyepoint to the origin of the screen.

The quantity COS $\phi$ is compared with a parameter COSPH supplied by the Visual System Software Program to determine whether diffuse sky or cell memory data is to be displayed. If COS $\phi$ is less than COSPH, then a diffuse sky is generated. The Visual System Program also supplies the coordinates of the electrical center of the raster as derived from the position error sensing data.

Haze Generator

Referring to FIG. 29, the effect of haze in the atmosphere is simulated by replacing a fraction of the video signals ($B_s$) with a signal B's generated by adding a fraction of the original signal to a fog luminance ($B_F$) according to the equation $$B's = RB_s + (1-R)B_F$$

where $B_s$ and B's represent the red, green, or blue data streams. Here R is a contrast ratio which depends upon the line of sight distance through the fog L and the extinction coefficient E.

$$R = \begin{cases} 0 \text{ for zero visibility} \\ 1 \text{ for clear atmosphere.} \end{cases}$$

$B_F$ has three components: red, green, and blue which are constant and are determined by the Visual System Software Program.

A uniform layer of fog with extinction coefficient E and thickness $H_F$ is assumed to exist above and below the eyepoint. The extinction coefficient E is defined such that the contrast ratio is 1/e when the line-of-sight distance through the fog is 1/E. Then the viewing distance through the fog is $L = H_F/|\text{COS } \phi|$ and the contrast ratio is $R = EXP(-EL) = EXP(-EH_F/|\text{COS } \phi|)$.

The Visual System Software Program generates the quantities E and $H_F$ which are only used in the combination $E \times H_F$. Since this product varies from zero to infinity, the hardware makes a chnage of variables in order to efficiently utilize PROM look-up tables. As a result, the Visual System Software Program supplies the parameter $$K = \log_2 (EH_F).$$

Display Position Error Sensing System

An error sensing circuit 371 is provided to insert a Red area centered in a black square into the display raster. The position is controlled to an accuracy of one pixel by words received from the Visual System Computer. The size of the Red area is one pixel and the black area is a square 32 pixels on each side. The intensity is controlled by a word from the Visual System Program. The single Red pixel is utilized sequentially at the four sensor locations since the sensor outputs are time multiplexed to the computer. The Visual System Program uses the sensor outputs to determine the electrical center and orientation of the display raster.

Data-Rate Buffer

A buffer 372 is provided with capacity of two lines of red, green, and blue data (2K × 24 bytes). One section is loaded at 21.471 MHz while the other is read at 24.54 MHz (48/7 $f_B$). Since 2US of the 38 US line time is used for cell memory refresh, data to be loaded into one section is available for 36 US per line. During this time interval 770 words are loaded. Data is read from the other section during the active display time of 31 US. The interval between bursts of data from the cell memory are delayed as data passes through the output processor's circuitry. This interval overlaps the display blanking time. During this interval overlap, read/write mode is switched between the two sections.

Digital-To-Analog Converter and Low-Pass Filter

Three identical channels of a D/A conversion and filter circuit 373 are provided for the red, green, and blue signals. The input to each is the output of the data-rate buffer. After the conversion to analog form, the signal is filtered to remove components above the Nyquist frequency. Implementation of the Cell Processor System is described below in greater detail.

Control For Computer Interface

Communication between the CPS 312(a), (b), (c), (d) and the Visual System Computer 19 Universal Block Controller is provided by the Computer Interface (CI) 300 (FIG. 21) which is located in the Video Digitizer System (VDS). A common bus 329 (FIG. 23) connects each CPS 312, the VSS 28, the VDS 195 and the SSS 28 to the Computer Interface. This bus consists of a twenty-four bit wide bidirectional data bus, an address bus, and control and handshaking signals. The computer interface control circuits 306 are suitably distributed over four circuit boards, one in each card cage. One card serves as a master by furnishing the communication path between the CI and the other three cards. All control, handshaking, CPS enable, and self-test functions are on this card. Addresses received from the CI are decoded and mapped into subsystem addresses and sent along with data and control signals to the other card cages. The subsystem addresses are further decoded within each card cage.

All data, addresses, and control signals are transferred between card cages by differential line drivers and receivers and between cards within a single card cage by single-ended signals. All timing signals for the cell processor circuits are derived from a 14.3 MHz ($4f_B$) clock signal and a 30 Hz frame synchronization signal supplied by the VDS. The data-rate buffer, the digital-to-analog converter, and the display sync generator require a 24.545451 MHz (48/7 $f_B$) clock signal. This is derived from the 14.3 MHz clock by a phase-locked loop. The interpolator and memory require 14.3 and 21.5 MHz ($6f_B$) clocks. These are derived from a 128.86362 MHz ($36f_B$) clock signal which is derived from the 14.3 MHz clock by a phase locked loop.

CPS External Signal Interface

The Cell Processor System interfacing signals (Reference FIG. 1) are as follows for CPS number zero. For CPS numbers one, two, and three, all signals which have CE0 as part of their name will have that portion replaced with CE1, CE2, or CE3 respectively. The digital communication between the CPS and all other systems is through differential line drivers/receivers.

With respect now to the configuration of the high speed memory segments (of which the first segment 325(a) is typical) capable of reacting to the "line random address sequencing," each memory segment 325(a) contains a luminance, chrominance I and chrominance Q section for storing luminance and chrominance I and Q information FIG. 37 is representative of the luminance array, and tables 5 and 6 are representative of the chrominance I and Q arrays. The data to be stored will, as suggested above, consist of luminance (Y) and chrominance (I and Q) byte streams from the scene to cell interpolators. Data will be stored in sequential memory locations under control of the write address generator at a maximum transfer rate of 40.8 MBytes/Sec. The luminance and chrominance data may be read from the Cell Memory in a line random manner under control of the read adress generator at a maximum transfer rate of 21.5 M Bytes/Sec. See FIG. 2.

Cell Memory Organization

The Cell Memory (FIGS. 23, 36) is comprised of two identical sections, 325(a), 325(b), henceforth referred to as Cell Memory sections, of 2.46 M Bytes each. Luminance and chrominance data are alternately written into one section and read from the other. Each Cell Memory Section is organized so as to be capable of storing data from four separate sources (tracks 218(a), (b), (c), (d), FIG. 22) simultaneously. Memory interleaving techniques are employed to attain the required data transfer rates in both the read and write modes of operation. Multiplexing of clocks, addresses, and input and output data to the two sections of the Cell Memory is accomplished externally to the Cell Memory proper.

Cell Memory Section Organization

Each Cell Memory Section contains one 1280×1280 array of byte storage locations for luminance data and two 640×640 arrays of byte storage locations for chrominance. Total storage then is 2,457,600 bytes for each section.

Luminance Organization

Referring to FIG. 37, for addressing purposes the luminance portion of each Cell Memory Section is organized as a 10×10 interleaved array of memory modules. Each memory module 500 is organized as a 128×128 byte array. This creates a 1280×1280 address space. One address for one of the memory modules 500 is represented in FIG. 38.

Luminance Addressing

The luminance portion of each Cell Memory Section is addressed by an 11-bit address for the X dimension and an 11-bit address for the Y dimension. Each 11-bit address consists of a 7-bit binary segment in the most significant bit positions and a 4-bit binary-coded-decimal (BCD) segment in the least significant bit positions. The BCD portions of the X and Y addresses are decimally decoded to yield 10 Y select strobes and 10 X select strobes to uniquely identify one of the 100 memory modules 500, FIG. 37, in the 10×10 array. The two 7-bit binary portions of the XY addresses are used to uniquely identify one of the byte storage locations in the 128×128 array in each memory module. The decoding of the BDC portions of the X and Y addresses is performed externally to the Cell Memory proper.

Chrominance Organization

For addressing purposes the chrominance portion of each Cell Memory Section is organized as two identical 5×5 interleaved arrays of memory modules, one array for Q data and one array for I data. The memory modules are identical to those in the luminance array, each module containing a 128×128 array of byte storage locations. Tables 2A and 2B.

Chrominance Addressing

The X and Y addresses for the chrominance I and Q arrays are derived from the respective luminance addresses. The 7-bit binary portions of the luminance X and Y addresses are used without modification to uniquely identify one of the byte storage locations in each module. The 4-bit BDC portions of the luminance X and Y addresses are used to uniquely identify one of the 25 memory modules in each 5×5 array, per Tables 2A and 2B. The address assignment to modules is illustrated in Table 1.

Cell Memory Operation

The Cell memories 325(a), (b), FIG. 36, are capable of operating in three distinct modes under external control: Read Mode, Write Mode, and Refresh Mode. While one Cell Memory Section 325(a) is in the Write Mode, the other section 325(b) shall be in the Read Mode. The Refresh Mode is utilized in both the Read and Write Modes to preserve the contents of both Cell Memory Sections.

Write Mode

Data to be stored in a Cell Memory Section 325(a), 325(b), may originate from up to four separate sources operating simultaneously. Each of the four sources present luminance and chrominance I and Q data for storage in the appropriate array. Data is formatted in such a way that multiple bytes from each source may be stored simultaneously in all the accessed memory locations sharing a common 7-bit binary X dimension address.

Read Mode

In the Read Mode the Cell Memory Section accepts addresses from the Read Address Generator and, after a fixed delay, outputs the byte of luminance data and two bytes of chrominance data (I and Q) corresponding to that address. In general, the addresses cause modules in the memory arrays to be selected in "line random" as the translated and/or rotated scan patterns of the original scene are generated by the Read Address Generator. The Cell Memory module design ignores multiple accesses to the same module should they occur before the processing of a previous access has been completed.

Output Data Multiplexing

Output data from the luminance and chrominance memory modules are synchronized to a common clock. Insofar as possible, multiplexing of the output data onto common data lines to create luminance and chrominance data sequences corresponding to the input address sequences is accomplished internally to the Cell Memory.

Refresh Mode

The Cell Memory retains the integrity of stored data if every address in the X dimension in the luminance and chrominance arrays is accessed at least one time in each 2.0 millisecond period. External circuitry generates a refresh command to the Cell Memory Section which is in the Read Mode and multiplexes a refresh address onto the X dimension address bus at periodic intervals with a frequency sufficient to guarantee a complete sequence of X addresses during each 2.0 millisecond interval. The Cell Memory Section receiving the refresh command inhibits non-essential internal operations wherever possible to limit power dissipation. The refresh rate for the Cell Memory Section which is in the Write Mode is dependent upon the rate at which data is stored; i.e., as the input data rate slows down, the frequency of Refresh Mode operations increases. The Write Address Generator causes Refresh Mode operations with a frequency sufficient to guarantee a complete sequence of X addresses during each 2.0 millisecond interval.

IMPLEMENTATION

Cell Memory Module

The memory module 392, FIG. 39, is the primary building block of the Cell Memory. Each module has a storage capacity of 16,384 bytes of data (1 byte=8 bits). Each byte of data is individually addressable by means of a 14-bit address. The memory module is organized as shown in FIG. 39.

Module Storage Elements

The storage elements 394 for all Cell Memory modules are metal oxide silicon (MOS) random access dynamic memories containing 16K (16,384) bits of memory. The organization of the individual elements is 16K×1 (16,384 words of 1 bit each). Each individual element has a cycle time not to exceed 280 nanoseconds. Each memory module utilizes 8 individual storage elements 394 for a total storage capacity of 131,072 bits.

Module Input Signals

The input signals to each module 392 consists of 8 bits of input data, 14 address bits organized as 7 bits of Y dimension address and 7 bits of X dimension address, and timing and control signals. All inputs are in the form of TTL logic levels.

Module Clock Input

The memory module is capable of operating with two distinct clock frequencies, one for use in the write mode and one for use in the read mode. The rising edge of the clock input signifies that a new set of addresses and module select signals (X and Y strobes) is to be presented to the module inputs 395. The falling edge of the clock shall signify that these inputs are stable at the module inputs. The falling edge of the clock differs by no more than ±10% of the total clock period from a nominal 50% duty cycle.

Read and Refresh Mode Clock

The module operates in the read and refresh modes with a clock frequency 6 times that of the color burst frequency of 3.579 MHz, or 21.474 MHz. This yields a clock period of 46.56 nanoseconds. Six periods of this clock is 280 nanoseconds, which is the required minimum cycle time of each memory module. The timing relationship shown in FIG. 49 illustrates the read mode timing cycle, wherein line 560 represents the 21.47 MH$_2$ read clock frequency. Each module has a module timing and control circuit 397 which receives commands from the write address generator of the read address generator.

Write Mode Clock

The module operates in the write mode with a clock frequency 4 times that of the color burst frequency of 3.579 MHz, or 14.316 MHz. Proper operation in the Refresh Mode is also be possible at this clock frequency. The timing cycle is shown in FIG. 50, wherein line 561 represents the 14.318 MHz$_2$ timing cycle.

X Address Inputs

The 7 bits of X dimension address are stable at the module inputs prior to the falling edge of the clock and remain stable after the rising edge of the clock for a minimum of 4 nanoseconds. The X address is in negative true format (inverted) at the module inputs 395(c), with one level of inversion taking place internal to the module.

Y Address Inputs

During the read mode of operation the 7 bits of Y dimension address are stable at the Y address latch inputs with respect to the clock. During the write mode of operation the Y address is changed. The Y address is in negative true format (inverted) at the module inputs with one level of inversion taking place internal to the module.

X and Y Strobes

Referring to FIG. 50, the X and Y strobes are derived from the BCD portion of the Cell Memory X and Y addresses and function as module select signals. The strobes are stable at the module inputs prior to the falling edge of the clock and remain stable until the rising edge of the clock. The correspondence of both strobes being of a low logic level with the above timing constraints indicates module selection and causes a memory cycle to be initiated.

Write Command

The write command signal being of a high logic level at the module inputs causes the memory module to enter the write mode of operation. A low logic level indicates that either a read mode or refresh mode is desired. Level changes at the write command input should only occur when the module is in an inactive state (no memory cycle in progress).

Refresh Command

A refresh command being at a low logic level indicates that the refresh mode has been selected. The refresh command is at a high logic level during the Read and Write modes. Level changes at the refresh command input only occurs when the module is in an inactive state.

Holditin Command

This signal is used during the Write Mode of operation to cause the memory module to execute a Page Mode Write Cycle by taking this input to a low logic level with the timing relationship shown in FIG. 50. It is at a high logic level during the Read and Refresh Modes.

Wrcasin Command

This active low signal is used during the Write Mode to generate multiple memory storage sequences when executing Page Mode Write Cycles. It must be at a high logic level during the Read and Refresh Modes and any portion of a Page Mode Write Cycle during which data storage is to be inhibited.

Input Data

During a Page Mode Write Cycle there are four time intervals during which the input data may be stored at an associated Y dimension address. The module may store up to four different input data bytes at four different Y dimension addresses during one Page Mode Write Cycle. The Y dimension address and the input data timing requirements are identical at the module inputs. The input data is represented in positive true format, FIG. 50.

The memory module circuit is shown in greater detail in FIG. 48. A memory cycle is initiated when both Y strobe/ and X strobe/ are at a LOGIC LO level. Storage registers 563(a), (b), (c) receive "data in" "refresh in" and "y address in", and "x address" and "write" commands, their outputs being poured through selector 564 to the 16K×1 memory chip 565. Timing commands are fed through NAND gate 567 and NOR gates 568(a), (b), and through storage register 569 to NOR gate 570 to the RAS input of the memory chip 565 clocking signals are fed through storage register 572 with the WRCASIN input, through NAND gate circuit 573 to the CAS input of the memory chip 565.

Control Signals

During the write mode these control signals are in the states shown:

REFRESHIN/ : LOGIC

WRITEIN : LOGIC HI

Circuit Operation

A memory cycle is initiated when both YSTROBE/ and XSTROBE/ are at a LOGIC LO level when the clock goes LO. Signal MI goes HI, latching the addresses and the first byte of input data and setting NOR gate latch output LATCH/ to a LOGIC LO. At the rising edge of the first clock the flip flop sets DLS to a LOGIC HI, initiating the RAS/. After 39 nanoseconds the RAM address is multiplexed. After the rising edge of next clock, HOLDITIN/ goes LO, resulting in RAS/, MUXIT/, and MI being forced LO for the duration of HOLDITIN/. The second clock also results in flip flop output WRCAS going HI, which initiates the first CAS/. Delay line output RESET causes the NOR gate latch to reset, and DLS to be set LO by the third clock. The fourth clock causes WRCAS to go LO, which terminates the first CAS/ and releases the address and input data latches by allowing LOAD/ to go to a LOGIC HI. The next Y address and byte of input data to be stored are entered and are held in the latches after WRCAS goes high following the fifth clock, which also initiates another CAS/. This sequence continues for up to four CAS/ cycles, after which HOLDITIN/ goes HI in preparation for another complete memory cycle. External circuitry can control which, if any, of the four possible CAS/ cycles are actually utilized to store data by controlling the state of WRCSIN/ during the appropriate time also.

Cell Memory Module Operation

This paragraph explains the operation of the cell memory module circuit. A timing diagram of events is shown in FIG. 49.

Control Signals

During the read mode these control signals are in the states shown:

REFRESHIN/ : LOGIC

HOLDITIN : LOGIC HI

WRITEIN : LOGIC LO

WRCASIN/ : LOGIC HI

Circuit Operation

A memory cycle is initiated when both YSTROBE/ and XSTROBE/ are at a LOGIC LO level when the clock goes LO. Signal MI goes HI, setting the NOR gate latch output LATCH/ to a LOGIC LO. The X and Y addresses are latched by a LOGIC LO from the LOAD/ signal. The rising edge of the next clock sets flip flop output DLS to a LOGIC HI, initiating RAS/ and causing the delay line to begin propagating. After the LOGIC HI reaches the 30 nanosecond tap at the delay line, MUXIT/ goes to a LOGIC LO and multiplexes the Y address to the dynamic RAM address inputs. At the 60 nanosecond tap of the delay line, CAS/ is initiated and signal LS goes LO. At the 105 nanosecond tap of the delay line, signal RESET goes HI, forcing MI to a LOGIC LO and resetting the NOR gate latch. The rising edge of the next clock sets flip flop output DLS to a LOGIC LO which propagates down the delay line. In sequence, the address latches are released, RAX/ is terminated, signal LS goes HI to clock the RAM outputs into a register, and CAS is terminated. Finally, RESET goes to a LOGIC LO permitting another memory cycle to be initiated.

Refresh Mode

With the exception of control signal REFRESHIN/ being a LOGIC LO, which inhibits the initiation of CAS/, the refresh mode is identical in operation to the read mode.

Module Output Data

The outputs of the module shall consist of eight bits of output data during the read mode. No output data will be generated during the write and refresh modes. The data shall be represented by TTL logic levels in positive true format.

Module Output Register

The module output data shall be stored in a clocked register 398, FIG. 39, such that the register contents represent the results of the previous module read cycle until a register clock is generated by a subsequent read cycle.

Alternate Write Mode Refresh

Referring to FIG. 50, nondestructive refresh may be accomplished by executing Page Mode Write Cycles with the Wrcasin Command inhibited to a high logic level. The Holditin Command may or may not be inhibited during refresh as convenient.

Cell Memory PWB

The Cell Memory printed wiring board is the physical building block of the cell memory luminance and chrominance array. Each luminance array includes twenty boards. Referring to FIG. 40, 36, each Cell Memory PWB contains five memory modules and circuitry to control signal flow between the modules and the outside world. Functionally, this circuitry consists of an input interface 400 and an output interface 401.

PWB Module Selection

Each memory module 402(*a*), (*b*), (*c*), (*d*), (*e*), on the wiring board PWB has one select strobe which is unique to it and one strobe which is common to the other four modules.

PWB Input Signal format

Referring to FIG. 41, input signals to the PWB shall be in differential form. The PWB input circuits represent one load to each input line.

PWB Input Interface Circuit

Referring to FIG. 41, the input interface of the PWB convert the differential input signals to TTL logic levels and resynchronize the addresses, strobes, and input data with the clock, as required by the memory module input timing requirements. Write control, Y address, X address, and strobe registers 406(*a*), (*b*), (*c*) and (*d*), are provided.

PWB Output Interface Circuit

The output interface circuit 401, FIG. 51, accepts data from the output data registers of the five memory modules and outputs it to an external data bus 408. Operations which are required in order to output the data properly include converting TTL logic levels to differential logic levels, synchronizing the data with the data bus clock, and gating the data onto the bus at the proper time.

Cell Memory

Each Cell Memory Section 325(*a*), (*b*), is composed of 30 Cell Memory PWBs, 20 PWBs for luminance data storage, 5 PWBs for chrominance I data storage, and 5 PWBs for chrominance Q data storage. Implementation of the Cell Memory luminance and chrominance array structure is accomplished by means of backplane wiring and PWBs are freely interchangeable between positions in the arrays.

Luminance and Chrominance Arrays

The luminance and chrominance arrays of each Cell Memory Section are implemented by interconnection of PWBs as explained below.

Input Signal Wiring

The input signals to the Cell Memory Section are formatted as differential logic levels. Twisted pair wire-wrap wire or backplane etch are used for board to board interconnections. Each pair of signal lines drives no more than 5 PWB inputs. Each pair of signal lines is terminated at the PWB input most distant from the line-driving circuit with an impedance approximating the characteristic impedance of the line.

Input Signal Functions

Address Buses

The seven-bit binary portion of the X and Y addresses must be provided to each PWB in the luminance and chrominance arrays. FIG. 42 shows an interconnection scheme for either the X or Y address with each signal line connected to 5 PWBs. This circuit assumes drivers, 572(*a*), (*b*), (*c*) on the interface board capable of driving two 120 ohm bus lines in parallel. It should be noted that the X and Y addresses experience one level of inversion internal to the individual PWBs.

Luminance Data Buses

The eight bits of input data to each module are distributed to the luminance PWBs or memory modules 574 as shown in FIG. 43 in order to implement the memory loading method to be used in the Write Mode.

While straight daisy chaining is shown in FIG. 10 for clarity, the physical implementation permits dual parallel buses similar to those in FIG. 42.

Chrominance Data Buses

The chrominance data distribution is similar to that of the luminance. The signal routing scheme is shown in FIG. 44, wherein the chrominance I Data interface 573 and chrominance Q data interface 574 input memory sections 575, 576, respectively.

Module Select Signals

The X and Y dimension module select strobes are routed through y dimension interface circuit 575 and x dimension interface circuit 576 per FIG. 45 to implement the interleaved array structure. The module select signals are derived from the BCD portion of the x and y dimension addresses.

The control signals to the Cell Memory PWBs are in differential format transmitted over twisted pair wire-wrap wire or backplane etch. The remaining control signals received by the modules are as follows:

Write Command

This signal determines whether the Cell Memory Section is in the write mode of operation or the read mode. It will change at a 30 Hz rate.

Refresh Command

This signal inhibits unnecessary internal operations in the Cell Memory during the refresh mode of operation. It has approximately a 1 KHz maximum pulse repetition rate.

Master Clear

This signal initializes the Cell Memory during initialization of the system.

Holditin Signal

This signal is used in the write mode to implement the Page Mode Write Cycles. It must be synchronized to the 14 MHz write mode clock.

Wrcasin Signal

This signal is used in the write mode to generate memory timing required to implement the Page Mode Write Cycle. It must be synchronized to the 14 MHz write mode clock.

Clock Input

Separate clock frequencies are required to implement the read mode and the write mode. Refresh mode may use either frequency. The two clock frequencies may be multiplexed on board each Cell Memory

Cell Memory Output Circuit

Referring to FIG. 51, the cell memory output circuit 401 serves to synchronize the outputs of the 20 cell memory PWB's in the luminance array to a common clock multiplexing their outputs into a common data stream corresponding to the sequence of addresses used to access the memory 325(a) an output interface circuit 578 receives module select strobes (or an encoded equivalent) during the Read Mode. They are delayed by 8 clock periods (372 nanoseconds) to allow the RAM output data to settle at the accessed memory module output register. The delayed strobes would then be used to access the output data from one of the modules in the array. The data is then output to a common data bus.

Output Data Control Inputs

The Cell Memory PWB data output circuit requires six control signals to each PWB. The output data control signals to implement the luminance array are shown in FIG. 46 and those to implement the chrominance array are shown in FIG. 47, wherein clock 578 represents the chrominance output data interface circuit.

Input Signal Timing

Input signals which are clocked into registers in the Cell Memory PWB input interface meet the setup and hold times shown in FIG. 49.

Output Signals

The only output signals from the Cell Memory PWBs are the eight bits of output data selected from one of the five modules during the read mode of operation. The output data buses of the luminance and chrominance arrays are shown in FIGS. 46 and 47.

Cell Memory Write Input Timing

FIG. 53 represents the cell memory input timing, wherein a write clock time interval, line 579, corresponding to 14 periods of the write mode clock (14 316 MH$_z$ is required Time period) TO is shown initiating a memory cycle. During TO the module select strobes must be placed in their active, LO state. During interval T1 through T12 there is a "don't care" condition on the strobes. During interval T13 and until a new cycle is initiated, the strobes must be in the LOGIC HI state. Module select strobes, X address, Y address, write mode, write CAS are as shown.

SYSTEM PROCESSING

The software processing requirements for the visual computer program are dictated by the need to provide flicker-free, minimally distorted images with adequate resolution at the final display screens. The Visual Computer is provided geometric, environmental, flight parameter and instructor inputs from the simulator computer 512 and Instructor Operator Station. The position and attitude of the simulated vehicle at a time when image update will be required is predicted, and a scene transfer to the image displays is accomplished. The Visual Computer 19 operates with virtually no operator invention. Video Disks are manually loaded and changed as required with directions appearing on the system console.

The major software elements interface with the Device Interface Modules, Data Structure Modules, and Strategy Modules. These paragraphs provide the math models, algorithms and logic development required for the Visual System programming. The Prediction Task for the Visual System utilizes the smoothed/filtered variables and limited history data to predict the position and attitude of the vehicle at a time ($t_p$) when the next scene will be required. This time ($t_p$) is the midpoint of the times ($t_{pf}$), time of first use, and ($t_{p1}$), time of last use, which is also time of first use of the next scene. The computation of the average times used in the equations is made using counters and averaging techniques, by compiling the number of frame times from initiation to completion of each of the time variations which most affect the prediction algorithm. Given the predicted position of the A/C at (tp) time, a software subroutine provides the next scene prediction which would be best from those available using the adjacent scene pointer data which provides a quick search to locate this scene. Also, information is passed to the Scene Storage Data Structure 28 as to the least likely and most likely next scenes. This provides a means of reading in a new scene data block when required.

Using Adjacent Scene pointer data for the scene selected, initiation parameters to begin scene transfer from Video Disk to Scene memory are generated, computation of the Scene Memory-to-Cell Memory transfer parameters, predicted position, and attitude for times $t_{pf}$ and $t_{pl}$ are computed, then two sets of corner vectors for the predicted window are computed. The areas bounded by these corner vectors are used to compute resolution, interpolator inputs, scene to cell transfer data, sweep delay numbers, etc. The parameters for scene to cell transfer are computed and the predict task is terminated. In order to provide the displays with a correct view, data in the scene storage system 28 is mapped into the Cell Processor Systems 312($a$), ($b$), ($c$), ($d$). The CPS 312 transforms the data into the display viewer's frame of reference. In order to load a Cell Processor 312 with the required pixel density and field of view, it is necessary to know the mapping of the viewing windows into the pseudo film plane. This section presents the methodology for the mapping of window into the pseudo film plane. One underlying concept is to enclose a given window inside a rectangular projection raster and use the appropriate window orientation angles with respect to the viewer's eyepoint coordinate system to identify the required window field of view. Using the appropriate window geometries and other pertinent input data for an eyepoint, each corner of a window, Pl$_W$, is mapped into the pseudo film plane.

The equations providing the pseudo film coordinates for the window corners are solved for the first predicted use of the data in a selected CPS memory section and the last predicted use ($t_p$ and $t_{pp}$ times respectively). The required area to transfer is determined by finding the minimum and maximum $(X_{FMIN}, Y_{FMIN})$, $(X_{FMAX}, Y_{FMAX})$ from these corner sets. This defines a rectangle which deletes the Scene Storage System tracks and long-line interval to be transferred and the rectangular area to be transferred to a cell memory section. The record rasters parameters associated with the scene being processed provide the necessary data to compute sweep delay number(SDN), starting line number, interpolator constants, etc, which are output to the hardware via the Computer Interface (CI).

The part of the full scene which is deposited into the cell memory is than read out at a 30 frame per second rate by the cell Processor under control of the cell processor read address generator. The distortion of the image contained in the cell memory required to affect a video stream which, when displayed to an observer on a rastering display device, will appear to be a correct view of the geometric system represented in the original pseudo film image, is produced by the action of the 3×3 matrix operator of the Cell Processor system. The values required are calculated by the visual computer and output to the Cell Processor, via the CI, at 30 Hz rate. The calculated 3×3 matrix provides rotation, translation, scaling, and error compensation functions sufficient to perform the scene-to-scene smooth transition required.

Having now considered the individual sections of the circuit in detail, it will be helpful to review and summarize their interrelationship and operation in the overall system, and to discuss the advantageous results which derive from the system. It will be understood from the above description that the present invention provides what may be termed a Computer Animated Photographic Terrain View (CAPTV) image processing system providing excellent scene realism, largely because of the processing techniques and the photographic data base. Any geographic area can be 'flown over' (or traversed, in the case of applications other than flight simulators) in the simulator with virtually no restrictions on aircraft attitude, position, altitude, heading or velocity. The arrays of still photographs are, as discussed initially, taken at regular intervals along straight and/or cross tracks. After scanning and formatting, the resulting data is stored in a bulk storage device i.e., the video discs. As the operator 'flies' through these photos, they are randomly retrieved from the storage medium for display. At any given instant, knowing the operator's eyepoint in space, the scene data segment corresponding to the scene nearest location is identified by search and selection from digital data files containing description of each scene attitude, position and the like and parameters are calulated which will cause the scene to be stretched, skewed, rotated and translated by a piecewise continuous mathematical transformation such that the transformed image 580 (FIG. 8) would overlay a different image 581 taken from the pilot's eyepoint 582. This process is a continuous one and allows the simulation of smooth translation throughout the still picture set for any direction of travel through that set.

The process for determining the location from which the original photographs were made, and the attitude of the scanning platform at the time of exposure is in accordance with photogrammetric techniques, as known in the art, and is used, for example, in aerial photography resectioning. Data identifying each photograph relative to the geometric system photographed is produced, keyed to the scene locations on the video discs, and stored in the digital data base accessable to the computer 19. The scene prediction process, as discussed, continuously selects the data segment appropriate for the next scene along the pack selected by the operator. It will be recalled from the above description that, during the period in which motion is taking place using a given fixed scene, the computer 19 is fetching a new appropprate view from the fixed storage media to be used as an overlay substitute. The new view is selected by determining when the present scene must be discarded in favor of a new scene. The trasformation process does not cause unrealistic distortions of the viewed scene. An important characteristic of the system is its capability to make one fixed scene serve in a dynamic translation mode long enough to fetch another scene. A further major feature is the transformation process of the recording section whereby multiple views of a given scene are integrated and processed from a data segment corresponding to a single, psuedo image, having a substantially spherical, or partly spherical field of view, in which the information derived from multiple photographic views from diverging axes is contained.

The recording system 15' FIG. 4, may be termed a first means for recording scenes comprising a plurality of views taken as on diverging axes, and second means for integrating at least two of these views into a data segment corresponding to a single intergrated image devoid of geometric mapping discontinuities.

To provide for the (preferably) 360° of aximuth coverage and 100° of elevation (with high resolution throughout), the camera incorporating multiple lenses with associated mirrors is employed for providing high resolution color transparencies. The gaming area is partitioned to contain a large number of 'eyepoints' distributed in several altitudes in straight and/or cross tracks. The photography density varies inversely with altitude to provide the required coverage for smooth transition from scene to scene.

Necessary detail from the photographic scenes is derived by the flying spot scanner used to scan the 9" film roll to provide a pixel resolution of approximately 4000 pixels in both horizontal and vertical directions. Because of the size of the film and separation of the seven views, scanning is done in steps, and all of the seven views are assembled in the pseudo-film plane using the resolution-preserving mathematical transformation described, and as illustrated in FIG. 9. The video in the primary colors of red (R), green (G) and blue (B) are digitized, and formatted such that each terrain scene is made up of several NTSC frames (typically 72). Compatibility with conventional TV recording apparatus results from the insertion of appropriate sync signals which make the signals suitable for recording on standard video tape recorders and laser disks. To obtain faster access during playback, pieces of a complete scene may be stored in multiple video tapes. During the record process, opportunity is afforded to manipulate the luminance gain and color balance of each view in every scene so that the edges of the views exposed by all the seven lenses match up. Successive scenes have their color and brightness matched. The key to this processing is the luminance and color corrector block together with the large, fast semiconductor memory (scene storage system 28b SSS) which can store up to 256 National Television System Commission (NTSC) frames.

The eyepoint of every scene is determined by photogammetric techniques which aid in the proper sequencing of the scanned scenes on the tape recorders. The knowledge of accurate eyepoints also allows matching one distorted scene to another when both scenes are viewed from the same intermediate pilot position. The data base recorded on the video tape recorders is transferred to video disks suitable for playing on the disk players. Both frame identification numbers and Society of Motion Picture and Television Engineers (SMPTE) Codes are used for the proper sequencing of the frames. It should be understood that new data bases can be created simply by going through the above steps of aerial photography, scanning, recording, disc mastering and photogammetry in the proper sequence. Therefore, there is virtually no limit to the expandability of the gaming area, and the display field of view is modularly expandable up to nearly the full encircling sphere while maintaining resolution of all parts of the scene. The real-time-on-line playback system (FIG. 2) consists of the video storage systems 14, the video digitizer system 195, the scene storage system 28; the cell processor system 312, and a suitable display system. It may be termed the means for producing a data segment corresponding to a scene or view from a third eye point, derived from the psuedo image stored by the record system.

The video storage system 14 preferably employs an analog storage format using television techniques, as a practical and economical alternative to large capacity digital storage, since it is designed to be especially suited to pictorial data. As previously stated, the large capacity, video storage system, consisting of the sixteen video disks, provides large segments of the desired data under control of the host computer 19 in anticipation of the real time needs of the simulation. Any randomly accessed TV frame on a single play-back unit can be located and made available in 2 to 8 seconds. Adjacent or sequential frames (scenes) require much less time that this, however. The players operate essentially independently and are rotationally synchronized to the system timing references for color subcarrier and horizontal vertical raster scans. In operation, all these units do not supply data at the same time. Data is transferred from only a few (e.g. three) players at a time while the others are searched for the anticipated subsequent scenes.

The Video Digitizer System (VDS) 195 is the functional unit which processes analog composite video from the Video Storage System (VSS) 14 and sends digitized video to the scene storage system (SSS) 28. It will be recalled that the VDS has three identical channels since at any given time three video disc players can be simultaneously accessed. The quasi-NTSC video from the VSS is read, time base corrected, clamped and digitized in the VDS. Composite video to component video conversion and spatial compression of the digitized video are carried out by the luminance and chrominance processors to remove the NTSC sync format and to take advantage of the redundancy present in the I and Q components of the color signal and to save memory storage space in the SSS 28. The VDS 195 also provides the interface between the visual system computer 19 and the rest of the visual system hardware.

The scene storage system 28, as has been discussed, comprises two identical sections of up to 128 tracks each. Each track has the capacity to store digital video information including color, present in one NTSC line TV frame (1/30 sec.). Video information is written to one section while it is read form the second section. When fresh data is required, the input side becomes the output side and vice versa. Three channels of data can be input to the SSS 28, and the SSS in turn can provide multiplexed Y, I and Q digital data to the 4-cell processor systems 312(a), (b), (c), (d) simultaneously.

The cell processor system 312 receives the digital luminance and chrominance data corresponding to a scene from the SSS 28. Under software control it selects the portion which is visible to the pilot through one window, performs the geometric transformation on this data as required by motion of the pilot's eyepoint, and generates analog trichromatic (e.g. red, green and blue) video signals for display. Data is received from the SSS 28b by four input interpolators, 324(a), (b), (c), (d) (FIG. 23) which operate independently and simultaneously. Each of the interpolators channels the Y, I and Q into separate data streams, performs low-pass-filtering, and interpolates or decimates as required to provide data at the proper rate to be loaded into the cell memory. Filtering and interpolation are done in both longitudinal and transverse directions, and the parameter controlling these operations is supplied by the visual computer.

The Cell Memory consists of two sections 325(a), 325(b), FIG. 23. One section may be read for display while the other is being loaded by the interpolators. An output multiplexer 327 selects the data from the appropriate section and provides it to the output processor. The ddresses for the Cell Memory are provided by the Address Generator 330. The read addresses are obtained from the display-raster pixel coordinates by a transformation corresponding to a piecewise continuous rotation, skew, and magnification in order to create a display of the scene data as seen from the pilot's eyepoint.

The output processor 333, 334, 335, 336 receives data through the memory multiplexer 327, performs low pass filtering, simulates haze, and inserts sky indication above the horizon. It aso provides for replacement of a limited number of pixels in the output scene with pixels supplied by the Visual Computer 19 and, optionally, for insertion of a light point surrounded by a black square for the automatic position error sensing system. Finally the trichromatic digital data streams are converted to analog signals, filtered and provided to the display along with a sync signal. While various types of display means may be employed to provide visual imagery corresponding to the proversed information, the disclosed embodiment of the image display system suitably consists of the multiple rear screen television projection system (FIG. 1) providing essentially the total forward hemisphere field of view (fov) available from a typical vehicle or aircraft. This is obtained by joining together a plurality of flat projection screens into a single mosaic. Each separate rear projection channel suitably consists of a conventional, Light Valve TV projector, two or more folding mirrors and a lenticular rear projection screen as shown in FIG. 1.

Partially because of the use of the high resolution, photographic data base, the system thus provides major advantages over existing visual simulator systems. Some of these advantages are its ability to provide scene-realism, detail, 3-dimensionality, and texture that is limited only by photography and virtually unlimited for expandability of data base. The real-time playback system provides the operator with a continuous display of the gaming area as presented on a hemispherical rear screen projection system. The scope of the gaming area is large enough and flexible enough for a simulator pilot to fly a mission with total maneuvering freedom. The use of progressively smaller but faster memory systems [video discs 14, scene storage system 28, cell processor memories 325(a), (b)] permits real-time processing of the image as required to simulate rapid movement through the "gaming area" or geometric system while retaining appropriate image detail for assuring realistic pictorial simulation. Because of the description of the displayed image from a data segment corresponding to, and capable of reproducing a single, partially or wholly spherical field of view (not necessarily duplicating the original views) mapping and overlap disparaties between divergent views are eliminated. The output data segments do not necessarily duplicate the photographic views, and may appear as taken from different eye point positions. Additionally the very high memory capacity provided by the cell processors memory system 325, with its interleaved "line sequenced sampling", provides the massive processing capacity needed for the image processing techniques entailed in such real time image transformations.

While only one embodiment of the invention, together with modification thereof, has been described in detail herein and shown in the accompanying drawing, it will be evident that various further modifications are possible in the arrangement and construction of its components without departing from the scope of the invention:

What is claimed is:

1. An image processing apparatus, comprising:
   first means, for recording information corresponding to at least two views of a geometric system;
   second means, for integrating the information corresponding to at least two views and producing a data segment corresponding to a single view of the geometric system containing the information corresponding to the at least two views; and
   third means, for processing the data segment produced by the second means to provide information for simulating a third view of the geometric system.

2. The apparatus of claim 1, wherein the data segment produced by the second means corresponds to a single, integrated image devoid of mapping discontinuities between information derived from disparate views.

3. The apparatus of claim 1, wherein the first means comprises means for recording information corresponding to at least two views taken along first and second, mutually divergent axes, respectively, and wherein the third means comprises means for providing information corresponding to a third view of the geometric system, taken as on a third axis.

4. The apparatus of claim 3, wherein the third axis diverges from the first and second axes.

5. The apparatus of claim 1, wherein the second means comprises means for integrating information corresponding to a plurality of views of a geometric system into information corresponding to a single, continuous equivalent image corresponding to substantially semi-spherical field of view.

6. The apparatus of claim 1, wherein the geometric system comprises a geographical area, and wherein the first means comprises means for recording information corresponding to a plurality of scenes from mutually spaced eyepoints of the geographical area, each scene comprising at least two views taken along mutually diverging axes.

7. The apparatus of claim 5, wherein the second means comprises means for storing, in data format, information corresponding to substantially semi-spherical images in which the information corresponding to the respective, at least two views of each scene is integrated, and in which the third means comprises means for reproducing at least two views corresponding to respective, mutually adjacent image portions.

8. A data processing system, comprising:
   first means for recording optical images, each image comprising a plurality of views of a portion of a geographical area taken on mutually diverging axes;
   second means for converting the optical images into a reproducible data format in which the views of each optical image are integrated into a data format segment corresponding to a single, integrated, substantially semi-spherical image;
   third means for retrieving and processing the data segments and for displaying at least two views corresponding to segments of the substantially semi-spherical images, derived from respective data format segments, but not necessarily corresponding to respective ones of the views of the geographical area to which the respective data segments correspond.

9. The apparatus of claim 8, wherein the first means comprises means for recording a plurality of optical images viewed from mutually spaced locations in the geographical area, and wherein the third means comprises means for successively retrieving respective data segments corresponding to optical images viewed successively along an unprogrammed path through the geographical area.

10. The apparatus of claim 9, the third means further comprising means for processing the data segments for providing output signals for generating a simulated real time display corresponding to images which would be viewed along a path through the geographical area at locations intermediate those corresponding to the stored optical images.

11. The apparatus of claim 10, further comprising means for reproducing visual displays corresponding to segments of the images processed by the third means.

12. The apparatus of claim 11, wherein the optical display reproducing means comprises means reproducing images corresponding to views of the geographical area which would be seen from respective viewing angles intersecting the respective images from a vehicle moving on a path through the geographical area.

13. The apparatus of claim 9, further comprising control means actuated by an operator for providing command signals to the third means for causing the third means to retrieve and process data segments corresponding to images viewed sequentially along an unprogrammed, simulated trajectory, selected by the operator, through the geographical area.

14. The apparatus of claim 11, wherein the image reproducing means comprises means for reproducing images corresponding to views of the geographical area which would be seen from respective viewing locations differing from those from which the views were recorded.

15. Image processing means comprising:
a first means, for providing photographic representations of a geometric system from mutually spaced positions relative to the geometric system, each photographic representation having multiple, discrete segments corresponding to respective views of a portion of the geometric system taken as on respective, mutually diverging axes;
second means, including means for scanning the photographic representations, for converting the photographic views of each recorded scene into sequential electrical signals corresponding to respective portions of a substantially semi-spherical field of view;
third, processing means, for converting the electrical signals corresponding to each respective photographic representation into a data segment corresponding to a single, integrated image of the portion of the geometric system from which the photographic representation was derived.

16. The apparatus of claim 15, the integrated image having a portion of a substantially spherical field of view.

17. The apparatus of claim 15, the second means including a scanning spot generator and film transport means for positioning the photographic representations adjacent the scanning spot generator and for sequentially aligning each view of each respective photographic representation with the scanning spot generator.

18. The apparatus of claim 17, the second means further comprising light responsive sensor means and optical means for directioning trichromatic light transmitted by the scanning spot generator through respective view segments toward the first, second, and third light responsive sensor means, respectively.

19. The apparatus of claim 15, the third processing means comprising means for storing the data segments in digitally encoded form, the apparatus further comprising fourth means for sequentially retrieving the data segments, and converting the data segments into analog encoded form adapted for television playback.

20. The apparatus of claim 19, further comprising means for recording sequential data segments derived from the fourth means in a storage medium in a predetermined storage pattern.

21. The apparatus of claim 20, the recording means including multiple recording apparatus, and comprising means for storing information corresponding to respective portions of each integrated image on addressable locations of respective storage mediums in respective ones of the recording apparatus.

22. An image generation system comprising:
first means storing data segments corresponding to respective images of a geometric system, each image comprising an integration of data corresponding to multiple views, taken as on mutually diverging axes, of a respective portion of the geometric system;
second means for processing data segments stored in the first means into at least one data segment corresponding to another view of the respective potion of the geometric system.

23. The apparatus of claim 22, the second means comprising means for processing the data segments, stored in the first means, into at least two data segments corresponding to respective image segments.

24. The apparatus of claim 22, the first means comprising means for storing data segments corresponding to respective views of a geometric system taken as from a first location relative to the geometric system, the second means comprising means for processing the data segments stored in the first means into at least one data segment corresponding to a view of the respective portion of the geometric system taken as from a second location relative to the geometric system.

25. The apparatus of claim 24, the data segments recorded by the first means corresponding to respective pluralities of views taken as from mutually spaced locations within the geometric system.

26. The apparatus of claim 25, the second means comprising means for successively processing data segments corresponding to views taken as from mutually spaced locations for providing successive data segments in a format suitable for reproducing a display simulating movement through the geometric system.

27. The apparatus of claim 26, including control input means generating command signals to the second means for causing derivation of selected data segments corresponding to an unprogrammed path within the geometric system.

28. The apparatus of claim 27, wherein the control input means includes controls adapted to be actuated by an operator, the control means comprising means for generating command signals for derivation of sequential data segments corresponding to a path selected by the operator.

29. The apparatus of claim 28, wherein the geometric system comprises a geographical area, and wherein the control input means comprises a portion of a flight simulator system and includes control means corresponding to controls of a simulated vehicle.

30. An image generation system comprising:
first means for storing data segments corresponding to respective images of a geometric system, each image comprising an integration of data corresponding to a respective portion of the geometric system; and
second means for processing the data segments stored in the first means into at least two data segments corresponding to respective views of the geometric system taken as on diverging axes.

31. The apparatus of claim 30, further comprising means for displaying visual images corresponding to the respective data segments processed by the second means.

32. The apparatus of claim 31, wherein the visual images correspond to contiguous views of the geometric system.

33. The apparatus of claim 30, the second means including first scene storage means for storing data segments corresponding to respective images of the geometric system.

34. The apparatus of claim 33, the first storage means having first and second memory sections, the apparatus further comprising means for retrieving information from one of the memory sections for generating a data segment corresponding to an image of a first portion of the geometric system, and for simultaneously storing in the other memory section information corresponding to a second portion of the geometric system contiguous the first portion.

35. The apparatus of claim 34, further comprising a second scene storage means having respective memory sections corresponding to each display means, further comprising addressing means for withdrawing information from the memory sections of the second scene storage means at intervals shorter than the intervals of storage in the first storage means and in a format simulating movement within the respective portion of the geometric system to which the information stored in the first storage means corresponds.

36. A high speed video generator system for selectively generating subsegments of a scene for display on a video display device, said system comprising:
(a) first memory means for storing said scene.
(b) second and third memory means coupled to said first memory means for selectively receiving data corresponding to selected segments of said scene, said first and second memory means each comprising
(i) a plurality of random access memory devices interconnected to provide a memory array having a plurality of rows and columns of word positions in which digital information is stored relating to a corresponding point of the scene segment stored in the respective memory,
(ii) address generator means for sequentially addressing word positions of said memory array along any selected substantially straight line across said memory array corresponding to a substantially straight line path across the scene. said address generator addressing selected ones of said memory means cyclically by memory means; and
(c) control means coupled to said first, second and third memory means, said control means including:
(i) means for selectively addressing subsegments of the scene segment stored in a selected one of said second or third memory means along a selected path across said scene segment for display by the video display system;
(ii) means for loading the other of said second or third memory means with a next scene segment from the first memory means when the selected subsegment of the scene segment comes within a first predetermined boundary of an extremity of the scene segment stored in the selected one of the second or third memory means; and
(iii) means for switching from the selected of the second or third memory means to the other of said second and third memory means when the selected subsegment comes within a second predetermined boundary of an extremity of the scene segment stored in the selected one of the second or third memory means.

37. The video generation system according to claim 36 including a viewer control device coupled to said control means for controlling the subscene displayed on said video display system.

38. The video generation system according to claim 36 wherein said control device includes an airplane control and whereas the subsegment of the scene being displayed is a simulation of the image viewed by a pilot flying an airplane.

39. The video generation system according to claim 36 including fourth memory means for storing bulk scene data related to relatively large scenes coupled to said first memory means for loading portions of said large scenes into said first memory means under control of said control means.

40. The video generation system according to claim 39 wherein said first memory means includes fifth and sixth memory means coupled to said fourth memory means for selectively receiving data corresponding to portions of a relatively large scene and wherein said control means includes
(i) means for selectively addressing segments of the scene stored in a selected one of said fifth or sixth memory as required to be loaded into a selected one of said second or third memory means,
(ii) means for switching from the selected of the fifth or sixth memory means when the selected segment of the scene being loaded into the second or third memory means comes within a fourth predetermined boundary of an extremity of the scene stored in the selected one of the fifth or sixth memory means; and
(iii) means for switching from the selected of the fifth or sixth memory means when the selected segment of the scene being loaded into the second or third memory means comes within a fourth predetermined boundary of an extremity of the scene stored in the selected one of the fifth or sixth memory means.

41. The video generation system according to claim 40 wherein at least a portion of the scenes stored in said means are overlapping to provide smooth transitions between scenes.

42. The video generation system according to claim 36 wherein at least a portion of the scene segments stored in said second and third memory means are overlapping to provide smooth transition between scene segments.

43. A video generation system for selectively displaying subsegments of a scene on a video display device comprising:

(a) first memory means for storing data corresponding to relatively large scenes,
(b) second and third memory means coupled to said first memory means for selectively receiving data corresponding to selected portions and large scenes,
(c) fourth and fifth memory means coupled to said second and third memory means for selectively receiving segments of the portions of the scene stored inside third and fourth memory; and
(d) control means coupled to said first, second, third, fourth, and fifth memory means said control means including:
  (i) means for selectively addressing subsegments of the scene segment stored in a selected one of said fourth and fifth memory means for display by the video displays,
  (ii) means for loading the other of said fourth and fifth memory means with a next overlapping scene segment when the selected subsegment comes within a second predetermined boundary of an extremity of the scene segment stored in the selected one of the fifth and sixth memory means,
  (iii) means for switching from the select of the fifth and sixth memory means to the other of said fifth and sixth memory means when the selected subsegment comes within a second predetermined boundary of an extremity of the scene segment stored in the selected one of the fifth and sixth memory means,
  (iv) means for selectively addressing segments of the scene portion stored in a selected one of said second and third memory means as required for loading into the other of said fifth and sixth memory means.
  (v) means for loading the other of said second and third memory means with a next scene portion from said first memory means when the selected segment of the scene comes within a third predetermined boundary of an extremity of the second and third memory means and,
  (vi) means for switching from the selected of the second and third memory means when the selected segment of the scene being loaded into the other of the fourth and fifth memory means comes within a fourth predetermined boundary of an extremity of the scene segment stored in the selected one of the fourth and fifth memory means.

44. The video generating system according to claim 43 wherein said first memory means is a relatively slow bulk storage device, said second and third memory means comprise intermediate speed random access memories and said fourth and fifth memory means comprise relatively high speed random access memory means.

45. The video generation system according to claim 44 wherein said fourth and fifth memory means are line random unreleased digital memories.

46. The video display system according to claim 44 wherein said first memory means is comprised of: (a) at least one laser disc player device and, (b) an analog to digital converter means.

* * * * *